(12) United States Patent
Koyata et al.

(10) Patent No.: US 7,334,051 B2
(45) Date of Patent: Feb. 19, 2008

(54) DATA DISTRIBUTION SYSTEM, TERMINAL APPARATUS, DISTRIBUTION CENTER APPARATUS, HIGH-EFFICIENCY ENCODING METHOD, HIGH-EFFICIENCY ENCODING APPARATUS, ENCODED DATA DECODING METHOD, ENCODED DATA DECODING APPARATUS, DATA TRANSMISSION METHOD, DATA TRANSMISSION APPARATUS, SUB INFORMATION ATTACHING METHOD, SUB INFORMATION ATTACHING APPARATUS, AND RECORDING MEDIUM

(75) Inventors: Tomohiro Koyata, Tokyo (JP); Taro Konno, Kanagawa (JP)

(73) Assignee: Sony Corporation, Tokyo (JP)

( * ) Notice: Subject to any disclaimer, the term of this patent is extended or adjusted under 35 U.S.C. 154(b) by 951 days.

(21) Appl. No.: 10/145,672

(22) Filed: May 15, 2002

(65) Prior Publication Data

US 2003/0004883 A1    Jan. 2, 2003

(30) Foreign Application Priority Data

May 17, 2001    (JP) .............................. 2001-148454
May 17, 2001    (JP) .............................. 2001-148455

(51) Int. Cl.
*G06F 15/16*    (2006.01)
*H04L 9/00*    (2006.01)

(52) U.S. Cl. ........................ 709/246; 709/231; 726/26; 713/176; 705/58

(58) Field of Classification Search ................ 709/231, 709/246, 247; 726/26; 705/56–58; 713/176
See application file for complete search history.

(56) References Cited

U.S. PATENT DOCUMENTS

| | | | | |
|---|---|---|---|---|
| 5,889,868 | A * | 3/1999 | Moskowitz et al. ......... | 713/176 |
| 6,061,793 | A * | 5/2000 | Tewfik et al. ............... | 713/176 |
| 6,330,672 | B1 * | 12/2001 | Shur ........................... | 713/176 |
| 6,553,127 | B1 * | 4/2003 | Kurowski .................... | 382/100 |
| 6,889,211 | B1 * | 5/2005 | Yoshiura et al. ............. | 705/58 |
| 6,952,685 | B1 * | 10/2005 | Hunter et al. ................ | 705/58 |
| 2002/0095384 | A1 * | 7/2002 | Pestoni et al. ................ | 705/51 |

* cited by examiner

*Primary Examiner*—Saleh Najjar
*Assistant Examiner*—David Lazaro
(74) *Attorney, Agent, or Firm*—Frommer Lawrence & Haug LLP; William S. Frommer; Thomas F. Presson

(57) ABSTRACT

A data distribution system that includes a distribution center apparatus for dividing digital content data into segments of multiple frequency bands, and converting the segments of digital content data into encoded data having compressed blocks, each block having a predetermined length unit and constituted by at least bit distribution information, normalized data and quantized data. The encoded data is transmitted so as to superimpose, if an empty portion exists in each of the blocks, a part or all of an identifier for identifying a provider of the digital content data onto the empty portion.

57 Claims, 26 Drawing Sheets

FIG. 6

| NUMBER OF UNIT BLOCKS TO BE RECORDED | | BIT ALLOCATION INFORMATION DUPLICATE WRITE SETTING | | SCALE FACTOR INFORMATION DUPLICATE WRITE SETTING | |
|---|---|---|---|---|---|
| CODE | COUNT | CODE | COUNT | CODE | COUNT |
| 0 0 0 | 2 0 | 0 0 | 0 | 0 0 0 | 0 |
| 0 0 1 | 2 8 | 0 1 | 2 8 | 0 0 1 | 8 |
| 0 1 0 | 3 2 | 1 0 | 4 4 | 0 1 0 | 1 2 |
| 0 1 1 | 3 6 | 1 1 | 5 2 | 0 1 1 | 1 6 |
| 1 0 0 | 4 0 | | | 1 0 0 | 2 4 |
| 1 0 1 | 4 4 | | | 1 0 1 | 3 6 |
| 1 1 0 | 4 8 | | | 1 1 0 | 4 4 |
| 1 1 1 | 5 2 | | | 1 1 1 | 5 2 |

FIG. 8A $$SPsum = \sum_{k=0}^{M-1} (SPk \times WLk) \quad \cdots (1)$$

FIG. 8B $$Bsum = 32 + 4 \times M + 6 \times M + SPsum \quad \cdots (2)$$

FIG. 8C $$REM = 1696 - Bsum \quad \cdots (3)$$

FIG. 15

| CONTENT NUMBER | MAIN INFORMATION | CHARACTER INFORMATION | IMAGE INFORMATION | OTHER INFORMATION | DETECTION FRAME NUMBER |
|---|---|---|---|---|---|
| 1 | SongA.dat | SongA.txt | SongA.jpg | ........... | 5 |
| 2 | SongB.dat | SongB.txt | SongB.jpg | ........... | 82 |
| 3 | SongC.dat | SongC.txt | SongC.jpg | ........... | 46 |
| ...... | ...... | ...... | ...... | ........... | ...... |

FIG. 18

| 001 | START POINT OF BUSINESS ENTITY IDENTIFICATION DATA |
|---|---|
| 010 | START POINT OF MUSIC IDENTIFICATION DATA |
| 101 | END POINT OF BUSINESS ENTITY IDENTIFICATION DATA |
| 110 | END POINT OF MUSIC IDENTIFICATION DATA |
| 000 | IGNORE |

DATA DISTRIBUTION SYSTEM, TERMINAL APPARATUS, DISTRIBUTION CENTER APPARATUS, HIGH-EFFICIENCY ENCODING METHOD, HIGH-EFFICIENCY ENCODING APPARATUS, ENCODED DATA DECODING METHOD, ENCODED DATA DECODING APPARATUS, DATA TRANSMISSION METHOD, DATA TRANSMISSION APPARATUS, SUB INFORMATION ATTACHING METHOD, SUB INFORMATION ATTACHING APPARATUS, AND RECORDING MEDIUM

BACKGROUND OF THE INVENTION

The present invention relates generally to an encoding method of and an encoding apparatus for performing high-efficiency encoding on digital signals such as digital audio data, an encoded data decoding method of and an encoded data decoding apparatus for decoding data encoded by high-efficiency encoding, a transmission method of and a transmission apparatus for transmitting data encoded by high-efficiency encoding, a sub information attaching method of and a sub information attaching apparatus for attaching sub information to data encoded by high-efficiency encoding, a recording medium in which data encoded by high-efficiency encoding are recorded, a data distribution system for distributing data encoded by high-efficiency encoding, and a terminal apparatus for and a distribution center for use in this data distribution system.

Several methods are known for obtaining audio data such as music. One of them is to purchase recording media themselves. These media are phonograph records and CDs (Compact Disks) for example. In another known method, desired audio data in received broadcast programs are recorded on recording media.

Recently, a method based on a server system is also known in which large quantities of audio data (music data (music information)) are stored in on a hard disk for example and customers transfer the music data from the hard disk to their external recording media.

In the above-mentioned server-system based method, each server is installed at the store for example. A customer goes to the store with his own recording medium (external recording medium), pays a predetermined amount of money, and records desired music data from the server system to the recording medium, thereby realizing the purchase of music. The above-mentioned server installed at the store is generally called a kiosk terminal or a content vending machine.

Generally, the music data stored in a server system are compressed in consideration of the storage capacity and transfer capacity for example of the server system. Therefore, the server system is adapted to transfer and record demanded music data to the medium of a customer (purchaser) in a time shorter than the actual play time of that music data.

For the selection of music data to be purchased, each customer enters the sub information such as the title, player, and play time of the music into the server system in the form of text or image. The server system is adapted to allow each customer to check these entries, so that the customer can simply select desired music data, record the selected music data to his own recording medium, and use the recorded music data as desired.

Generally, the above-mentioned server system is compatible with external recording media of plural types. For example, customers can record music data to a small-size magneto-optical disk such as an MD (MiniDisc) (trademark) and a semiconductor device such as a memory card.

Sometimes, it occurs that the music data recorded to an MD for example from the server system are recorded again to another medium a memory card for example, because of the unavailableness of an MD player for example. In this case, the user may not copy the music data from his own predetermined recording medium to another recording medium of his own due to the problems of copyright or deterioration of tone quality for example.

If this happens, the customer must newly purchase from the server system the music data which are compatible with another recording medium (or a new recording medium). However, this brings the customer a disadvantage that the same music data must be purchased again while the recording medium in which these music data have been stored is used no longer.

In the case where, with the same recording medium, music data with the compression with enhanced tone quality as compared with the compression at a previous purchase are purchased, the customer has to pay for the music data again. In this case, too, it brings the customer a disadvantage that same music data must be purchased again even if the recording medium in which these music data of lower music quality have been stored is used no longer.

If, for example, a recording medium is defective and therefore it is necessary to record the same music data to another recording medium, these music data must be purchased from a server system for plural times.

One of the methods proposed for solving the above-mentioned problems is to record the identification information of the generation source (purchase destination) of music data purchased before and, when purchasing the same music data again from the original purchase destination, the repurchasing of the same music data from the original purchase destination is made free of charge or at a lower cost than that at the initial purchase. However, this method is impracticable because related-art recording media have no area in which to record information about the generation source (purchase destination) of music data.

Consequently, the applicant hereof disclosed, in a patent application (Japanese Patent Laid-open No. 2001-56469, a method of and apparatus for determining whether or not the generation source of the music data recorded on a recording medium is a predetermined distributor by use of the identity of the encoded data formed by a high-efficiency encoding apparatus.

The above-mentioned disclosed method and apparatus are based on the following points. Namely, the encoded data (binary data) which are high-efficiency encoded by the predetermined high-efficiency encoding apparatus remain unchanged when the encoded data are recorded as they are. However, for the same music data, if high-efficiency encoding apparatuses for encoding the data are different from one another, the encoded data (binary data) formed by high-efficiency encoding completely differ from one another due to the difference between encoding processing timings for example.

By use of this difference, matching is performed between the high-efficiency encoded data (binary data) to determine whether these data have been encoded by the same encoding apparatus in the same timed relation, thereby making it possible to determine whether the particular encoded data have been provided by a particular music data distributing server system.

However, in the case of the above-mentioned disclosed method and apparatus, whether or not the music data distributed so as to be recorded to a recording medium of a customer have been provided by a same server system (device) can be surely and easily determined but, if different providers (business entities) distribute music data by use of a same server system (device), the customer of particular music data to be distributed to a recording medium of a purchaser cannot be identified.

In this case, the term the same server system includes both cases in which two or more providers distribute music data through one server system and two or more different providers distribute music data by use of identical server systems manufactured by one manufacturer.

Consequently, new services such as the movement of music data between recording media and the upgrading of the compression processing of music data cannot be provided by each different provider of the music data.

The number of providers of music data is expected to increase in the future and therefore it is required to surely and easily determine which provider has distributed particular music data through a server system, thereby making it possible to provide various new services by different providers.

SUMMARY OF THE INVENTION

It is therefore an object of the present invention to provide a data distribution system, a terminal apparatus, and a distribution center apparatus that allow the sure and easy determination of which provider has distributed encoded data such as music data recorded on recorded media, thereby making is possible to provide various new services by different providers which provide digital signals.

According to a first aspect of the present invention, there is provided a data distribution system including:

a distribution center apparatus for dividing digital content data into parts in many bands, converting the divided part of digital content data included in each of the many bands into a piece of encoded data composed of many blocks each having a predetermined length unit and being constituted by at least bit distribution information, normalized data and quantized data, and transmitting the encoded data in such a manner as to superimpose, if an excess portion exists in each of the many blocks, a part or all of an identifier for identifying a provider of the digital content data onto the excess portion; and a terminal apparatus connected to the distribution center apparatus through a predetermined communication line, the terminal apparatus including recording means for recording the digital content data provided as the encoded data from the distribution center apparatus to a recording medium loaded in the terminal apparatus, the data distribution system including:

reader for sequentially reading the blocked encoded data from the recording medium loaded in the terminal apparatus;

first discriminator for discriminating whether each block of the encoded data read by the reader has the excess portion;

extractor for extracting data of the excess portion from the each block found as having the excess portion by the first discriminator;

demodulator for demodulating the identifier for identifying the provider on the basis of the data extracted by the extractor;

second discriminator for discriminating whether the digital content data, which are the encoded data read from the recording medium loaded in the terminal apparatus, are those provided by the distribution center apparatus, which is legitimate, on the basis of the identifier for identifying the provider demodulated by the demodulator; and controller for performing predetermined control processing if the digital content data, which are the encoded data read from the recording medium loaded in the terminal apparatus, are found provided from the legitimate distribution center apparatus.

According to a second aspect of the present invention, there is provided a terminal apparatus for receiving encoded data, the terminal apparatus including recording means for recording the encoded data in a recording medium loaded in the terminal apparatus, wherein the encoded data have been created by a manner of dividing digital content data into parts in many bands, converting the divided part of the digital content data included in each of the many bands into a piece of encoded data composed of many blocks each having a predetermined length unit and being constituted by at least bit distribution information, normalized data and quantized data, and superimposing, if an excess portion exists in each of the many blocks, a part or all of an identifier for identifying a provider of the digital content data onto the excess portion, the terminal apparatus including:

reader for sequentially reading the blocked encoded data from the recording medium loaded in the terminal apparatus;

discriminator for discriminating whether each block of the encoded data read by the reader has the excess portion;

extractor for extracting data of the excess portion from the each block found as having the excess portion by the discriminator;

demodulator for demodulating the identifier for identifying the provider on the basis of the data extracted by the extractor;

connector for connecting a communication line with a distributor for distributing the digital content data through a predetermined communication network; and controller for controlling reception of new digital content data supplied from the provider through the predetermined communication network on the basis of the identifier for identifying the provider of the digital content data demodulated by the demodulator.

According to a third aspect of the present invention, there is provided a terminal apparatus including:

receiver for receiving digital content data supplied from a predetermined distributor through a predetermined communication network, wherein the digital content data are composed of encoded data having many blocks each having a predetermined length unit and being constituted by at least bit distribution information, normalized data and quantized data, and if each of the many blocks has an excess portion, the excess portion is superimposed with a part or all of identifier for identifying a provider of the digital content data; and first recorder for recording the received digital content data in a recording medium loaded in the first recorder, the terminal apparatus including:

reader for sequentially reading the blocked encoded data from the recording medium loaded in the first recorder;

discriminator for discriminating whether each block of the encoded data read by the reader has the excess portion;

extractor for extracting data of the excess portion from the each block found as having the excess portion by the discriminator;

demodulator for demodulating the identifier for identifying the provider on the basis of the data extracted by the extractor;

transmitter for transmitting the identifier for identifying the provider demodulated by the demodulator to the provider through the predetermined communication network; and controller for controlling for, after transmitting the identifier through the transmitter, controlling each component to perform processing in accordance with control information received by the receiver from the provider.

According to a fourth aspect of the present invention, there is provided a terminal apparatus including:

receiver for receiving digital content data supplied from a predetermined distributor through a predetermined communication network, wherein the digital content data are composed of encoded data having many blocks each having a predetermined length unit and being constituted by at least bit distribution information, normalized data and quantized data, and if each of the many blocks has an excess portion, the excess portion is superimposed with a part or all of identifier for identifying a provider of the digital content data; and first recorder for recording the received digital content data in a recording medium loaded in the first recorder, the terminal apparatus including:

reader for sequentially reading the blocked encoded data from the recording medium loaded in the first recorder;

discriminator for discriminating whether each block of the encoded data read by the reader has the excess portion;

extractor for extracting data of the excess portion from the each block found as having the excess portion by the discriminator;

demodulator for demodulating the identifier for identifying the provider on the basis of the data extracted by the extractor;

comparator for comparing the identifier for identifying the provider demodulated by the demodulator with an identifier for identifying the provider held in the terminal apparatus; and controller for, if a match is found between these identifiers, controlling each component to perform predetermined processing.

According to a fifth aspect of the present invention, there is provided a distribution center apparatus including:

first memory for storing encoded data, the encoded data having been created by a manner of dividing digital content data into parts in many bands, converting the divided part of the digital content data included in each of the many bands into a piece of encoded data composed of many blocks each having a predetermined length unit and being constituted by at least bit distribution information, normalized data and quantized data, and superimposing, if an excess portion exists in each of the many blocks, a part or all of an identifier for identifying a provider of the digital content data onto the excess portion;

transmitter for transmitting, to a predetermined terminal apparatus, desired digital content selected from a plurality of digital content data stored in the first memory as encoded data;

second memory for storing an identifier for identifying the provider of the distribution center apparatus;

receiver for receiving an identifier for identifying a distributor supplied from the predetermined terminal apparatus;

comparator for comparing the identifier for identifying the distributor supplied from the receiver with the identifier for identifying the provider of the distribution center apparatus stored in the second memory; and permitter for, if a match is found by the comparator, permitting transmission of the desired predetermined digital content from the transmitter.

According to a sixth aspect of the present invention, there is provided a high-efficiency encoding apparatus for dividing an input digital signal into parts in a plurality of bands, and performing predetermined conversion on the divided part of the input digital signal included in each of the plurality of bands, to form a piece of encoded data composed of many blocks each having a predetermined length unit and being constituted by at least bit distribution information, normalized data and quantized data, including:

discriminator for discriminating each of the many blocks for an excess portion equivalent to a difference between the predetermined length and a total value of the bit distribution information, the normalize data and the quantized data;

sub information generator for generating sub information; and mixer for superimposing a part or all of the generated sub information onto the excess portion of each block found by the discriminator having the excess portion.

According to a seventh aspect of the present invention, there is provided an encoded data transmission apparatus for dividing an input digital signal into parts in a plurality of bands, performing predetermined conversion on the divided part of the input digital signal included in each of the plurality of bands to form a piece of encoded data composed of many blocks each having a predetermined length unit and being constituted by at least bit distribution information, normalized data and quantized data, and transmitting the formed encoded data, the transmission apparatus including:

discriminator for discriminating each of the many blocks for an excess portion equivalent to a difference between the predetermined length and a total value of the bit distribution information, the normalize data and the quantized data;

sub information generator for generating sub information;

mixer for superimposing a part or all of the generated sub information onto the excess portion of each block found by the discriminator having the excess portion; and transmitter for sequentially transmitting the encoded data superimposed of the sub information.

According to an eighth aspect of the present invention, there is provided a sub information attaching apparatus for receiving encoded data, the encoded data having been created by a manner of dividing an input digital signal into parts in a plurality of bands, and performing predetermined conversion on the divided part of the input digital signal included in each of the plurality of bands, to form a piece of encoded data composed of many blocks each having a predetermined length unit and being constituted by at least bit distribution information, normalized data and quantized data, and attaching additional data to the received encoded data, the attaching apparatus including:

discriminator for discriminating each of the many blocks for an excess portion equivalent to a difference between the predetermined length and a total value of the bit distribution information, the normalize data and the quantized data;

sub information generator for generating sub information; and mixer for superimposing a part or all of the generated sub information onto the excess portion of each block found as having the excess portion by the discriminator.

According to a ninth aspect of the present invention, there is provided a recording medium for recording encoded data, the encoded data having been created by a manner of dividing an input digital signal into parts in a plurality of bands, and performing predetermined conversion on the divided part of the input digital signal included in each of the plurality of bands, to form a piece of encoded data composed of many blocks each having a predetermined length unit and being constituted by at least bit distribution information, normalized data and quantized data, wherein for each of the blocks in which there occurs an excess portion equivalent to a difference between the predetermined length and a total value of the bit distribution information, the normalize data and the quantized data, a part or all of the generated sub information is superimposed onto the excess portion.

BRIEF DESCRIPTION OF THE DRAWINGS

These and other objects of the invention will be seen by reference to the description, taken in connection with the accompanying drawing, in which:

FIG. 6 illustrates the details of the data at the first byte shown in FIG. 5;

FIG. 8A shows an equation for obtaining the total number of bits SPsum to be used for spectrum data;

FIG. 8B shows an equation for obtaining the actual number of bits for use in encoding;

FIG. 8C shows an equation for obtaining encoding unused bit REM;

FIG. 15 illustrates an information relationship control table in the main server or the music server system shown in FIG. 1;

FIG. 18 illustrates control information (control codes) for use when there are three encoding unused bits;

DETAILED DESCRIPTION OF THE PREFERRED EMBODIMENTS

This invention will be described in further detail by way of example with reference to the accompanying drawings. In what follows, the description of the embodiments of the invention will be made by use of examples in which the present invention is applied to the corresponding portions of a music distribution system for distributing (or delivering) music data as digital content.

First Embodiment

Figure 1:
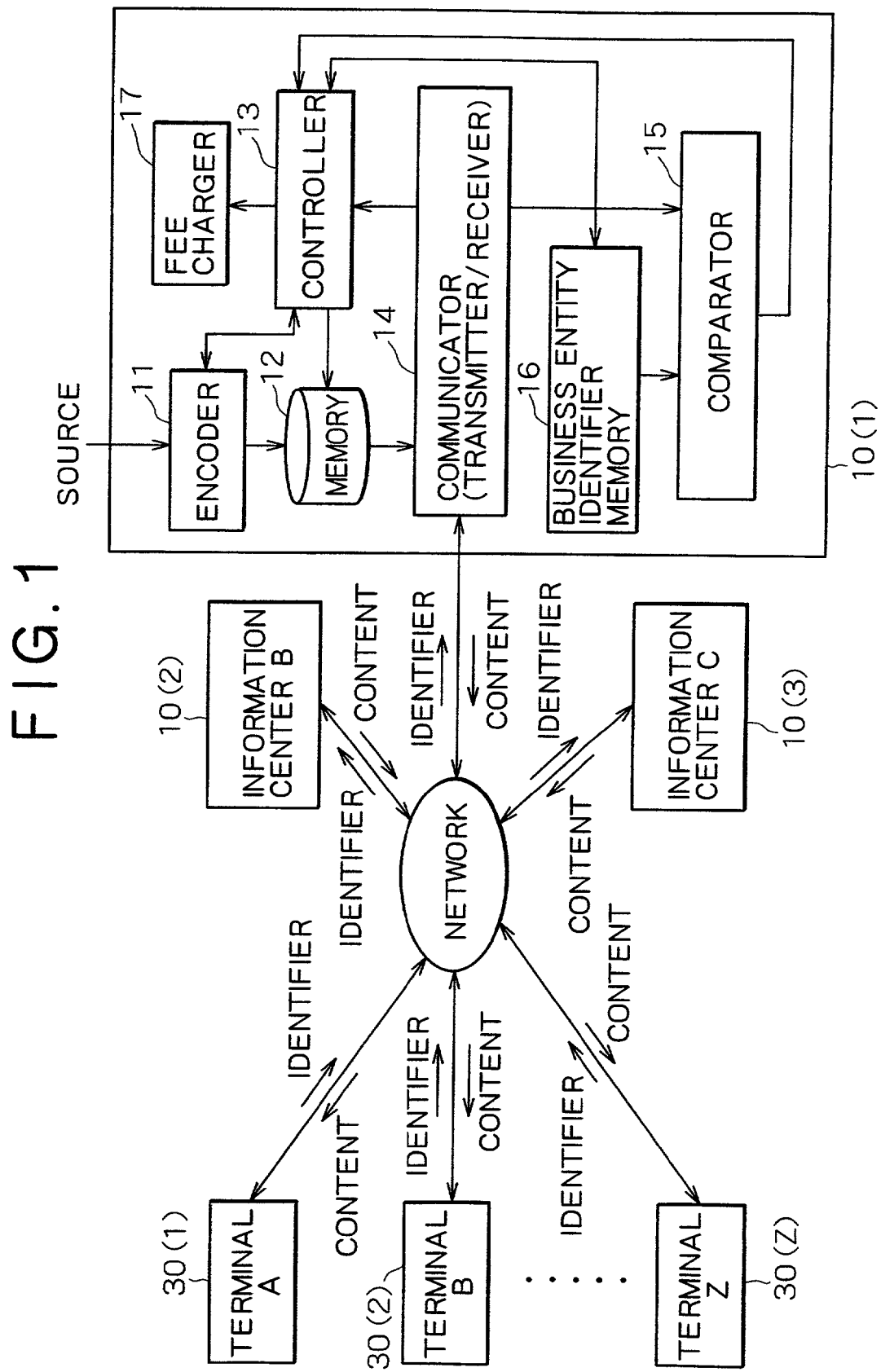
FIG. 1 is a block diagram illustrating the outline of a music distribution system and a main server according to the invention.
Figure 2:
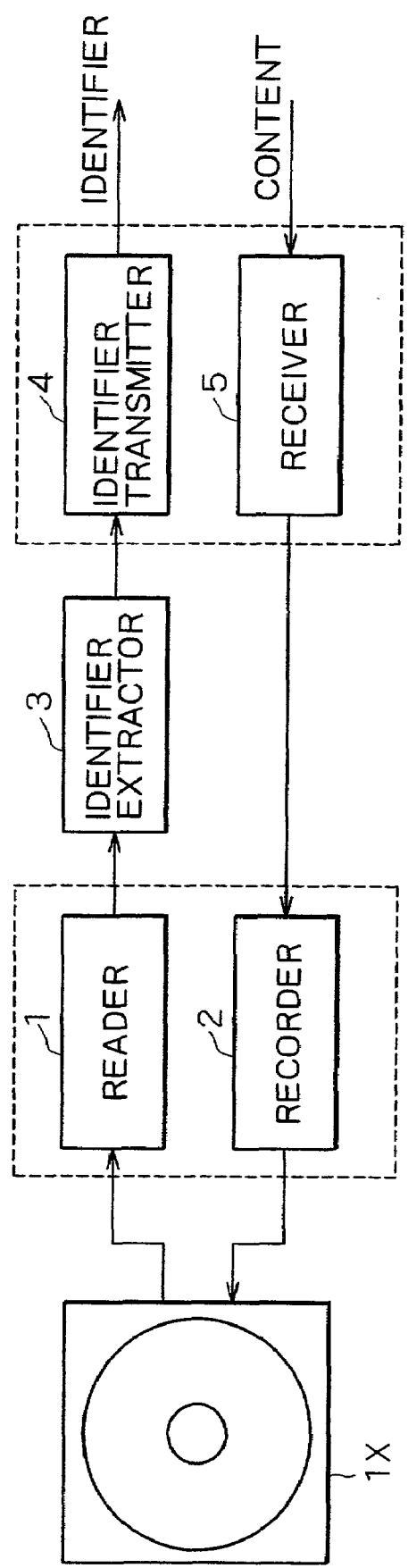
FIG. 2 is a block diagram illustrating the outline of a music server system according to the invention.

Outline of Music Distribution System:

First, a music distribution system practiced as a first embodiment of the invention will be outlined. Referring to FIG. 1, there is shown a block diagram illustrating the outlines of the music distribution system practiced as the first embodiment of the invention and the outline of the configuration of each main server. FIG. 2 is a block diagram illustrating the outline of the configuration of each music server system of the first embodiment.

The music distribution system according to the first embodiment includes a plurality of main servers (or information centers) 10(1), 10(2), 10(3) and so on and a plurality of music server systems (or terminals) 30(1), 30(2) through 30(Z) (Z being a positive integer) which are interconnected through a communication network as shown in FIG. 1.

Referring to FIG. 1, each of the main servers 10(1), 10(2), 10(3) and so on owns the rights such as music data distributorship and provides a server system of a so-called legitimate dealer (or distributor) who sells music data. Each main server provides music data to the music server systems 30(1), 30(2) and so on via a communication network and instructs these music server systems to delete obsolete or unpopular music data stored therein. Namely, each main server can manage many music server systems 30(1), 30(2) and so on.

The basic configuration of each of the main servers 10(1), 10(2), 10(3) and so on, managed by a different business entity for example, is that of the server system 10 (1) shown in FIG. 1. In order to distribute music data to the music server systems 30(1), 30(2) and so on, each of the main servers 10(1), 10(2), 10(3) and so on compresses an audio PCM (Pulse Code Modulation) signal, which is source data, by high-efficiency encoding through the encoder 11 and stores the resultant compressed music data (or encoded data) into a hard disk 12, which is an incorporated mass storage memory.

A controller 13 reads necessary music data from the hard disk 12 in each of the main servers 10(1), 10(2), 10(3) and so on and sends the retrieved music data to a corresponding music server system managed by the above-mentioned main server among many music server systems 30(1), 30(2) and so on through a communicator 14, thereby executing music data provision.

By sending a control signal formed by the controller 13 to the music server system managed by the above-mentioned main server through the communicator 14, the controller can control that music server system.

Each of the main servers 30(1), 30(2) through 30(Z) is installed at the store for example as will also be described and has a mass storage recording medium such as a hard disk which stores music data supplied from a predetermined main server among many main servers 10(1), 10(2), 10(3) and so on.

Then, under the condition that the user (or customer) accept the fee charging, each of the music server systems 30(1), 30(2) and so on reads the music data requested by the user from the mass storage recording medium and records the music data into a user's external recording medium such as MD or memory card, thereby achieving the music data distribution to the user.

In the first embodiment, each of the main servers 10(1), 10(3), 10(3) and so on attaches as sub information a business entity identifier at least capable of identifying the music data providing business entity to the music data compressed by high-efficiency encoding as described above and provides the music data attached with the sub information to the requesting music server system.

In this case, each of the main servers 10(1), 10(2), and so on attaches the sub information to the music data by use of the fact that the music data are high-efficiency encoded data, which will be detailed later, without newly arranging a particular area for attaching sub information in the compressed music data (encoded music data).

Then, in order to permit the movement of the music data from a particular recording medium of the user to another recording medium or the replacement of the music data recorded to a user's recording medium by the music data compressed by an upgraded high-efficiency encoding algorithm through the music server systems 30(1), 30(2) through 30(Z), when a user's external recording medium recorded with the target music data is carried in to any one of the music server systems, each of the music server systems extracts the business entity identifier, which is the sub information attached to the target music data.

The above-mentioned upgrading denotes the enhancement in the performance of high-efficiency encoding software and/or the enhancement in tone quality.

The music server system sends the extracted sub information to the main server which provides music data to this main server and the main server determines whether or not the music data stored in the user's external recording medium loaded in this music server system are those provided by this main server.

If the music data stored in the user's external recording medium loaded in the music server system are found those provided by this main server, then this main server controls the music server system in which the external recording medium is loaded, thereby providing new services such as moving the music data between recording media and replacing the music data stored in the user's external recording medium by the upgraded music data for example free of charge or at low cost.

In the music distribution system according to the first embodiment, the music data stored in a user's external recording medium through a music server system provided by the main server of another business entity and the music data stored in a user's external recording medium through a music server system provided by the own main server are surely and clearly distinguished therebetween. Only the music data provided by the own main server are subject to new services such as the movement between recording media and the upgrading of music data for example.

The following describes the above-mentioned extraction of sub information and the above-mentioned distinction between the music data provided by the main server of another business entity and the main server of the own business entity by use of information transfer between the music server system 30(1) and the main server 10(1) for example. As shown in FIG. 2, the music server system 30(1) includes a reader 1, recorder 2, an identifier extractor 3, an identifier transmitter 4, and a receiver 5. Through the reader 1, the music server system 30(1) reads the target music data from an external recording medium 1X loaded by a user and supplies the target music data to the identifier extractor 3.

The identifier extractor 3 extracts a business entity identifier which is sub information attached to the supplied music data and capable of identifying the business entity which is the provider of these music data. The business entity identifier extracted by the identifier extractor 3 is sent to the main server 10(1) which is the main server for that music server system, through the identifier transmitter 4.

The main server 10(1) receives a business entity identifier code and a service provision request such as a request for the movement of music data between recording media from the music server system 30(1) through the communicator 14. The received business entity identifier is supplied to a comparator 15 to be compared with the own business entity identifier stored in a business entity identifier memory 16. The comparison result obtained in the comparator 15 is sent to the controller 13.

If the comparison result from the comparator 15 indicates a match between the identifiers and the target music data recorded in the external recording medium 1X loaded in the music server system 30(1) are those supplied from the main server 10(1), then the controller 13 reads the target music data from the hard disk 12 in which various high-efficiency encoded music data are stored and sends the target music data to the music server system 30(1) which is the source of the business entity identifier, through the communicator 14.

At this moment, the music data (content) supplied from the main server 10(1) are received by the receiver 5 of the music server system 30(1) which is the transmission source of the business entity identifier, as shown in FIG. 2 to be recorded to the recording medium 1X or another recording medium through the recorder 2.

It should be noted that, in the case of the movement of music data between recording media, the music data recorded in the recording medium 1X are deleted by the operation of the recorder 2 for example. In the case of the version upgrading of music data, the newly provided music data are written over the target music data stored in the external recording medium 1X. Namely, in either case, the original music data recorded in the external recording medium 1X are deleted so as to be unavailable any further.

As described above, if fee charging is performed in the case of the movement of music data between recording media or the version upgrading of music data, a fee charging process is executed by a fee charger 17 on the main server side in the case of the music distribution system shown in FIG. 1.

To be more specific, if there is a match between the business entity identifiers in the comparison therebetween and music data are newly provided, an amount of fee for the new music data is computed by the fee charger 17 of the main server 10(1), the computed amount fee is sent to the music server system 30(1), the payment by the user is accepted through the music server system 30(1) or, if the main server 10(1) has the information which can identify users, the amount of fee is added up as account receivable, which will be billed later to receive the payment or settled through credit card or bank account. Namely, the actual fee charging process (settlement process) is managed by the main server 10(1).

It should be noted that, in the description of the outline of the music distributing system according to the first embodiment, if a match is found between the business entity identifiers, the music data which are target content data are provided from the main server to the music server system; it will be apparent that the main server may control the music server system to provide the music data from the mass storage memory device of the music server system.

It should also be noted that each of the main servers 10(1), 10(2) and so on can provide music data to customers through a dedicated music server system connectable only to the music server systems belonging to a group managed by each main server or through music server systems installed at various locations and shared by two or more business entities.

Accordingly, each of the music server systems 30(1), 30(2) through 30(Z) may be configured to receive the provision of music data only from a particular main server or receive the provision of music data from the main server systems of two or more business entities.

However, in what follows, for the brevity of description, it is assumed that each of the music server systems 30(1), 30(2) through 30(z) receive music data only from a predetermined particular main server and be controlled thereby.

High-Efficiency Encoding of Digital Audio Data:

The following describes a specific example of the high-efficiency encoding used in the encoder 11 of each of the main server 10(1), 10(2), 10(3) and so on shown in FIG. 1. The following also describes, on the basis of this specific example, the processing of attaching sub information to the encoded data (compressed music data) obtained by high-efficiency encoding.

It should be noted that the high-efficiency encoding based on ATRAC (Adaptive Transform Acoustic Coding) for use in digital audio data recorded on the MD widely used for music recording is used for example herein.

Figure 3:
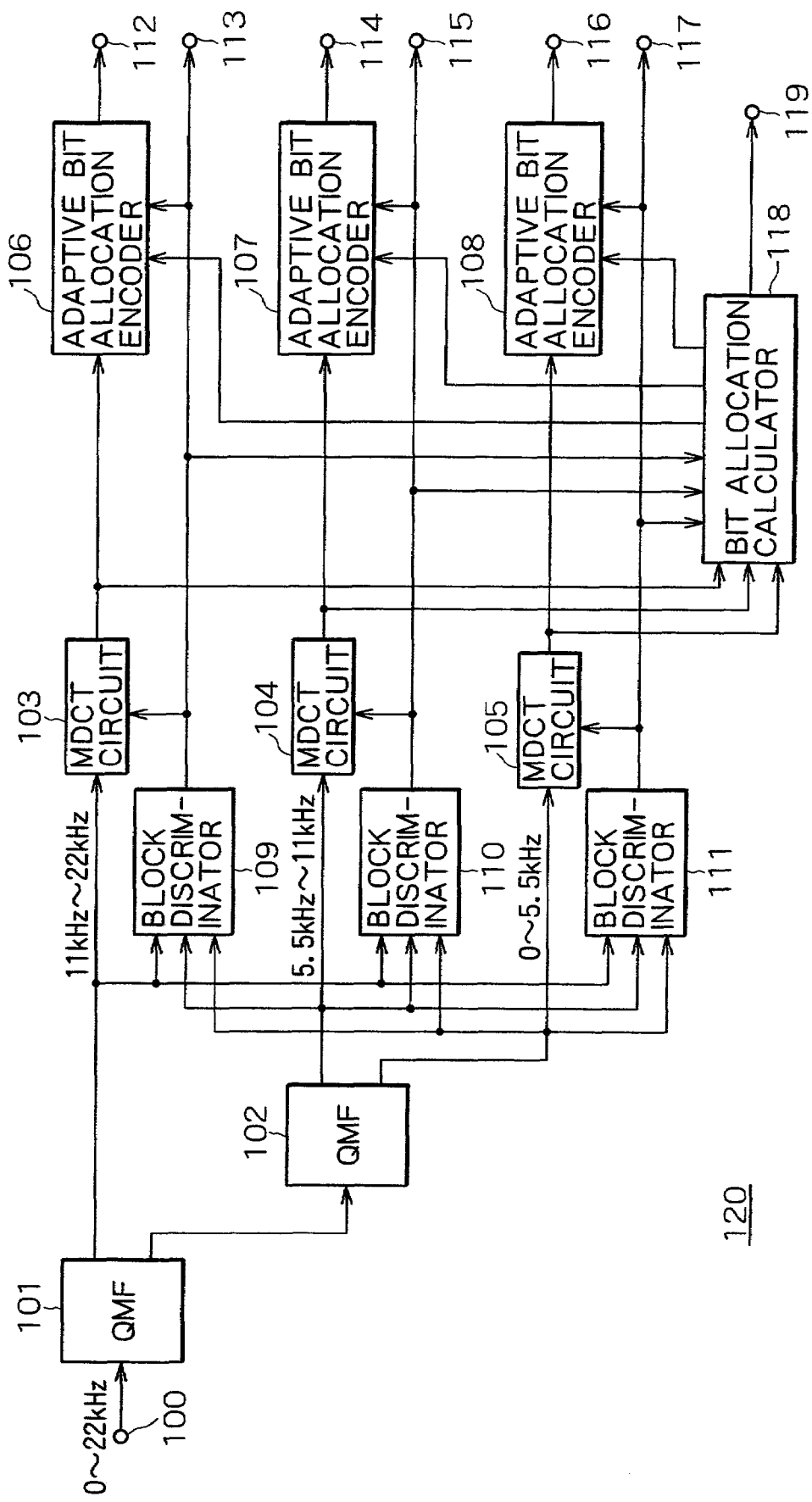
FIG. 3 is a block diagram illustrating an exemplary digital audio data high-efficiency encoding apparatus.

FIG. 3 is a block diagram illustrating an exemplary high-efficiency encoding apparatus for performing the high-efficiency encoding based on ATRAC on digital audio data. A high-efficiency encoding apparatus 120 shown in FIG. 3 is installed in the encoder 11 shown in FIG. 1.

The high-efficiency encoding apparatus 120 divides an input digital audio signal into plural frequency bands, performs orthogonal transform on each of the frequency bands, and, for the low frequency range, encodes the obtained frequency axis spectrum data by adaptive bit allocation for each so-called critical band considering the human auditory characteristics to be described later, and encodes the obtained frequency axis spectrum data by adaptive bit allocation for each of the bands obtained by dividing the critical band by considering block floating efficiency for middle and high frequency ranges.

Normally, a block on which this bit allocation is performed becomes a quantization noise generating block. Further, in the high-efficiency encoding apparatus 120 of the present embodiment, the block size (block length) subject to the bit allocation is adaptively varied in accordance with an input signal before orthogonal transform.

To be more specific, referring to FIG. 3, digital audio data (an audio PCM signal) of 0 to 22 KHz is supplied to an input terminal 100 when the sampling frequency is 44.1 KHz for example. This input signal is split by a band split filter 101 such as QMF (Quadrature Mirror Filter) for example into signals having 0 to 11 KHz band and 11 to 22 KHz band, the signal having 0 to 11 KHz is further split by a band split filter 102 such as QMF into signals having 0 to 5.5 KHz band and 5.5 to 11 KHz band.

The signal of 11 to 22 KHz band obtained by the band split filter 101 is supplied to an MDCT (Modified Discrete Cosine Transform) circuit 103 which is an exemplary orthogonal transform circuit, and, at the same time, to block discriminators 109, 110, and 111.

The signal of 5.5 to 11 KHz band from the band split filter 102 is supplied to the MDCT circuit 104 and, at the same time, to the block discriminators 109, 110, and 111. The signal of 0 to 5.5 KHz band from the band split filter 102 is supplied to the MDCT circuit 105 and, at the same time, to the block discriminators 109, 110, and 111.

On the basis of the supplied signals, the block discriminator 109 determines a block size and supplies the information representative of the determined block size to the MDCT circuit 103, an adaptive bit allocation encoder 106, a bit allocation calculator 118, and an output terminal 113.

Likewise, on the basis of the supplied signals, the block discriminator 110 determines a block size and supplies the information representative of the determined block size to an MDCT circuit 104, an adaptive bit allocation encoder 107, the bit allocation calculator 118, and an output terminal 115.

On the supplied signals, the block discriminator 111 determines a block size and supplies the information indicative of the determined block size to an MDCT circuit 105, an adaptive bit allocation encoder 108, the bit allocation calculator 118, and an output terminal 117.

Each of the block discriminators 109, 110, and 111 sets a block size (block length) in accordance with the time characteristic and frequency distribution of the supplied signals. Also, each of the MDCT circuits 103, 104, and 105 performs MDCT processing on the signal supplied from the QMF 101 or the QMF 102 under the block size supplied from each of the block discriminators 109, 110, and 111.

FIGS. 4A through 4D show the specific examples of the standard input signals for the blocks of the above-mentioned bands to be supplied to the MDCT circuits 103, 104, and 105. In these examples, the three filter output signals, namely the signal of 11 to 22 KHz band from the QMF 101 and the signal of 5.5 to 11 KHz band and the signal of 0 to 5.5 KHz band from the QMF 102 have plural orthogonal transform block sizes independent of each band, their time resolutions being switched by signal time characteristic and frequency distribution for example.

Figure 4A:
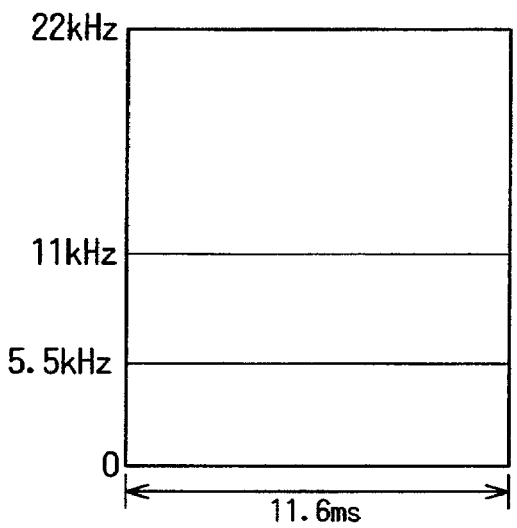
FIG. 4A illustrates a relationship between orthogonal transform block (long mode) length and frequency band in bit compression.

Namely, if the signal subject to orthogonal transform is a quasi-steady signal which does not present a drastic variation in time, the orthogonal transform block size is set to a large level of 11.6 ms, or the long mode shown in FIG. 4A. If this signal is a non-steady signal which drastically varies in time, the orthogonal transform block size is further divided by 2 or 4.

Figure 4B:
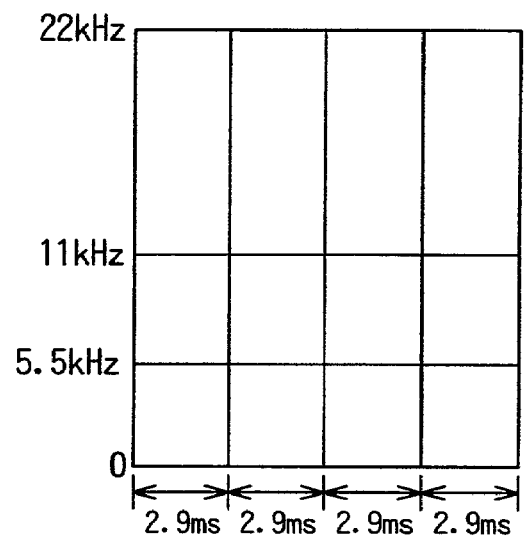
FIG. 4B illustrates a relationship between orthogonal transform block (short mode) length and frequency band in bit compression.
Figure 4C:
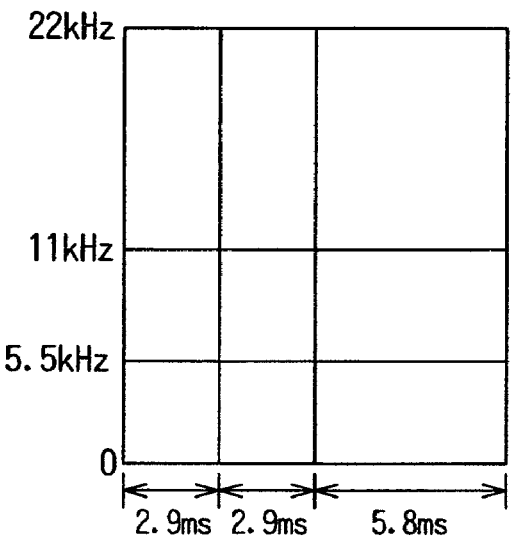
FIG. 4C illustrates a relationship between orthogonal transform block (middle mode A) length and frequency band in bit compression.
Figure 4D:
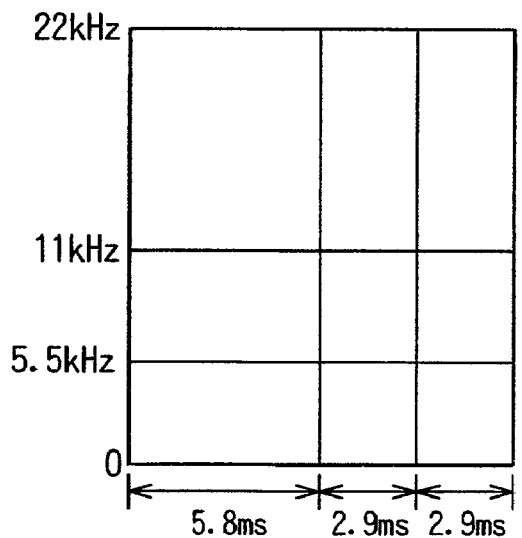
FIG. 4D illustrates a relationship between orthogonal transform block (middle mode B) length and frequency band in bit compression.

Therefore, if the signal is a non-steady signal, as with the short mode shown in FIG. 4B, all orthogonal transform block sizes are divided by 4 to 2.9 ms or, as with the middle mode A shown in FIG. 4C and the middle mode B shown in FIG. 4D, some block sizes are divided by 2 into a time resolution of 5.8 ms and others by 4 into a time resolution of 2.8 ms, thereby providing adaptation to actual complicated input signals. If the scale of the processor concerned permits, this orthogonal block size division may be further divided for more effective processing.

Referring to FIG. 3, the spectrum data on frequency axis or MDCT coefficient data obtained by MDCT processing in each of the MDCT circuits 103, 104, and 105 are supplied to the adaptive bit allocation encoders 106, 107, and 108 and the bit allocation calculator 118 with the low range put together for each critical band and with the middle and high frequency ranges considered with the effectiveness of block floating.

The critical band as used herein denotes a frequency band obtained by dividing a band by considering the human auditory characteristics; to be more specific, the critical band is a band of a noise given at the time when a pure tone is masked by a narrow-band noise having the same intensity as the pure tone in the frequency proximity thereof. This critical band becomes wider toward the high frequency range and the overall frequency band of 0 to 22 KHz is divided into 25 critical bands for example.

Referring to FIG. 3, by considering a so-called masking effect for example on the basis of the information indicative of block size and the spectrum data or MDCT coefficient data, the bit allocation calculator 118 calculates a masking quantity for each divided band with the above-mentioned critical band and block floating considered and an energy and a peak value for example for each divided band. On the basis of the obtained values, the bit allocation calculator 118 obtains the number of allocation bits for each band and supplies the obtained values to the adaptive bit allocation encoders 106, 107, and 108.

The adaptive bit allocation encoders 106, 107, and 108 re-quantize (normalize and then quantize) the spectrum data or MDCT coefficient data in accordance with the number of bits allocated for each divided band with the information indicative of block size and the critical band and the block floating considered.

The resultant encoded data (or quantized data) are outputted through the output terminals 112, 114, and 116 as shown in FIG. 3 to be supplied to a processing system for recording the data to a recording medium and a processing system for transmitting digital audio data from the main server 10 to the music server system 30 for example. It should be noted that, in what follows, each divided band with critical band and block floating considered providing a unit of bit allocation is referred to as a unit block.

The bit allocation calculator 118 shown in FIG. 3 analyzes the status of tone component for example on the basis of spectrum data or MDCT coefficient data and calculates a bit allocation quantity for each unit block by considering a so-called masking effect and existing effects such as the lowest audible curve and equal loudness curve associated with human auditory sense, thereby determining information distribution. At this time, the above-mentioned information indicative of block size is also considered.

The bit allocation calculator 118 also determines a scale factor value which is the normalized data indicative of the status of block floating of unit block. To be more specific, several positive values are prepared as scale factor value candidates for example and the value which is the lowest among those higher than the maximum value of the absolute value of the spectrum data or MDCT coefficient data is selected from those candidates as the scale factor value of that unit block.

The scale factor values are numbered by use of several bits in correspondence with actual values and these numbers may be stored in a ROM (Read Only Memory) for example, not shown. The scale factor values corresponding to the numbers are specified beforehand so that they have values at the intervals of 2 dB for example. For a scale factor value determined by the above-mentioned method in a certain unit block, the number corresponding to the determined value is used as sub information indicative of the scale factor of that unit block.

Figure 5:
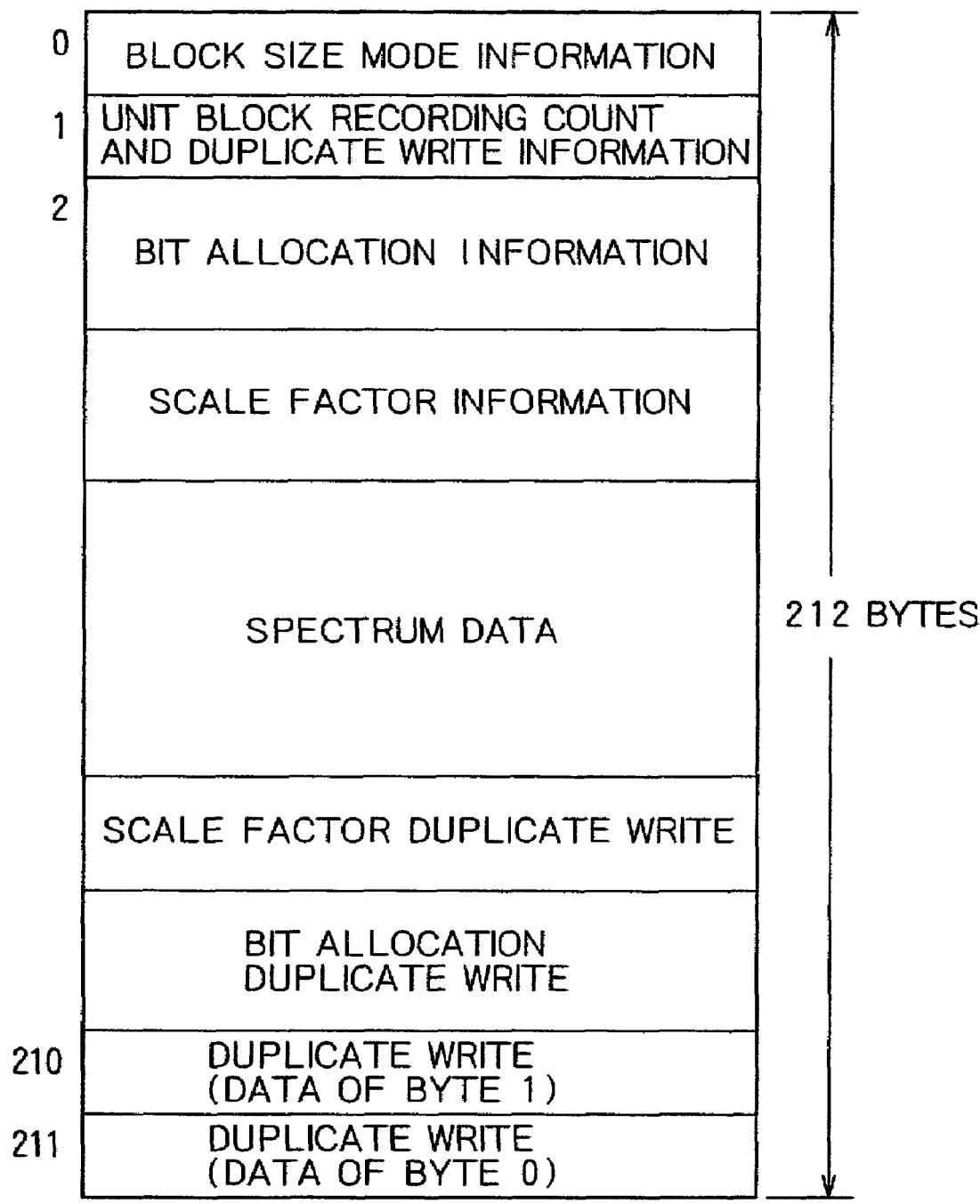
FIG. 5 illustrates a high-efficiency encoding format.

High-Efficiency Encoding Format of Digital Audio Data:

The following describes an encoding format which is the format of actually encoded digital audio data with reference to FIG. 5. Referring to FIG. 5, the values shown on the left side and the right side represent the number of bytes. In the present embodiment, 212 bytes constitute one frame (one sound frame).

Referring to FIG. 5, the block size information for each band determined by the block discriminators 109, 110, and 111 shown in FIG. 3 is recorded to the position of byte 0.

At the position of byte 1, the information about the number of unit blocks to be recorded is recorded. This recording is made because, as the high frequency range is reached, bit allocation becomes 0 due to the series of bit allocation calculators for example, thereby often making the recording unnecessary; therefore, the number of recorded unit blocks is set accordingly to distribute many bits in the medium to low frequency ranges in which the effects of human auditory sense is significant.

The position of byte 1 is also recorded with the number of unit blocks in which bit allocation information is duplicatively written and the number of unit blocks in which scale factor information is duplicatively written. The duplicate writing records the same data as the data recorded at a certain byte position to another position for error correction. As the duplicate writing information increases, the resistance to error increases; as the duplicate writing information decreases, the number of bits usable for spectrum data which are actual digital audio data increases.

In the present embodiment, the resistance to error and the number of bits usable for spectrum data are adjusted by setting the number of duplicatively written unit blocks independently for the above-mentioned bit allocation information and scale factor information. It should be noted that, for each information, the correspondence between each code in specified bits and the number of unit blocks is predetermined as a format.

FIG. 6 shows one example of the contents of the information recorded in the 8 bits at the position of byte 1 shown in FIG. 5. As shown in FIG. 6, 3 bits of the 8 bits at the position of byte 1 provide the information about the number of unit blocks to be actually recorded, 2 bits of the remaining 5 bits provide the information about the number of unit blocks in which bit allocation information is duplicatively written, and the remaining 3 bits provide the information about the number of bits in which scale factor information is duplicatively written.

At the position of byte 2 shown in FIG. 5, unit block bit allocation information is recorded. For the recording of bit allocation information, a format is specified beforehand in which 4 bits for example are used for one unit block. Consequently, the pieces of bit allocation information for the number of unit blocks to be actually recorded as shown in FIG. 5 are sequentially recorded starting with the unit block at the position of byte 0.

The data of the bit allocation information recorded as described above are followed by unit block scale factor information. For the recording of scale factor information, a format is specified beforehand in which 6 bits for example are used for one unit block. Consequently, as with the recording of bit allocation information, the pieces of scale factor information for the number of unit blocks to be actually recorded are sequentially recorded starting with the unit block at the position of byte 0.

The sale factor information is followed by unit block spectrum data (or quantization data). The spectrum data are also sequentially recorded for the number of unit blocks to be actually recorded, starting with the unit block at the position of byte 0. How many pieces of spectrum data are given for each unit block is predetermined in the format, so that the data correspondence can be provided by the above-mentioned bit allocation information. It should be noted that any unit blocks for which no bit is allocated are not recorded.

The spectrum information is followed by the above-mentioned duplicate writing of scale factor information and duplicate writing of bit allocation information. The recording of these information is performed in generally the same method as the above-mentioned recording of scale factor and bit allocation information except that the number of unit blocks is related to the duplicate writing information shown in FIG. 6.

For the last 2 bytes, the information at byte 0 and the information at byte 1 are duplicatively written respectively as shown in FIG. 5. The duplicate writing for these 2 bytes is specified as format beforehand, so that the quantity of duplicate writing is not variable unlike the duplicate writing of scale factor information and bit allocation information.

Namely, in the bit allocation calculator 118 shown in FIG. 3, as main data, the data obtained by processing orthogonal transform output spectrum by sub information are obtained and, sub information, a scale factor indicative of the status of block floating and a word length are obtained. On the basis of these information, re-quantization is actually performed in the adaptive bit allocation encoders 106, 107, and 108 to perform encoding in accordance with the encoding format.

In the present embodiment, high-efficiency encoded digital data are provided to each music server system in the encoded format described above with reference to FIG. 5, stored in the music server system, and, on demand by user, recorded to a user's external recording medium such as MD.

Figure 7:
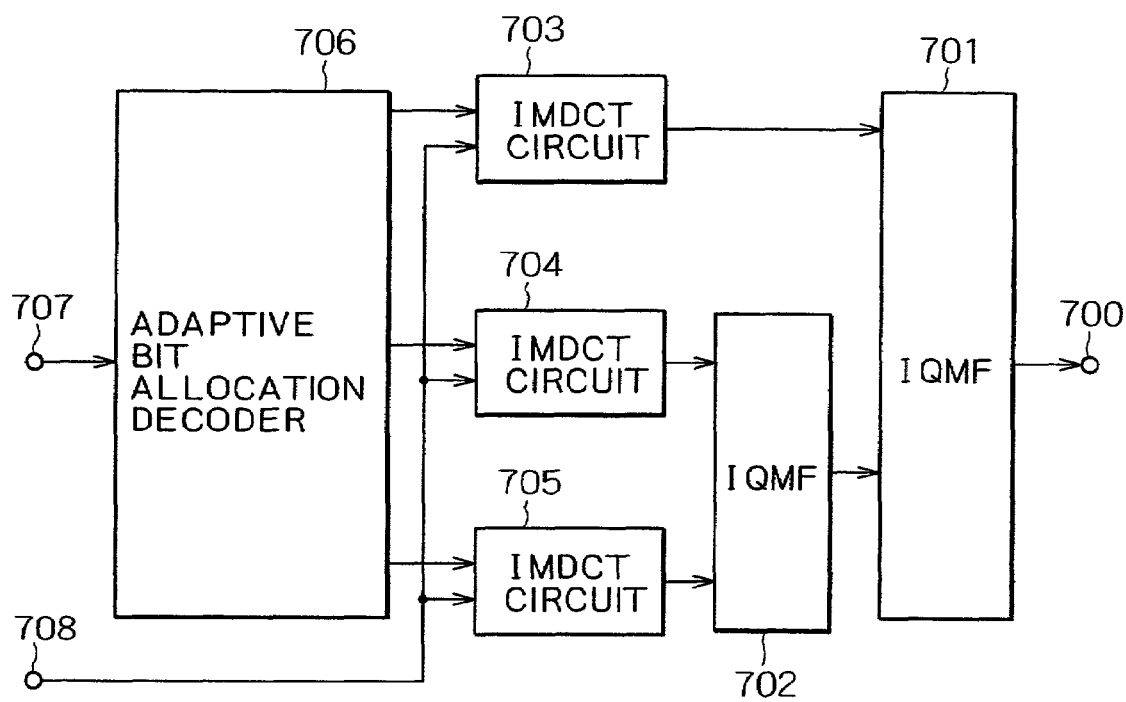
FIG. 7 is a block diagram illustrating an exemplary high-efficiency encoding decoder for decoding digital audio data encoded by the high-efficiency encoding apparatus shown in FIG. 3.

Decoding of High-Efficiency Encoded Digital Audio Data:

The following describes the decoding of the digital audio data which are high-efficiency encoded as described above. FIG. 7 is a block diagram illustrating a decoder for decoding the digital audio data encoded by the above-mentioned high-efficiency encoding apparatus 120 described with reference to FIG. 3. This decoder is installed on the music server systems 30(1), 30(2) through 30(Z) and high-efficiency encoded data reproducing apparatuses such as MD players for example.

The quantized MDCT coefficient for each band, namely the data (spectrum data) equivalent to the output signals from the output terminals 112, 114, and 116 shown in FIG. 3 are supplied to the adaptive bit allocation decoder 706 via a decoder input terminal 707 as shown in FIG. 7. The used block size information, namely the data equivalent to the output signals from the output terminals 113, 115, and 117 shown in FIG. 3 are supplied to inverse modified discrete cosine transform (IMDCT) circuits 703, 704, and 705 via an input terminal 708.

The adaptive bit allocation decoder 706 clears the bit allocation of the supplied spectrum data by use of adaptive bit allocation information and supplies the resultant data to the IMDCT circuits 703, 704, and 705 to which the spectrum data of high, middle, and low frequency bands correspond. The IMDCT circuits 703, 704, and 705 perform inverse orthogonal transform on the spectrum data which are a signal on frequency axis, thereby obtaining a signal on time axis.

The time axis signal of each band is supplied to inverse quadrature mirror filters (IQMFs) 702 and 701 shown in FIG. 7. These filters synthesize the supplied time axis signals to decode the signals into digital audio data of all-band signal.

As described, the high-efficiency encoded digital audio data undergo the steps of bit allocation decoding, IMDCT, and band synthesis to be decoded into the original digital audio data as they were before high-efficiency encoding. Then, the decoded audio data are reproduced for sounding.

Also, in an MD recording/reproducing apparatus which uses an MD as a recording medium, the high-efficiency encoding of audio data and the decoding of high-efficiency encoded audio data are performed in generally the same manner as described above.

Specific Method of Attaching Sub Information to Encoded Data:

The following describes a specific method of attaching sub information such as business entity identification code to music data which are encoded data having the format shown in FIG. 5 by means of the high-efficiency encoding based on ATRAC. This method has been realized by use of the fact that encoded data become the data having the predetermined format shown in FIG. 5.

As described with reference to FIG. 5, the size of data for one frame which provides the minimum unit of encoded data is 212 bytes or 1696 bits. Depending on frames, bits which are not used in actually encoding and decoding may occur (these bits are referred to as encoding unused bits). These encoding unused bits are embedded in the sub information.

First, a process in which encoding unused bits are generated will be described by use of an example in which bit allocation information and scale factor information are not duplicatively written. Portions which are regularly generated in encoding include block size mode information (byte 0) in one frame of encoded data, the number of recorded unit blocks and duplicate writing information (byte 1), and information about the duplicate writing of these information (byte 210 and byte 211). A total of 4 bytes or 32 bits, namely byte 0, byte 1, byte 210, and byte 211, are always used.

As described, the information shown in FIG. 6 is recorded to byte 1 of one frame of encoded data shown in FIG. 5. It is assumed here that the number of unit blocks indicated by the recorded information be M.

At this moment, the number of bits for use in bit allocation information is 4×M because the number of bits for use in one unit block is 4. It should be noted that symbol "×" as used herein denotes the notation of multiplication. Likewise, the number of bits for use in scale factor information is 6×M because the number of bits for use in one unit block is 6.

The number of bits for use in spectrum data is obtained as follows. Let the number of spectrum data of k-th unit block be SPk and the bit allocation count of k-th unit block be WLk, then a total number of bits SPsum for use in spectrum data is obtained from equation (1) shown on FIG. 8A.

If audio PCM data for one sound frame are encoded and let the actual number of bits for use in encoding be Bsum, then Bsum is obtained from equation (2) shown in FIG. 8B on the basis the number of bits necessary for each of the above-mentioned information.

The number of unit blocks M and the bit allocation count WLk of k-th unit block are calculated for each frame. The number of spectrum data SPk of k-th unit block depends on the number of each unit block. Therefore, the actual number of bits Bsum for use in encoding does not always match 1696 bits, the size of one frame. The remainder generated at this time becomes an encoding unused bit. Let the remainder be REM, then encoding unused bit REM is obtained from equation (3) shown in FIG. 8C.

Figure 9:
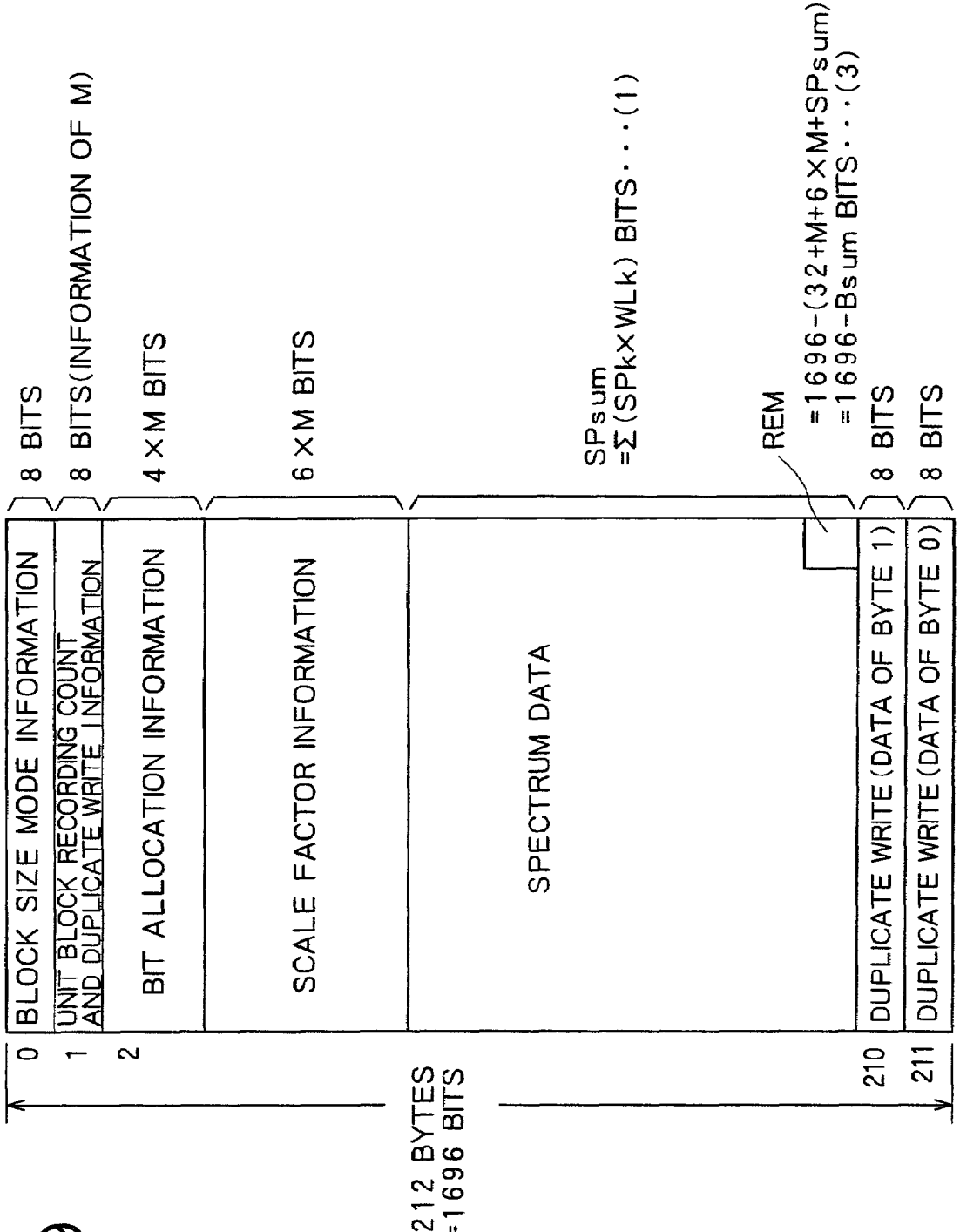
FIG. 9 illustrates a portion of generating encoding unused bits (a fractional portion) which are generated in encoded data formed by the high-efficiency encoding apparatus shown in FIG. 3.

FIG. 9 shows how encoding unused bit REM exists in one frame of encoded data. As shown in FIG. 9, encoding unused bit REM occurs in the last portion of an area to which spectrum data are recorded.

Generally, bits are allocated to unit blocks as far as possible by the bit allocation calculator 118 in the high-efficiency encoding apparatus 120 shown in FIG. 3, so that the value of encoding unused bit REM often becomes less than the minimum value of the number of spectrum data SPk of k-th unit block shown in a format. Hence, if the number of spectrum data SPk of unit block is not more than the minimum value of 8, then it is highly probable for encoding unused bit REM to appear in the last portion of byte 209 of one frame of encoded data as shown in FIG. 9.

If an encoding unused bit REM occurs in a frame, sub information such as business entity identifier (business entity code) is embedded in the portion of the occurrence. Thus, sub information is attached to the unused portion (or remaining bits) in an area allocated to the original format without arranging a new area for the attachment in encoded data, so that sub information can be attached to encoded data without changing the absolute quantity of the encoded data.

Further, as described above, the attachment of sub information to encoded data is performed immediately after high-efficiency encoding on the side of the main server 10.

Figure 10:
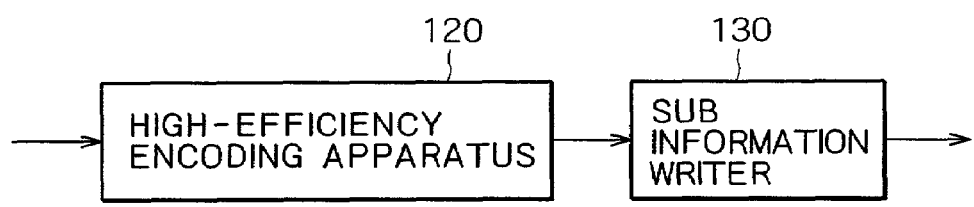
FIG. 10 is a block diagram illustrating a configuration of an encoder of the main server shown in FIG. 1.

FIG. 10 shows the attachment of sub information to encoded data by the sub information writer 130.

Referring to FIG. 10, the high-efficiency encoding apparatus 120 is that shown in FIG. 3. The sub information writer 130 is arranged as shown in FIG. 10 at the rear stage of the high-efficiency encoding apparatus 120. Namely, in the present first embodiment, the configuration of the encoder 11 of the main server 10(1) shown in FIG. 1 is as shown in FIG. 10.

As described with reference to FIG. 3, the data outputted from the output terminals 112 through 117 of the high-efficiency encoding apparatus 120 provide one frame of information shown in FIG. 5 to be supplied to the sub information writer 130.

The bit allocation calculator 118 of the high-efficiency encoding apparatus 120 having the configuration shown in FIG. 3 performs calculations in accordance with the equations shown in FIGS. 8A, 8B, and 8C by use of various information supplied to the bit allocation calculator 118 to detect an encoding unused bit REM in each frame of the encoded data. The information indicative of the detected encoding unused bit REM is outputted from an output terminal 119 as shown in FIG. 3 to be supplied to the subsequent sub information writer 130.

On the basis of the information indicative of encoded unused bit REM supplied from the high-efficiency encoding apparatus 120, the sub information writer 130 shown in FIG. 10 determines checks the frames of spectrum data supplied thereto for any frame in which an encoding unused bit REM occurred. Then, the sub information writer 130 attaches sub information to the portion of the frame in which the REM occurred in accordance with the number of REMs.

Figure 11:
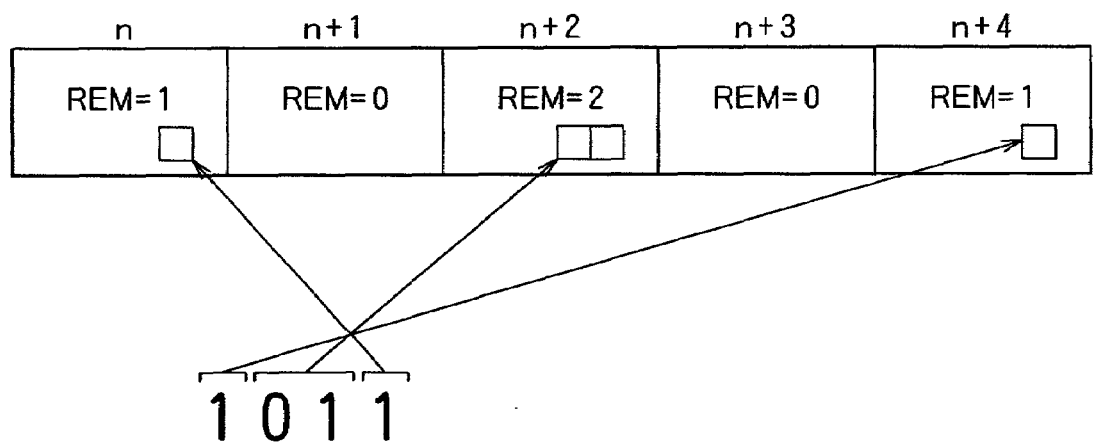
FIG. 11 illustrates a status of adding sub information to the encoding unused bits (a fractional portion) of the encoded data encoded in the encoder shown in FIG. 10.

FIG. 11 shows an image of writing sub information to be performed by the sub information writer 130 shown in FIG. 10. Shown in FIG. 11 is an example in which 4-bit sub information "1011" is stored sequentially from the least significant bit into n and subsequent frames of encoded data.

It is assumed as shown in FIG. 11 that the values of the encoding unused bits REM supplied from the high-efficiency encoding apparatus 120 be 1, 0, 2, 0, and 1 sequentially from n-th frame and encoding unused bits occur in n-th frame, (n+2)-th frame, and (n+4)-th frame.

In this case, first in the n-th frame, the bit allocation calculator 118 determines that the value of encoding unused bit REM is 1, which is supplied to the sub information writer 130, so that, on the basis of the supplied REM value, the sub information writer 130 records the least significant bit of the sub information to the encoding unused bit portion of the n-th frame.

In the (n+1)-th frame, the bit allocation calculator 118 shown in FIG. 3 determines that the value of encoding unused bit REM is 0, so that the sub information writer 130 does not record the sub information. Likewise, in the (n+2)-th frame, the value of encoding unused bit REM supplied from the bit allocation calculator 118 of the high-efficiency encoding apparatus is 2, so that the sub information writer 130 records 2-bit sub information to the encoding unused bits of the (n+2)-th frame.

In the (n+3)-th frame, the bit allocation calculator 118 shown in FIG. 3 determines that the value of encoding unused bit REM is 0, so that the sub information writer 130 does not record the sub information. In the (n+4)-th frame, the value of the encoding unused bit REM supplied from the bit allocation calculator 118 of the high-efficiency encoding apparatus is 1, so that the sub information writer 130 records 1 bit sub information to the encoding unused bit in the (n+4)-th frame.

Consequently, writing the sub information to the 3 frames in which encoding unused bits occur among the 5 frames allows the attachment of 4-bit sub information to the encoded data. In this example, the attachment of 4 bit sub information is used for example; it will be apparent that sub information of more bits may be attached in accordance with the number of frames. Moreover, if a frame with which the recording of sub information is performed is determined beforehand, this sub information may be extracted from the sequence of created frames.

Figure 12:
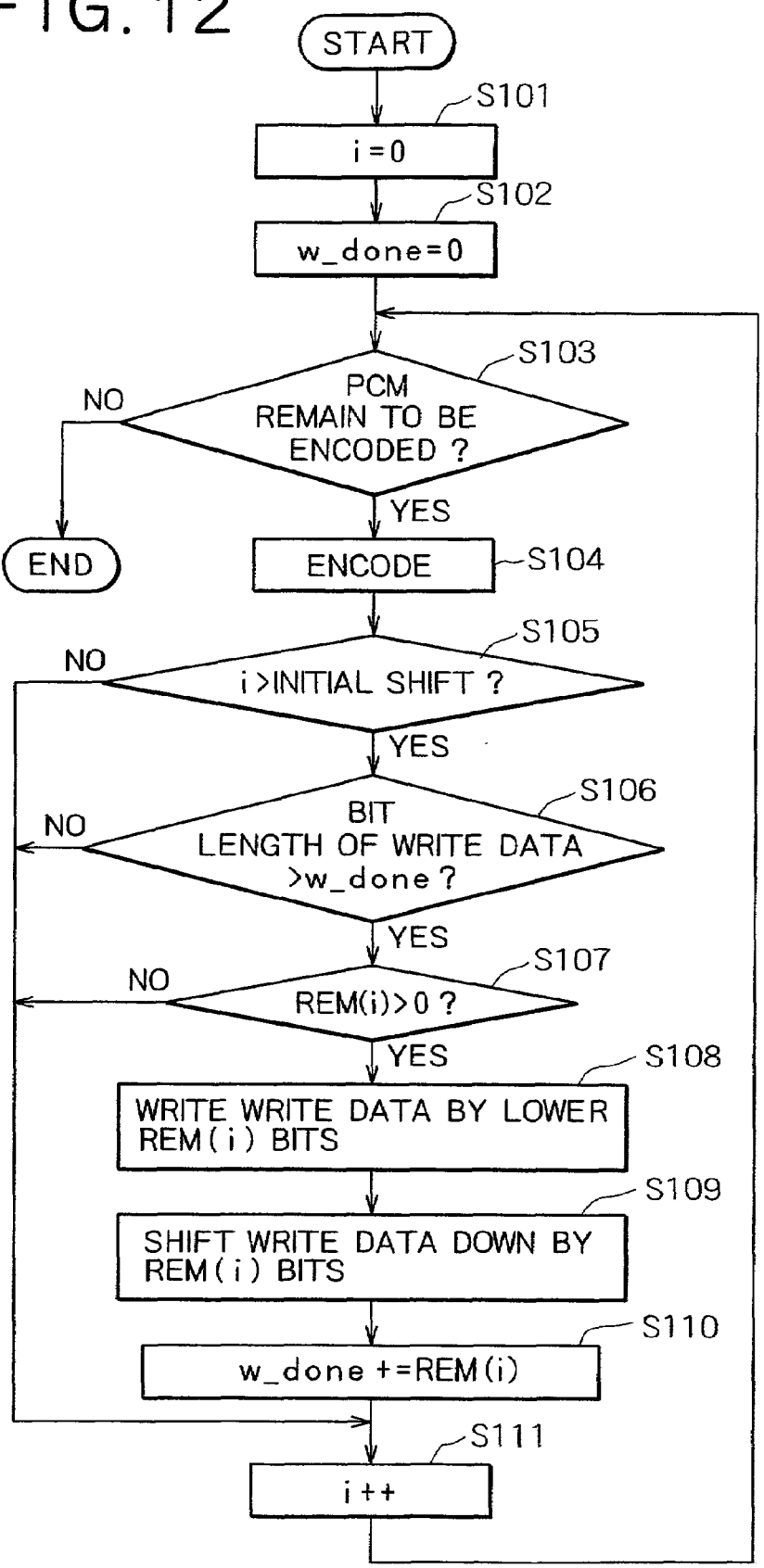
FIG. 12 is a flowchart describing the processing of adding sub information to the encoded data encoded in the encoder shown in FIG. 10.

Processing in the Encoder 11:

The following describes the details of the operations of the high-efficiency encoding apparatus 120 and the sub information writer 130 shown in FIG. 10 with reference to the flowchart shown in FIG. 12. In this flowchart, variable i denotes a counter value indicative of a frame number. Variable w_done denotes a value indicative of how many bits of sub information has been written, namely the number of recorded sub information bits. Encoding unused bit REM(i) denotes the value of the encoding unused bit REM in the i-th frame.

The processing shown in FIG. 12 starts in the high-efficiency encoding apparatus 120 and the sub information writer 130 when high-efficiency encoding on audio PCM data starts. First, in the sub information writer 130, variable i is initialized to 0 (step S101) and variable w_done is initialized to 0 (step S102).

Next, the high-efficiency encoding apparatus 120 determines whether there still remain audio PCM data to be encoded (step S103). In step S103, if audio PCM data are processed every 512 samples for example, the high-efficiency encoding apparatus 120 monitors how many samples of the source audio PCM file have been processed to determine whether the audio PCM data subject to high-efficiency encoding have all been processed.

If the audio PCM data subject to high-efficiency encoding are found all processed in step S103, then the processing shown in FIG. 12 comes to an end. On the contrary, if the audio PCM data subject to high-efficiency encoding are found not all processed, then the high-efficiency encoding apparatus 120 executes the high-efficiency encoding on the remaining audio PCM data (step S104).

In the high-efficiency encoding to be executed in step S104, the high-efficiency encoding apparatus 120 forms the encoded data shown in FIG. 5 and, at the same time, computes the encoding unused bit REM(i) for each frame. Subsequently, the sub information writer 130 determines whether variable i is greater than a predetermined initial shift (step S105) for example. The initial shift is a value predetermined at the recording of sub information, which denotes a shift for determining a frame with which the recording (or attachment) of sub information starts.

If the specified frame is found not reached in step S105, then variable i is incremented (step S111), after which the processing is repeated from step S103. It should be noted that the incrementing of variable i in step S111 denotes the incrementing of the number of frames. In FIG. 12, notation i++ in step S111 denotes the incrementing of variable i.

If the specified frame is found reached in step S105, then it is determined whether the bit length of write data (or sub information) is greater than variable w_done (step S106). The processing of step S106 determines whether the sub information has all been attached; to be exact, this step determines how many bits of sub information has been recorded.

If the sub information is found all attached, namely the bit length of write data is found not greater than variable w_done, it indicates that all of the sub information has been written, upon which the procedure goes to step S111 to increment variable i. Subsequently, the processing is repeated from step S103.

In FIG. 12, the decision process of step S106 is always executed. However, if the decision is NO in step S106, namely the sub information is found all attached, then a flag may be set up to subsequently prevent the procedure from going to steps S107 and on, which are associated with the writing of sub information.

If the sub information is found not all attached in step S106, namely the bit length of the write data is found greater than variable w_done, then it is determined whether encoding unused bit REM(i) is greater than 0 (step S107). The decision process of step S107 determines whether an encoding unused bit has actually occurred as described with reference to FIG. 9.

If encoding unused bit REM(i) is found 0, namely no encoding unused bit is found occurring in step S107, it indicates that no sub information can be written, so that the procedure goes to step S111 to increment variable i, upon which the processing is repeated from step S103.

If encoding unused bit REM(i) is found not 0 in step S107, namely an encoding unused bit is found occurring, then the data for the lower REM(i) of the sub information are written to the encoding unused bit portion of the frame of the encoded data supplied from the high-efficiency encoding apparatus 120 (step S108).

Next, the write data of the sub information after the writing are shifted by REM(i) in the down direction (step S109). Namely, the written sub information is prevented from being written again. In the example shown in FIG. 12, the write data are written to the encoded unused bit portion of the encoded data always starting with the least significant bit in steps S108 and S109. However, it will be apparent that, if integrity is secured, the write data may be written starting with any other bits.

Subsequently, encoded unused bit REM(i) is added to variable w_done as the number of processed bits (step S110) and variable i is incremented (step S111), upon which the processing is repeated from step S103. Thus, the sub information is attached by the sub information writer 130 to the encoded data formed by the high-efficiency encoding apparatus 120.

As described, this sub information includes the business entity identifier (identification code) of a business entity which supplies these encoded data and the identifier (music identifier) for the encoded data which are music data. Detection of the sub information attached to the encoded data surely allows the discrimination of the business entity which is the supplier of these encoded data as well as the discrimination of the music data.

In the method shown in FIG. 12, the sub information is recorded to the encoded data only once. However, a different arrangement may be made that, after recording all sub information once, the same sub information be recorded again or different sub information be recorded by a same method for example. In this case, i providing a frame number with which recording started and the type of sub information may be outputted in the form of a so-called log for example, thereby outputting a table file indicative of a frame with which the recording of the sub information starts and the number of bits recorded to this and subsequent frames.

If the information about the above-mentioned table file is managed by the music server systems 30 as a detection frame of the database information for executing distribution business, the table file information may be available for the detection of sub information.

By use of the method described above, sub information can be recorded into encoded data. The recorded sub information may be sequentially extracted by identifying the starting frame by use of the above-mentioned predetermined initial shift and the detection frame number and so on recorded to the database of the music server systems 30(1), 30(2) through 30(Z) and, on the basis of the starting frame, using the above-mentioned method of calculating encoding unused bit REM.

It should be noted that the sub information is attached to the encoding used bit as described above, so that the sub information does not affect in any manner the audio PCM data generated by executing decoding by the decoder described with reference to FIG. 7.

The sub information to be attached to the encoded data, which are music data, may include a business entity identifier indicative of the supplier of the encoded data concerned, an identifier indicative of the producer of these encoded data, an encoded data identifier (music identifier) for identifying individual encoded data, and other various necessary information.

Thus, in attaching plural pieces of various information, if the number of digits of each piece of sub information is known beforehand, the plural pieces of sub information may be separated from each other by the known number of digits. Otherwise, for the separation of plural pieces of sub information, a particular code, a separation code which handles several digits all as "1" for example, may be attached to each piece of sub information.

Figure 13:
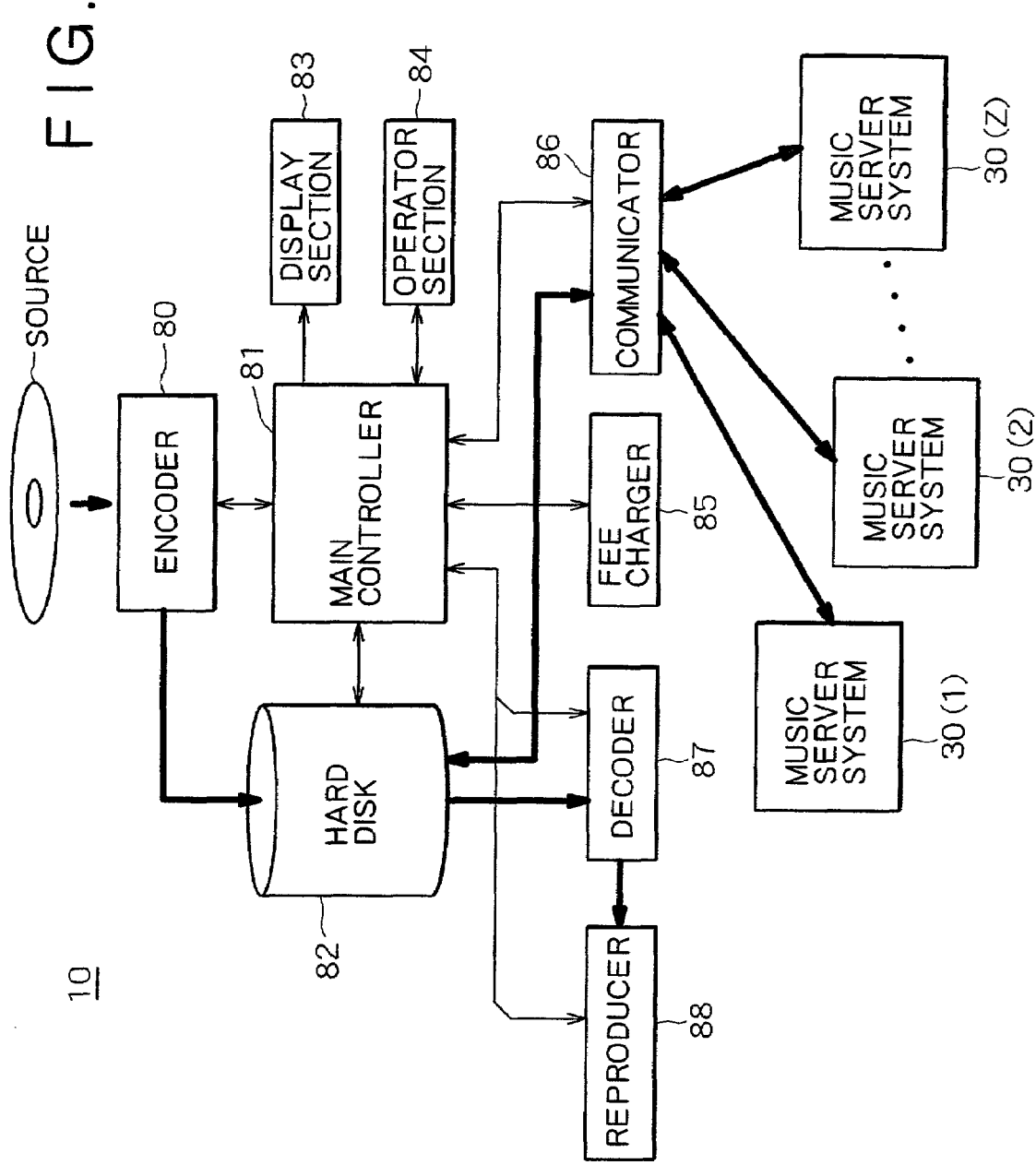
FIG. 13 is a block diagram illustrating a specific exemplary configuration of the main server shown in FIG. 1.

Specific Example of Main Server:

The following describes a specific example of the main servers 10(1), 10(2), 10(3) and so on shown in FIG. 1 as a main server 10, which is equivalent to a database server on the distributor side. FIG. 13 is a block diagram illustrating an exemplary configuration of the main server 10. As shown, the main server 10 includes an encoder 80, a main controller 81, a hard disk 82, a display section 83, an operator section 84, a fee charger 85, a communicator 86, a decoder 87, and a reproducer 88.

Referring to FIG. 13, the encoder 80 is equivalent to the encoder 11 of the main server 10(1) shown in FIG. 1 and includes the high-efficiency encoding apparatus 120 and the sub information writer 130 as shown in FIG. 10. The high-efficiency encoding apparatus 120 has the configuration as shown in FIG. 3, in which the high-efficiency encoding apparatus 120 and the sub information writer 130 cooperates to execute the processing shown in FIG. 12 under the control of the main controller 81 to perform high-efficiency encoding on audio PCM signals, thereby attaching sub information such as a business entity identifier to the encoded data formed by high-efficiency encoding.

The encoder 80 performs high-efficiency encoding on music data and attaches sub information thereto, the resultant music data being stored in the hard disk 82. The hard disk 82 is equivalent to the hard disk 12 of the main server 10(1) shown in FIG. 1. Referring to FIG. 13, the main controller 81 controls the other components of the main server 10 of the present embodiment and is equivalent to the controller 13 of the main server 10(1) shown in FIG. 1.

The main server 10 shown in FIG. 13 inherits all the capabilities of the main server 10(1) shown in FIG. 1, the capability of the comparator 15 for comparing business entity identifiers shown in FIG. 1 being implemented by software for example in the main controller 81 of the main server 10 shown in FIG. 13. In this case, the business entity identifier of the main server 10 itself is stored in a non-volatile memory such as ROM or EEPROM or in the hard disk 82 to be retrieved as required.

The communicator 86 is equivalent to the communicator (transmitter/receiver) 14 of the main server 10(1) shown in FIG. 1. The communicator 86 connects communication lines with the music server systems 30(1), 30(2) through 30(z) to transfer music data, various sub information, control information, and fee charging information and so on between these music server systems and the main server 10.

The fee charger 85 is equivalent to the fee charger 17 of the main server 10(1) shown in FIG. 1 and processes fee charging information supplied from the music server systems through the communicator 86. As shown in FIG. 13, the main server 10 of this example has the display section 83 for displaying various display information such as guidance information and warning information and the operator section 84 through which the user enters various commands and information.

In addition, the main server 10 shown in FIG. 13 has the decoder 87 and the reproducer 88 for the user to listen to music data stored in the hard disk 82. The decoder 87 has the same configuration as that of the decoder described with reference to FIG. 7.

As described above, in the main server 10 shown in FIG. 13, an audio PCM signal is encoded by the encoder 80 and attached with sub information, the resultant signal being stored in the hard disk 82. There are two methods of implementing a high-efficiency encoding apparatus (or a high-efficiency encoder). In one method, the implementation is achieved by a hardware device (an MD deck) installed with a so-called encoding LSI. In the other, the implementation is achieved by the computation of a PCM file on the basis of software.

Generally, the encoding in the main server 10 shown in FIG. 13 requires to automatically and efficiently process a large amount of music data in order to achieve digital audio data providing business. In the main server 10 of the present embodiment shown in FIG. 13, this processing is implemented by computer software.

Difference Between Encoding by Hardware and Encoding by Software:

The following describes the difference in nature between the high-efficiency encoding by a hardware device (an MD deck) and that by a software program.

As for the recording by use of a hardware device (an MD deck), every user can realize high-efficiency encoding by purchasing the corresponding hardware, the computational accuracy involved in high-efficiency encoding being dependent on the installed encoding LSI. Generally, when a PCM file is used, a digital output of so-called PCM data is digitally inputted for encoding, which causes the input position (encoding start position) of the digitally inputted PCM data unsteady depending on the timing of starting recording operations even with the encoding of same music data, eventually resulting in totally different music data after high-efficiency encoding.

In order to describe this phenomenon, the following details a unit time in which the processing of high-efficiency encoding is executed also with reference to FIG. 3 which shows an example of the high-efficiency encoding apparatus. In the high-efficiency encoding apparatus shown in FIG. 3, digital audio data (PCM data) are inputted at the input terminal 100. In the MDCT processing to be executed in the MDCT circuits 103, 104, and 105 after the inputting, the number of samples for executing so-called orthogonal transform processing is specified, which forms one unit for repeated processing.

In the high-efficiency encoding apparatus shown in FIG. 3, the PCM data of 1024 samples inputted through the input terminal 100 are outputted from the MDCT circuits 103, 104, and 105 as 512 MDCT coefficients or spectrum data. To be more specific, 1024 pieces of PCM data (or PCM sample data) inputted from the input terminal 100 are divided by the QMF 101 into 512 high range samples and 512 low range samples, the 512 low range samples being further divided by the QMF 102 into 256 low range samples and 256 mid range samples.

Subsequently, the 256 low range samples outputted from the QMF 102 are converted by the MDCT circuit 105 into 128 pieces of low range spectrum data, the 256 mid range samples outputted from the QMF 102 are converted by the MDCT circuit 104 into 128 pieces of mid range spectrum data, and the 512 high range samples outputted from the QMF 101 are converted by the MDCT circuit 103 into 256 pieces of high range spectrum data, a total of 512 pieces of spectrum data being created by 1024 PCM samples.

The 1024 pieces of PCM sample data, which are the input data in this case, provide a time unit in which the above-mentioned high-efficiency encoding is executed once, which is referred to as 1 frame (or 1 sound frame). One high-efficiency encoded frame consists of 212 bytes as shown in FIG. 5.

It should be noted that, as for the PCM sample data inputted from the input terminal 100 shown in FIG. 3, 1 frame consists of 1024 samples, the preceding 512 samples and succeeding 512 samples being also used by both adjacent frames. This is to achieve correct encoding in consideration of the overlap in MDCT processing.

As described, in order to form high-efficiency encoded digital audio data for 1 frame, the PCM data of the 1024 samples first inputted at the starting of a recording operation are determined and, subsequently, the high-efficiency encoded frames are generated accordingly.

Taking an overlap into consideration, 512 input patterns are generated theoretically. For this reason, in generally available hardware devices (or MD decks), the encoding (or recording) of same music data results in varied high-efficiency encoded data depending on the start timing of recording operations. An analog recording method may also be available. In this case, however, it is still more difficult to obtain data matching because of the dependencies on noise and so-called A/D conversion error for example.

On the contrary, with the method of encoding based on the computation by computer (PC) software, the PCM file stored in the hard disk is processed and therefore the above-mentioned encoding timing offset is not caused, thereby always generating same high-efficiency encoded data for the encoding of same music data.

Generally, the computational accuracy of the encoding LSI mounted on a hardware device (an MD deck) is lower than that of the CPU of a processor such as personal computer for executing encoding software. If a timing match is obtained for the same PCM sample data by use of the encoding LSI, namely, if encoding is started with exactly the same PCM sample, high-efficiency encoded digital audio data are bound to vary for the low computational accuracy of the encoding LSI.

For these reasons, if the software method is used only in the encoder on the distributor side as a prerequisite, a match between the high-efficiency encoded data recorded to an external recording medium and the high-efficiency encoded data recorded to the hard disk of the main server 10 or the music server system 30 to be described later allows theoretically the determination whether the high-efficiency encoded data (digital audio data) recorded to an MD were encoded (or recorded) by a hardware device (or an MD deck) at home or purchased from a distributor through the use of the music server system.

In addition, for recordable MDs brought by users to music server systems, an area for recording the information about music data producer and distributor is not prepared beforehand; however, by use of the method in which sub information is written to the unused bits in a frame of encoded data described above, it can be surely known from which distributor the user (or the purchaser of music data) purchased music data.

Thus, by correctly identifying the distributor (or distributing business entity) of music data, such new services hitherto unrealized due to the inability of identifying distributors as the movement of music data between recording media, the upgrading of high-efficiency encoding algorithm, and the analysis of defective recording media can be realized free of charge or at low cost by defining the distributor's responsibilities.

Figure 14:
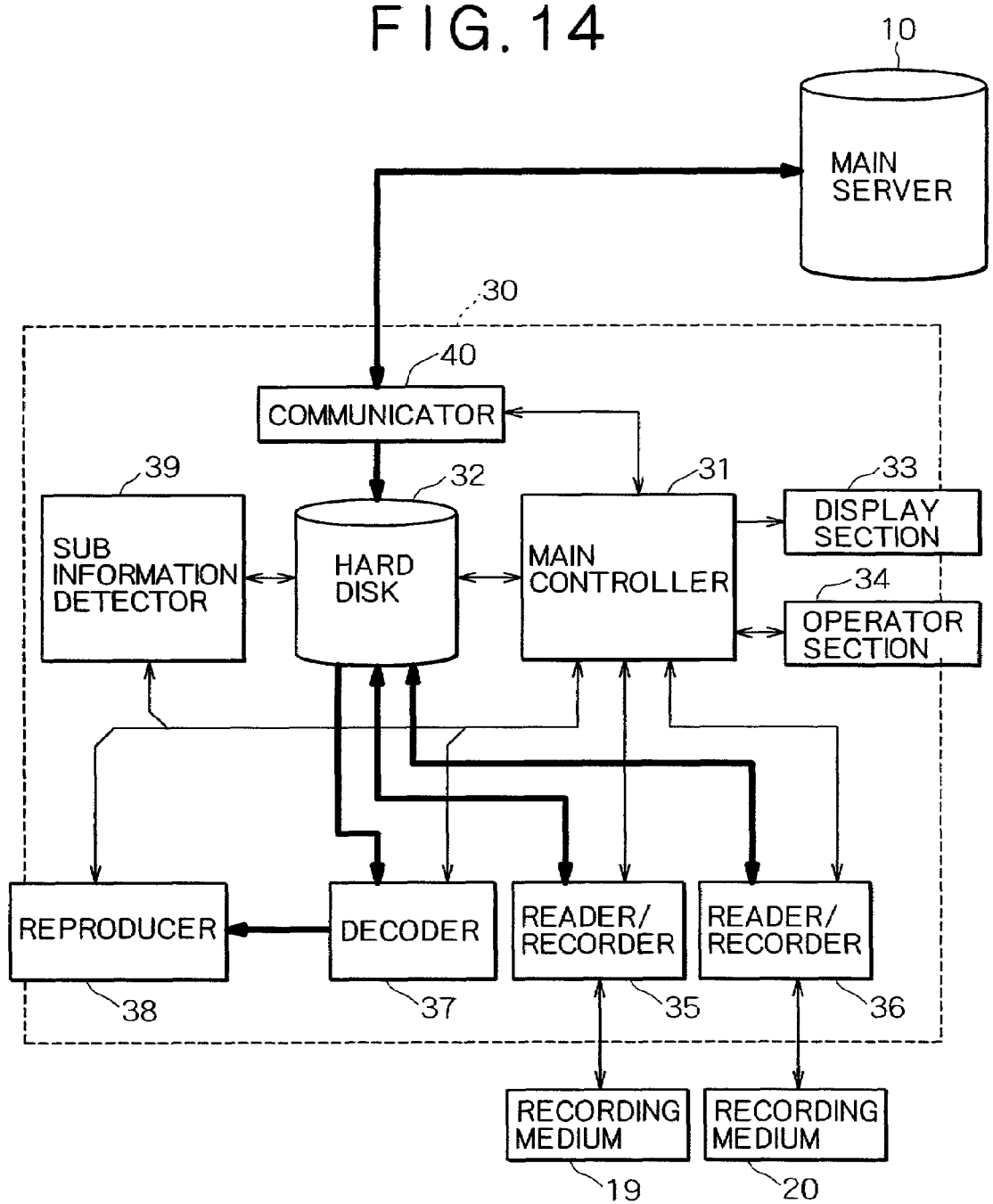
FIG. 14 is a block diagram illustrating a specific exemplary configuration of a music server system according to the invention shown in FIG. 1.

Specific Example of Music Server System:

The following describes a specific example of the music server systems 30(1), 30(2) through 30(Z) shown in FIG. 1 as the music server system 30. FIG. 14 is a block diagram illustrating an exemplary configuration of the music server system 30. As described before, the music server system 30 is installed at the store for example. The music server system 30 stores music data (or encoded data) provided by the main server 10, accepts an external recording medium of a user, and records the requested music data into the loaded external recording medium. The music server system 30 is operated by the user for this purpose.

Referring to FIG. 14, a main controller 31 is connected to all the other components of the music server system 30 to control these components. A hard disk 32 mainly stores music data to be provided to users. The music data stored in the hard disk 32 of the music server system 30 include main information (encoded data providing digital audio data) which provide actual music data and sub information including music titles, play times, and jacket pictures for example. Therefore, the main server 10 described before can provide the sub information to the music server system.

In this first embodiment, digital audio data, which are the main information, are compressed by high-efficiency encoding as described before by considering the efficient use of hard disk capacity and the communication line capacity at the transfer of music data to the music server system. Consequently, the music server system can record music data to user's external recording media at high speeds.

The management of the sub information attached to digital audio data, which are the main information, may be realized by preparing a control table file having a configuration shown in FIG. 15, writing the correlation between main information file name and sub information to this table, and controlling the updating and reading of this table by the main controller 31.

In the example shown in FIG. 15, character information and image information which provide the sub information are also formed into files. This example shows the management of the file names of these files. For example, the character information may be written directly in a text format. The other information shown in FIG. 15 includes music copyright information and so-called emphasis information for example.

In addition, although music play time and other sub information may also be managed by the same method, music play time may be calculated any time from the file size of the main information and the compression ratio of high-efficiency encoding at the time of displaying music information and recording of music data. A detection frame number is the information which is referenced when determining whether or not the audio data being recorded to a user's recording medium loaded in the music server system according to the present embodiment have been purchased duly from an official audio data provider (or business entity) operating the music server system 30.

To be more specific, as described before, the frame number and so on attached with the sub information such as business entity identifier are supplied from the main server 10 to be stored as a detection frame number for each piece of music data for management. Then, in detection of the sub information such as business entity identifier attached to the music data recorded to a user's external recording medium, the detection frame number of the control file shown in FIG. 15 is referenced to identify the attachment start frame of the sub information, thereby quickly and surely detecting the sub information.

In the present example, the sub information is managed by the so-called table file as described with reference to FIG. 15. It will be apparent that the management method is not limited to this example. For example, various sub information may be attached to the main information as so-called headers.

The display section 33, connected to the main controller 31, displays to the user the details of music data stored in the hard disk 32 and the states of recording and reproduction of these music data. The operator section 34 operated by the user to record music data to a recording medium and reproduce the recorded music data through the main controller 31.

FIG. 14 shows the example in which the music server system 30 is configured as one entity. For the display section 33 and the operator section 34, a personal computer for example may be used as an external device to use its display device and input devices such as keyboard and mouse. In this case, the music server system and the personal computer may be interconnected by utilizing a dedicated signal line for transferring sub information and control signals or a digital interface based on so-called serial connection such as USB (Universal Serial Bus) or IEEE (Institute of Electrical and Electronics Engineers) 1394.

Although the details including a memory are not shown, all the components of the music server system 30 shown in FIG. 14 may be configured within a personal computer. Namely, the music server system 30 shown in FIG. 14 may be realized as a standalone dedicated device installed at the store or realized by configuring the music server system inside a computer such as a personal computer for example.

Readers/recorders 35 and 36 shown in FIG. 14 read information from external recording media 19 and 20 loaded in the readers/recorders 35 and 36 respectively and record the information (the main information, sub information, and so on) to these external recording media 19 and 20 under the control of the main controller 31 as instructed by the user from the operator section 34.

Therefore, the main controller 31 controls the readers/recorders 35 and 36 to supply the data read from the external recording media 19 and 20 to the hard disk 32 for example to store the data therein or, conversely, write the data from the hard disk 32 to the external recording media 19 and 20.

In the present embodiment, the external recording media 19 and 20 are of package type and therefore easy to carry about and allow small-sized players to reproduce the music data for example stored in these external recording media. These external recording media include MDs which are popular as music application and Memory Sticks (hereafter referred to as MS) which are one of memory cards. Arranging plural different readers/recorders compatible with these plural different external recording media provides the compatibility with these external recording media.

Normally, the detail mechanism of a device for processing music data and the format in which data are written to external recording media depend on the types of external recording media. Hence, the music server system 30 must provide the music data having different formats compatible with the different types of available external recording media. This compatibility may be provided by making common the main information by performing so-called format conversion. Generally, this may frequently result in deteriorated tone quality.

Consequently, as shown in FIG. 14, the music server system 30 of the present embodiment for processing music data has the readers/recorders 35 and 36 provides the compatibility with both MD and MS.

In this first embodiment, it is assumed that the recording medium 19 be an MD and the recording medium 20 be an MS and the hard disk 32 store both the music data for an MD and an MS for each piece of music.

The following describes a specific example of recording music data to an external recording medium, in which music data are recorded to an MD. In the case of an MD, the recorder portion of the reader/recorder 35 includes a spindle motor, an optical head, a magnetic head, and a servo circuit.

To be more specific, an MD namely the external recording medium 19, which is a small-sized magneto-optical disk, is rotatively driven by the spindle motor, a laser beam radiated from the optical head being applied to the MD to apply a modulated magnetic field corresponding to recording data to the MD, thereby performing so-called magnetic field modulation recording. In this case, the optical head performs tracking control and focus control on the basis of a servo signal supplied from the servo circuit to correctly scan the MD tracks with a laser beam having an appropriate spot shape, thereby recording music data correctly to the MD tracks.

In the present embodiment, digital audio data, which are the main information of the music data stored in the hard disk 32, are compressed by a compression format (high-efficiency encoding) used for the MDs. The compressed digital audio data can be recorded faster than they are actually reproduced.

In the case of MDs, each disk has an area called a TOC (Table of Contents) for recording music control information, the sub information such as music title for example being recorded to this area. Therefore, the main controller 31 controls the reader/recorder 35 to record the sub information about the music data stored in the hard disk 32 to the MD according to its TOC format on the basis of the control information shown in FIG. 15. Thus, also with an external recording medium such as MD, the main information and sub information managed by the music server system 30 as shown in FIG. 14 can be related with each other.

It should be noted that the reader/recorder 36 has a data reading mechanism for reading data from a semiconductor memory installed in an MS and a data writing mechanism for writing data to the semiconductor memory in the MS. The recordable MDs have no area for recording the information about music producer and the ID information of music data themselves, while MSs have such an area. The reader/recorder 36 can record the information about music producer and the ID information of music data themselves to that area.

The decoder 37 is a decompression device which decompresses the compressed music data stored in the hard disk 32 of the music server system 30 of the present embodiment in order to sound out music. This decoder 37 has in its portion the configuration described with reference to FIG. 7.

The digital audio data decompressed by the decoder 37 are reproduced by the reproducer 38 including a so-called D/A converter, an amplifier, and a speaker, for example. The reproduction processing by the reproducer 38 is used for the user to check desired music by actual digital audio data before recording the music data to the user's external recording medium.

It should be noted that, if the digital audio data compressed for the MD and the digital audio data compressed for the MS exist at the same time, the different decoders for these data are required. In the present embodiment, the decoder 37 decodes both the digital audio data compressed for the MD and the MS.

The sub information detector 39 detects the sub information such as business entity identifier to be written to the encoding unused bits occurring in encoded data frames formed by performing high-efficiency encoding on audio PCM signals as described before with reference to FIGS. 10, 11, and 12.

As described above, the music server system 30 of the present embodiment reads the high-efficiency encoded audio digital data (or music data) recorded to an MD loaded in the reader/recorder 35 and temporarily stores the retrieved data to the hard disk 32. From the music data thus stored in the hard disk 32, the sub information detector 39 extracts the sub information such as business entity identifier from the frame at a position corresponding to the detection frame number of the control file shown in FIG. 15 and sends the extracted sub information to the main controller 31.

In the present embodiment, the sub information detected by the sub information detector 39 is used for the determination whether or not the music data recorded to the external recording medium 19 or 20 are those officially provided by the business entity which operates the main server 10 which provided these music data to the music server system 30.

The communicator 40 provides communication between the music server system 30 and the main server 10. To be more specific, under the control of the main controller 31, the communicator 40 sends various requests to the main server 10, receives information from the main server 10 to transfer the received information to the main controller 31, and receives music data from the main server 10 to send the received music data to the hard disk 32 for storing.

Thus, in the music server system 30 shown in FIG. 14, the readers/recorders 35 and 36 correspond to the reader 1 and the recorder 2 in he music server system shown in FIG. 2. In the music server system 30 shown in FIG. 14, the sub information detector 39 corresponds to the identifier extractor 3 in the music server system shown in FIG. 2. In the music server system 30 shown in FIG. 14, the communicator 40 corresponds to the identifier transmitter 4 and the receiver 5 in the music server system shown in FIG. 4.

As seen from the comparison between the main server 10 shown in FIG. 13 and the music server system 30 shown in FIG. 14, the main server 10 has the encoder 80 and the fee charger 85, which are not disposed in the music server system 30. The music server system 30 has he readers/recorders 35 and 36 and the sub information detector 39, which are not disposed in the main server 10. Except for these points, the main server 10 and the music server system 30 may be configured in substantially the same manner.

In the present embodiment, ATRAC is used for high-efficiency encoding. It will be apparent that high-efficiency encoding is not limited to ATRAC. Namely, the above-mentioned encoding is for illustrative purpose only The main server 10 and the music server system 30 according to the present embodiment can also handle the digital audio data which are encoded by other high-efficiency encoding algorithms.

Usage Forms of Music Server System:

The following describes usage forms of the music server system 30 of the present embodiment. In this first embodiment, the music server system 30 is installed at the store such as a CD store for example as described above. In this case, the music server system 30 shown in FIG. 14 has a payment collecting section for accepting the payment from the user for sold music data and a capability of performing music data price management, not shown.

The user brings his external recording medium such as MD to the store and loads it into the music server system 30 of the present embodiment which is installed at the store. Then, the user enters a command for selecting desired data stored in the hard disk 32 of the music server system 30 by use of the display section 33 and the operator section 34 thereof.

In response to the user's request, the music server system 30 reads the selected music data from the hard disk 32 and sounds the music data through the decoder 37 and the reproducer 38 for audio checking. If the selected music is found good, the user puts the amount of money charged for the recording of the selected music data into the payment collecting section of the music server system 30 to record the music data to the user's external recording medium and inputs a command for the recording of the music data through the operator section 34.

As described, in the present embodiment, the user can purchase desired music data by recording them to his external recording medium, in this case an MD, through the music server system 30.

It should be noted that, in the present embodiment, the music server system 30 and the main server 10 which is the distributor of music data are interconnected by a dedicated line for example. As described before, the main server 10 can send music data to the music server system 30 of the present embodiment at certain intervals (for example, one a month) to update the music data stored in the hard disk 32 of the music server system 30.

If the music server system 30 and the main server 10 are interconnected by a high-speed dedicated line, a usage form is possible in which the music data stored in the hard disk of the main server 10 are directly used every time purchase is made. In such usage form, the music server system shown in FIG. 1 functions as a music vendor machine so to speak.

In another usage example of the music server system 30, the music server system 30 may be installed in the home. In this case, the transmission route for transferring music data from the main server 10 may be the Internet for example. The digital signal transmission supported by a communication satellite (CS) is also possible for transferring music data.

In this case, unlike the above-mentioned music server system 30 installed at the store, the music server system in the home may not have the payment collecting section; namely, the payment for the purchased music data may be made by use of the Internet or an existing telephone line for example. To be more specific, the user sends, to the provider for example of the purchased music data, his membership identification information and credit card number by encrypting these information so as to prevent them from leakage. Receiving these information, payment settlement processing such as automatic money transfer from user's bank account, credit card settlement, or billing for cash payment can be performed.

In still another usage form, the user not only purchases music data from music providers (music distributors) but also uses the music server system 30 as a system for accumulating and storing already owned music data. In this case, the music server system 30 may require to have an encoder for encoding the owned music data, in addition to the capability of reading external recording media.

In the music distribution system comprising the main server 10 and the music server system 30 shown in FIG. 13, the sub information to be attached to (or imbedded in) music data may include various information such as music information, business entity information such as business entity identifier, and so on. As described before, attaching the business entity information such as business entity identifier to music data allows the provision of such various new services not available before as the movement of music data between recording media.

One Example of Service Not Available Before:

The following describes the movement of music data between recording media (a move service) which is one of the examples of the new services to be mainly realized by attaching business entity identifiers to music data. The move service becomes necessary in the following situation for example.

Recently, various external recording media such as MD and MS for example are available for users. This situation causes demand for the move service when a newly purchased player requires a new type of external recording medium which is different from that used so far.

A simple method of directly moving music data by the user may be to copy the music data outputted in the form of an analog signal. This method, however, requires the intervention of so-called A/D and D/A conversion processes, thereby causing deterioration in tone quality. In a method based on digital signals, decoding and encoding processes are required if no match is found in high-efficiency encoding between the recording media for the move service, which also causes deterioration in tone quality.

If there is a match between the recording media, direct copying becomes technically practicable without involving deterioration in tone quality, which, by that very fact, causes copyright problems.

In terms of tone quality, it is ideal to write the music data encoded on the basis of high-efficiency encoding used in the new recording medium to which the movement of the music data is made. However, if the music data of the source of movement are those purchased through the music server system 30 for example, it becomes necessary to repurchase the music data to be recorded to the destination of movement although the same music data were purchased to be recorded to the source recording medium, thereby costing the user again.

To solve this problem, it is necessary to determine whether the high-efficiency encoding performed on the music data recorded to the source recording medium was made by the distributor distributing the music data through the music server system 30. If this high-efficiency encoding is found performed by that distributor, it proves that these music data were purchased from that distributor, so that new services may be realized in which the recording of the same music data to a new recording medium is allowed free of charge or less costly than for those users who purchase the music data for the first time, for example.

In the case of this first embodiment, as described with reference to FIGS. 1 and 2, when the move service in which the music data are moved from the MD loaded in the reader/recorder 35 of the music server system 30 are moved to an MS loaded in the reader/recorder 36 is provided, the business entity identifier is detected by the sub information detector 39 of the music server system 30 from the music data recorded to the MD.

The detected business entity identifier is sent to the main server 10 through the main controller 31 and the communicator 40 along with the music identifier for the music data to be compared in the main server 10 with the business entity identifier stored in the business entity identifier memory of the main server 10. If a match is found between these business entity identifiers, then the music data which are identified by the music identifier and formed by the high-efficiency encoding for MS are returned to the requesting music server system 30.

Then, the music data for MS are recorded from the main server 10 to the loaded MS through the reader/recorder 36 and the music data recorded to the MD loaded in the reader/recorder 35 are deleted, thereby completing the music data move service.

It should be noted that the music identifier may be attached to the encoding unused bits of the frame of music data (encoded data) along with the business entity identifier or the music identification information recorded to the TOC of MD may be used. In the fee charging processing, a charged amount of money is calculated by the fee charger 17 of the main server 10 and the calculated amount is sent to the music server system 30, by which the music server system 30 confirms the amount of money when the payment is accepted. If the confirmation is successful, the confirmation is sent to the main server 10. When the main server confirms the response by the user to the fee charging, the move service is provided to that user.

Figure 16:
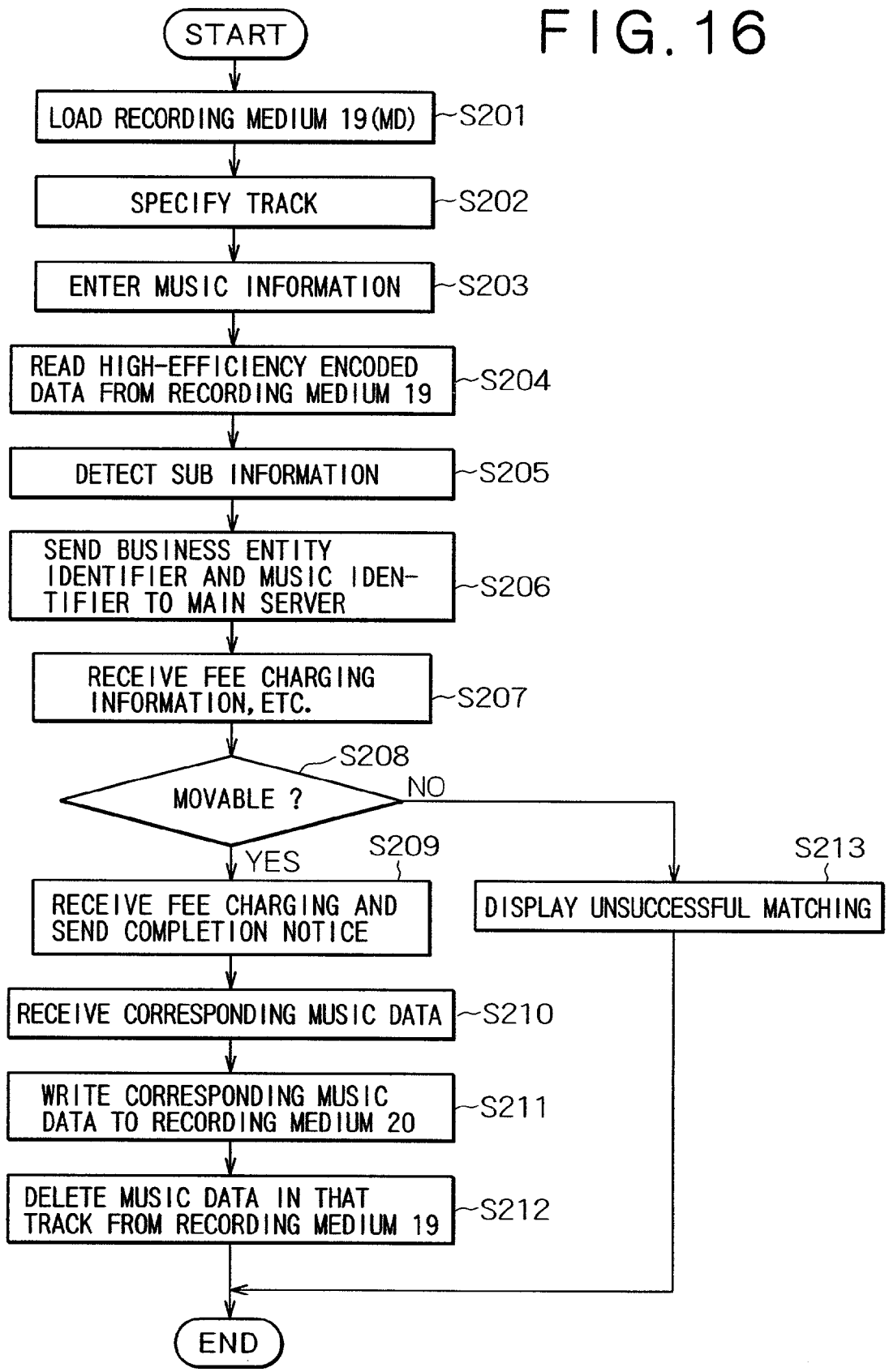
FIG. 16 is a flowchart describing the processing to be executed at the time of music data movement between recording media in the music server system shown in FIG. 14.
Figure 17:
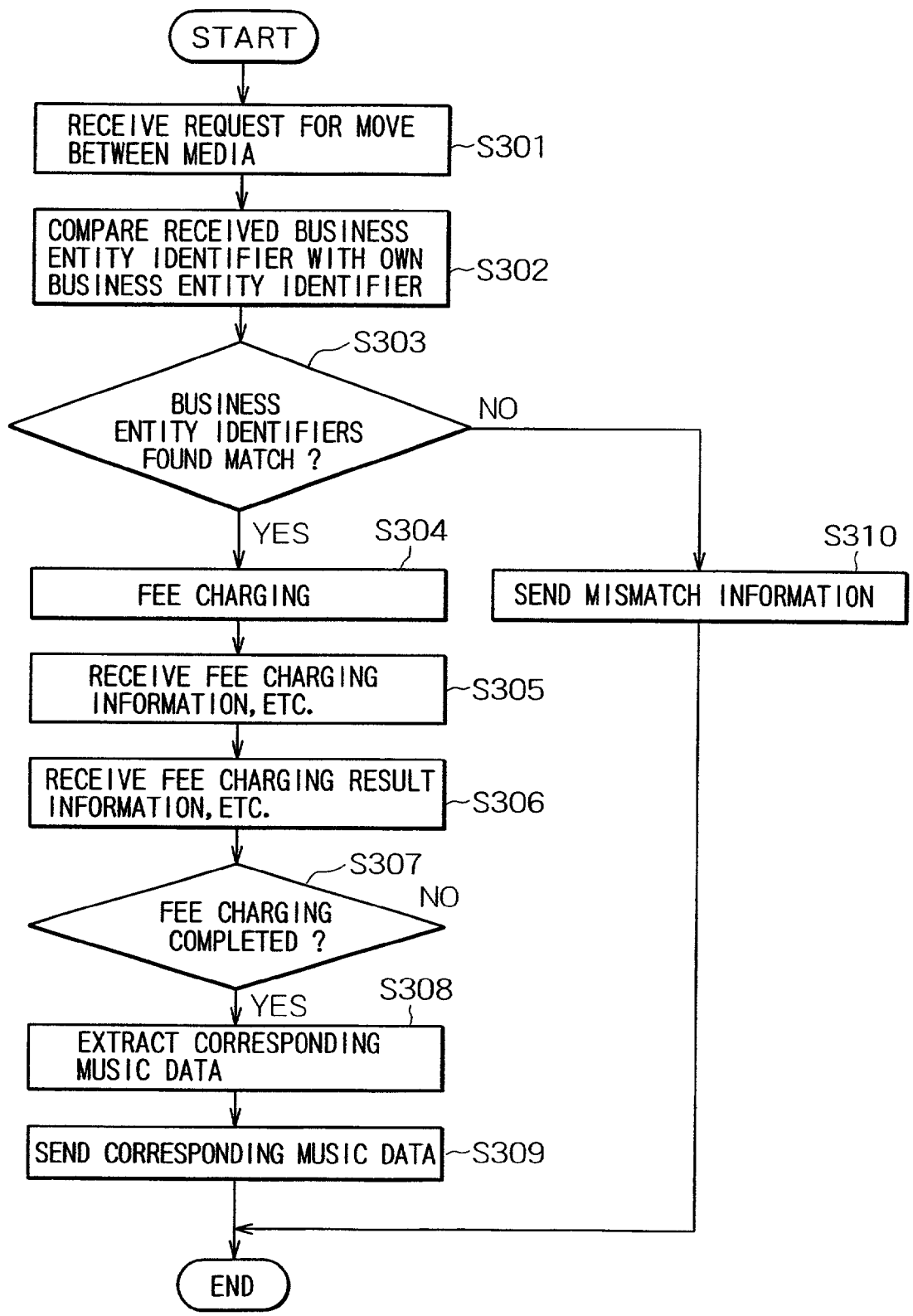
FIG. 17 is a flowchart describing the processing to be executed at the time of music data movement between recording media in the main server shown in FIG. 13.

Operations to be Performed at Movement of Music Data Between Recording Media:

The following describes the operations of the music server system 30 and the main server 10 to be performed at the movement of music data between recording media with reference to the flowcharts shown in FIGS. 16 and 17.

First, the operation of the music server system 30 is described. FIG. 16 is a flowchart describing the operation of the music server system 30 to be performed at the movement of music data between recording media.

The music server system 30 accepts the loading (or inserting) of the external recording medium 19 (which is an MD) of the user into the reader/recorder 35 (step S201). Next, the music server system 30 accepts the specification by the user of the track of music data to be moved from the recording medium 19 loaded in the music server system 30 (step S202).

The music server system 30 accepts the input of the specification information of the music data to be moved (step S203). On the basis of the information accepted in steps S202 and S203, the music server system 30 reads the specified music data from the loaded external recording medium 19 and temporarily stores these music data in the hard disk 32 (step S204).

Next, referencing the detection frame number of these music data of the control file shown in FIG. 15, the main controller 31 of the music server system 30 identifies the frame with which the attachment of sub information started to control the sub information detector 39, thereby detecting the sub information such as business entity identifier and so on attached to the music data temporarily stored in the hard disk 32 in step S204 (step S205).

In this case, if the sub information such as business entity identifier and music identifier consists of many bits and are attached over two or more frames, then the sub information detector 39 or the main controller 31 can demodulate (or restore) the business entity identifier and music identifier of the predetermined number of bits from the detected information.

Next, the main controller 31 sends the information such as the business entity identifier, music identifier, and request for providing the move service for moving music data between recording media detected in step S205 to the main server 10 through the communicator 40 (step S206). Subsequently, the main controller of the music server system 30 receives the return information such as the permission of movement between recording media and fee charging from the main server 10 through the communicator 40 (step S207). On the basis of the received information, the main controller 31 determines whether or not the movement of the target music data can be moved between recording media (step S208).

If the movement between recording medium is found enabled in step S208, then the main controller 31 accepts from the user the payment in accordance with the fee charging information supplied from the main server 10 and sends a fee charging completion notice to the main server 10 (step S209). Subsequently, the music server system 30 receives the music data for MS from the main server 10 through the communicator 40 (step S210).

Then, the music server system 30 records the music data for MS received in step S210 to the external recording medium MS 20 loaded in the reader/recorder 36 (step S211) and deletes the music data to be moved between recording media from the external recording medium MD 19 loaded in the reader/recorder 35 (step S212), upon which the processing shown in FIG. 16 comes to an end.

If, in the decision process of step S208, a mismatch is found between the business entity identifiers and therefore the information indicating that the movement of music data between recording media or message information thereof comes from the main server 10, then, in the decision process of step S208, the movement between recording media is determined disabled, upon which the music server system 30 displays a message telling that the provider of the music data to be moved is different (step S213) and the processing shown in FIG. 16 comes to an end without moving the music data between recording media.

It should be noted that, if the user is not charged for the music data to be moved, then a message telling that there occurs no fee charging may be sent in step S209, automatically allowing the user to receive from the main server the provision of the music data to be moved. If, in the process of step S209, the requested payment has not been made by the user, for example, user's not acknowledging the requested fee charging, then the music server system 30 may send a notice of uncompleted fee charging to disable the provision of the music data to be recorded to the MS.

The following describes the operation of the main server 10. FIG. 17 is the flowchart describing the operation of the main server 10 to be performed at the movement of music data between recording media.

The main controller 81 of the main server 10 shown in FIG. 13 always receives requests from many music server systems under its control via the communicator 86 (step S301). Then, receiving a request for moving music data between recording media (a move request) from the music server system 30, the main controller 81 of the main server 10 compares the business entity identifier included in the received information and the business entity identifier stored in the main server 10 (step S302).

The business entity identifier included in the information received from the music server system 30 is that attached to the music data to be moved between recording media recorded to the MD 19, which is a user's external recording medium. On the basis of the result of the comparison made in step S302, the main controller 81 determines whether there is a match between these identifiers (step S303).

If a match is found in step S303, then the main controller 81 controls the fee charger 85 to calculate an amount of money to be charged for the movement of music data between recording media (step S304) and sends the information including the calculated amount to the requesting music server system 30 (step S305).

Then, the main controller 81 of the main server 10 waits until the response such as fee charging result information from the music server system 30 (step S306). On the basis of the fee charging result information received in step S306, the main controller 81 of the main server 10 determines whether the fee charging has been completed appropriately (step S307).

If the fee charging is found appropriately completed in step S307 in the music server system 30, then the main controller 81 of the main server 10 extracts the music data to be moved between recording media from the hard disk 82 (step S308) and sends the extracted music data to the requesting music server system 30 via the communicator 86 (step S309), upon which the processing shown in FIG. 17 comes to an end.

If a mismatch is found between the business entity identifiers in step S303, it indicates that the music data to be moved between recording media recorded to the external recording medium 19 loaded in the music server system 30 are not those provided by the main server 10, so that the main controller 81 sends a message telling that the provider of the music data is different to the music server system 30 (step S310), upon which the processing shown in FIG. 17 comes to an end.

If the main controller 81 of the main server 10 determines in step S307 that the fee charging has not appropriately completed in the music server system 30, then the processing shown in FIG. 17 also comes to an end without the provision of the music data.

Thus, the music data inputted in the music server system 30 can be surely and easily determined by the business entity identification information attached to the encoding unused bits of the music data whether the inputted music data are those provided by the main server 10 which performs music data provision to the music server system 30 and controls the same.

In this first embodiment, only business entity identifiers (or business entity information) are used for the above-mentioned purpose. As described before, the method may be used at the same time in which binary data of corresponding frames are compared with each other between the music data held in the main server 10 or the music server system 30 and the music data inputted into the music server system 30 by the user, thereby determining a match between these binary data.

In the above-mentioned first embodiment, the music data to be moved between recording media are provided by the main server 10 every time the user wants the movement. However, as shown in FIG. 14, the music server system 30 has the hard disk 32 and the music data for MS may be stored therein, so that the music server system 30 need not be provided with the music data from the main server 10 every time the user wants the movement.

Namely, the main server 10 may perform only the comparison between business entity identifiers, the determination of the result of the comparison (match or mismatch), and the fee charging, the other processing all being left to the music server system 30. In this case, the music data to be moved need not be sent from the main server 10 to the music server system 30 every time the user requests the movement between recording media, thereby saving communication cost.

As described, in the first embodiment, with recording media such as MD which does not have area for recording the sub information such as music creator and music number for example, the music data recorded to an MD may be determined whether they were purchased from a particular distributor by recording the sub information to the unused bits in high-efficiency encoded data, thereby realizing various services by each distributor and, at the same time, the use for data maintenance and security.

It should be noted that, in the present embodiment, music identifiers are also attached to encoded data like business entity identifiers. It will be apparent that, for music identifiers, such information that can identify each individual piece of music as recorded to the TOC or another area in a user's external recording media like MD may also be used.

Second Embodiment

In the above-mentioned first embodiment, sub information can be written to encoded data, which are music data. However, if some editing including the division of one piece of music on a recording medium or the combination of pieces of music is made or if a recording medium recorded music data is partially damaged, it becomes difficult to correlate variable i providing a frame number with which the recording of sub information such as business entity identifier started with a detection frame number providing database information as described with reference to FIG. 12. The second embodiment is intended to solve this problem.

The second embodiment is also described by use of the same music distribution system as with the first embodiment for example. Namely, the music distribution system according to the second embodiment has the configuration described with reference to FIGS. 1 and 2.

Therefore, with the second embodiment, each of the main servers 10(1), 10(2), 10(3) and so on has the configuration described with reference to FIG. 13. Each of the music server systems 30(1), 30(2) through 30(Z) has the configuration shown in FIG. 14 and the control table file shown in FIG. 15. Hence, in the description of the second embodiment, FIGS. 1 through 17 used for the description of the first embodiment will also be used as required.

As described, the main server and music server systems of the music distribution system of the second embodiment are configured in substantially the same manner as those of the first embodiment except that the writing of sub information to be performed in the encoder 80 of the main server 10 is different from that of the first embodiment.

As described before, generally, in the high-efficiency encoding based on ATRAC, the bits are allocated to unit blocks as far as possible by the bit allocation calculator 118 shown in FIG. 3, so that the value of encoding unused bit REM described before often becomes less than the minimum value of the number of spectrum data SPk of k-th unit block indicated by format.

If it is assumed here that the number of spectrum data SPk be 4, then the value of encoding unused bit REM take 3, 2, 1, or 0. This value of encoding unused bit REM can be detected also in decoding, so that this value makes it possible to make distinction between a frame to which information is written and a control frame indicative of the start and end points of information writing. The following describes a specific example in which a frame is regarded as a control frame when the value of encoding unused bit REM is 3.

If the value of encoding unused bit REM is 3, it indicates that there are 3 encoding unused bits, so that the control data of types permitted in a range of 3 bits can be determined. This example is shown in FIG. 18. In the example shown in FIG. 18, "001" is the start point of business entity identification data, "010" is the start point of music identification data, "101" is the end point of business entity identification data, "110" is the end point of music identification data, and "000" has no significance.

Figure 19:
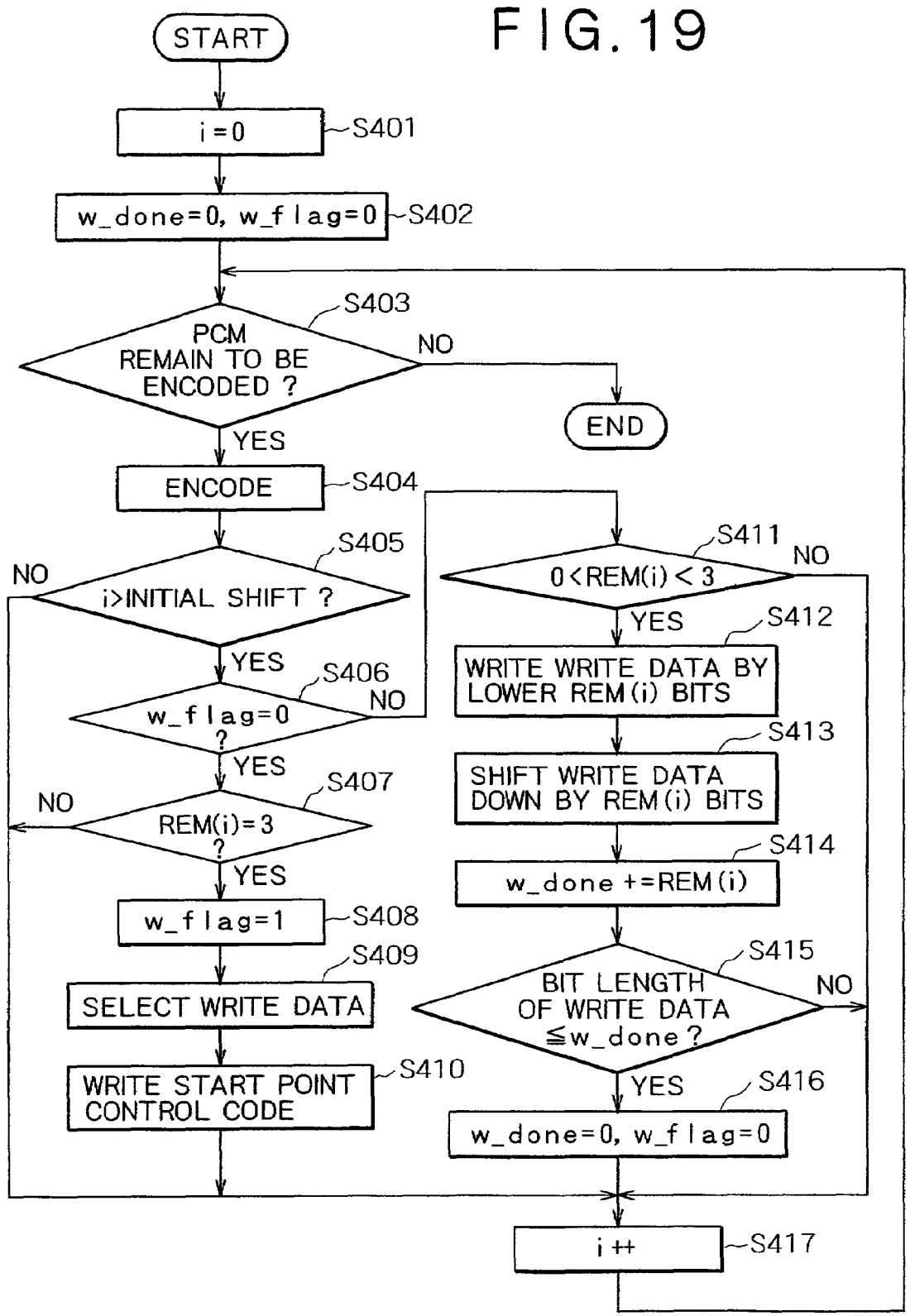
FIG. 19 is a flowchart describing the processing to be executed when control information and sub information are written to the encoding unused bits of encoded data.

The following describes in detail, with reference to the flowchart shown in FIG. 19, the operation of the encoder 80 (the encoder 11 shown in FIG. 1) shown in FIG. 13 in the case where a frame is regarded as a control frame when the value of encoding unused bit REM is 3. Referring to FIG. 19, variable i is a counter value indicative of a frame number, variable w_done indicates how many bits of sub information were written, and encoding unused bit REM(i) indicates the value of encoding unused bit REM of i-th frame, all being the same as those used in the flowchart shown in FIG. 12.

In the flowchart shown in FIG. 19, variable w_flag is used as a flag variable indicative of whether data writing is being made or not, in addition to the above-mentioned variables.

As with the processing shown in FIG. 12, the processing shown in FIG. 19 starts in the high-efficiency encoding apparatus 120 and the sub information writer 130 when the high-efficiency encoding on audio PCM data starts. First, the sub information writer 130 initializes variable i to 0 (step S401) and variables w_done and w_flag to 0 (in step S402).

Next, the high-efficiency encoding apparatus 120 determines whether there still remain the audio PCM data to be encoded (step S403). In this step S403, if audio PCM data are processed in units of 512 samples for example, how many samples of a source audio PCM file has been processed is monitored to determine whether all of the audio PCM data subject to high-efficiency encoding have been processed.

If the audio PCM data subject to high-efficiency encoding are found all processed in step S403, then the processing shown in FIG. 19 comes to an end. If the audio PCM data subject to high-efficiency encoding are found not all processed in step S403, the high-efficiency encoding apparatus 120 performs high-efficiency encoding on the audio PCM data (step S404).

In the high-efficiency encoding executed in step S404, the high-efficiency encoding apparatus 120 forms the encoded data shown in FIG. 5 and calculates encoding unused bit REM(i) for each frame. Subsequently, the sub information writer 130 determines whether variable i is greater than a predetermined initial shift for example (step S405). As described before, the initial shift is value to be predetermined for recording sub information, thereby determining a frame with which the recording (or attachment) of sub information starts.

If the specified frame is found not reached in step S405, then variable i is incremented (step S417), upon which the processing starting with step S403 is repeated. It should be noted that the incrementing of variable i in step S417 denotes the incrementing of the number of frames. Notation of i++ in step S417 shown in FIG. 19 denotes the incrementing of variable i.

If the specified frame is found reached in step S405, then it is determined whether variable w_flag is 0 or not (step S406) If variable w_flag is found 0, then it is determined whether encoding unused bit REM(i) is 3 or not (step S407).

If encoding unused bit REM(i) is found 3 in step S407, namely if 3 encoding unused bits are found not occurring, then the procedure goes to step S417 to increment the number of frames i, upon which the processing starting with step S403 is repeated.

On the contrary, if encoding unused bit REM(i) is found 3 in step S407, variable w_flag is set to 1 (step S408). In the process of step S408, variable w_flag is turned on to enable the writing of the sub information to that frame.

Subsequently, write data are selected from the candidates of business entity identification data and music identification data for example (step S409). In this case, if the write data are of two types of business entity identification data and music identification data, the selection may be made so as to write these data alternately.

Next, a start point control code corresponding to the write data selected in step S409 (step S410). In the process of step S410, the start point control code corresponding to the write data selected in step S409 is identified among 3-digit codes shown in FIG. 18 and the identified start point control code is written to 3 encoding unused bits REM(i).

Therefore, in step S410, if business entity identification data for example were selected in step S409, data "001" are written in accordance with FIG. 18. Then, in step S417, the number of frames i is incremented, upon which the processing starting with step S403 is repeated.

On the other hand, if variable w_flag is found not 0 in step S406, namely variable w_flag is 1 and the start point control code corresponding to the selected write data was written to the encoded data, then it is determined whether encoding unused bit REM(i) is 1 or 2 (greater than 0 but less than 3) (step S411).

If encoding unused bit REM(i) is found not 1 or 2 in step S411, then the procedure goes to step S417 to increment the number of frames i, upon which the processing starting with step S403 is repeated. If encoding unused bit REM(i) is found 1 or 2 in step S411, then the lower REM(i) bits of the write data which are sub information are written to the encoding unused bits of the encoded data (step S412).

Subsequently, the write data after writing are shifted downward by REM(i) bits (step S413). In the example shown in FIG. 19, the lower bits of the write data are always written in steps S412 and S413; it will be apparent that, if integrity is secured, this writing may be performed in any other manner. Therefore, the write data may be written starting with its upper bits to the encoding unused bits of encoded data.

Next, as the number of bits processed, namely the number of bits of the write data written to the encoded data, encoding unused bits REM(i) are added to variable w_done (step S414). Subsequently, it is determined whether the bit length of the write data is equal to or less than variable w_done to determine how many bits of the write data which are sub information has been recorded (step S415).

If the bit length of the write data is found not equal to or less than variable w_done in step S415, then the procedure goes to step S417 to increment the number of frames i, upon which the processing starting with step S403 is repeated. Alternatively, if the bit length of the write data is equal to or less than variable w_done, namely if all bits of the write data are found written to the encoded data, then variables w_done and w_flag are initialized to 0 (step S416) and then the procedure goes to step S417 to increment the number of frames i, upon which the processing starting with step S403 is repeated.

It should be noted that, in the processing shown in FIG. 19, the writing of the end point control data shown in FIG. 18 is not performed. This is because, if the bit length of the write data which are sub information is predetermined, the bit length is detectable at the time of decoding.

However, if the writing of end point control data is to be performed, a frame may be detected of which encoding unused bit REM(i) is 3 after the frame on which the processing of step S416 ended and the end point control code may be written to the detected frame in the same manner as the start point control code.

Although not described as a step in FIG. 19, it is assumed that 212-byte data for one frame be initialized to 0 before encoding and, if the processes of steps 410 and 412 are not performed, the data corresponding to the encoding unused bit REM(i) be 0.

In the method shown in FIG. 19, the number of times the write data which are sub information have been written depends on the number of variables i. However, the number of times the write data have been written and the number of times the data have not finally been written may be recorded the inform of a log output for example.

For example, this log output indicates, for example, in music X, 8-bit business entity identification data have been written 12 times, 64-bit music identification data have been written 11 times, and the start point code of music identification data has been written in the proximity of a final frame, but the music identification data themselves could not be written.

This log output information allows to correctly understand what kind of information has been recorded to music X and how many times information has been recorded to music X. It should be noted that the log output information may be held in the main server 10 to be provided on demand from the music server system 30. Alternatively, as with music data, the log output information may be provided to the music server system 30 beforehand to be managed thereby.

Use of the method described with reference to FIG. 19 allows the recording of sub information into encoded data and the data for identifying the start point of the sub information into the encoded data. Consequently, the sub information detector 39 of the music server system 30 shown in FIG. 14 can detect a frame in which REM is 3 by use of the above-mentioned method of calculating encoding unused bit REM and, if the information recorded to the encoding unused bit REM portion of that frame is found a start point control code, sequentially detects the data starting with that start point control code, thereby realizing quick and secure detection of sub information.

According to this method, sub information can be detected more securely even if some editing as typically represented by the division of music data on a recording medium is performed or the recording medium is partially damaged.

If only the log information such as mentioned above, namely that, in music X, 8-bit business entity identification data have been written 12 times, 64-bit music identification data have been written 11 times, and the start point code of music identification data has been written in the proximity of a final frame, both the detected business entity identification data and music identification data may be determined highly reliable in the case where the same business entity identification data have been detected 10 times and the music identification data have been detected 10 times.

As described, if all the business entity identification data and music identification data to be attached two or more times have not been detected, it can be determined with little error that the corresponding music data are what indicated by the music identification data and purchased by the business entity indicated by the business entity identification data. It should be noted that the ratio of matching with the detected data has some degree of freedom and therefore may be set for each business entity by considering the influences of editing and data damage.

As with the first embodiment, the encoding unused bits are used for start and end control codes and sub information in the second embodiment, so that the PCM data generated by decoding by the decoder described with reference to FIG. 7 are not affected in any manner.

Thus, in the second embodiment, as with the first embodiment, with recording media such as MD which have not area for recording the sub information such as music creator and music number for example, use of the encoding unused bits of the high-efficiency encoded data allows to attach sub information to these high-efficiency encoded data.

By making distinction between a frame to which information is written and a control frame indicative of the start and end points of information writing in accordance with the number of encoding unused bits, the sub information may be detected even if some editing as typically represented by the division of music data on a recording medium is performed or the recording medium is partially damaged.

On the basis of the matching ratio of the detected sub information, whether or not the music data recorded to a recording medium was purchased from a particular business entity can be determined, thereby realizing the provision of various services to distributors and the application to data maintenance and security.

Use of different control codes in accordance with sub information facilitates the separation and extraction of sub information of plural types.

Third Embodiment

In the above-mentioned first and second embodiments, sub information is written to the encoding unused bit REM of the encoded data formed by high-efficiency encoding; namely the first and second embodiments presupposes the generation of encoding unused bits.

However, the encoding unused bit REM is generated as a result of bit allocation determined by the bit allocation calculator 118 shown in FIG. 3 and therefore the probability of the generation is arbitrary. Hence, the quantity of the writing of sub information which can be written (the number of times the writing is made) depends on particular pieces of music. Generally, as the play time (the time necessary for reproduction) of a piece of music becomes longer, the writing quantity (the number of times the writing is made) increases.

With pieces of music having an almost equal play time, it is a general tendency that the sub information writing quantities (the number of times the writing is made) do not extremely differ from one another. However, when encoding steady special tone signals for example, it is possible that the pattern of generating encoding unused bits be extremely running short or excessive.

In the high-efficiency encoding method used in the first and second embodiments, bit allocation is made to spectrum data in a comparatively simple form. In the case where complicated encoding has been made as with so-called variable-length encoding, it is possible for the pattern of generating encoding unused bit to become special.

Thus, depending on pieces of music to be high-efficiency encoded or the different in high-efficiency encoding algorithms used, there occurs a difference between the generating forms of encoding unused bit, resulting in a possibility that some pieces of music in which a sufficient amount of additional data cannot be written (or attached) to the encoded data occur.

To cope with such a situation, the information such as the number of times sub information is attached to encoded data and the manner of the attachment is provided in the form of a log out in the second embodiment. However, the use of the log information provided when sub information is attached to encoded data at the time of detecting the sub information from the encoded data cannot enhance the reliability of the sub information itself attached to the encoded data.

Therefore, in the third embodiment, in order to positively generate desired encoding unused bit in encoded data, the parameters of the high-efficiency encoding apparatus (or the high-efficiency encoder) are changed to redo the encoding, thereby compensating the shortage of sub information writing quantity (the number of times the writing is made).

The third embodiment is also described by use of the same music distribution system as with the first and second embodiments for example. Namely, the music distribution system according to this third embodiment has the configuration described with reference to FIGS. 1 and 2.

Therefore, with the third embodiment, each of the main servers 10(1), 10(2), 10(3) and so on has the configuration described with reference to FIG. 13. Each of the music server systems 30(1), 30(2) through 30(Z) has the configuration shown in FIG. 14 and the control table file shown in FIG. 15. Hence, in the description of the third embodiment, FIGS. 1 through 17 used for the description of the first embodiment and FIGS. 18 and 19 used for the description of the second embodiment will also be used as required.

As described, the main server and music server systems of the music distribution system of the third embodiment are configured in substantially the same manner as those of the first and second embodiments except that the writing of sub information to be performed in the encoder 80 of the main server 10 is different from those of the first and second embodiments.

Figure 20:
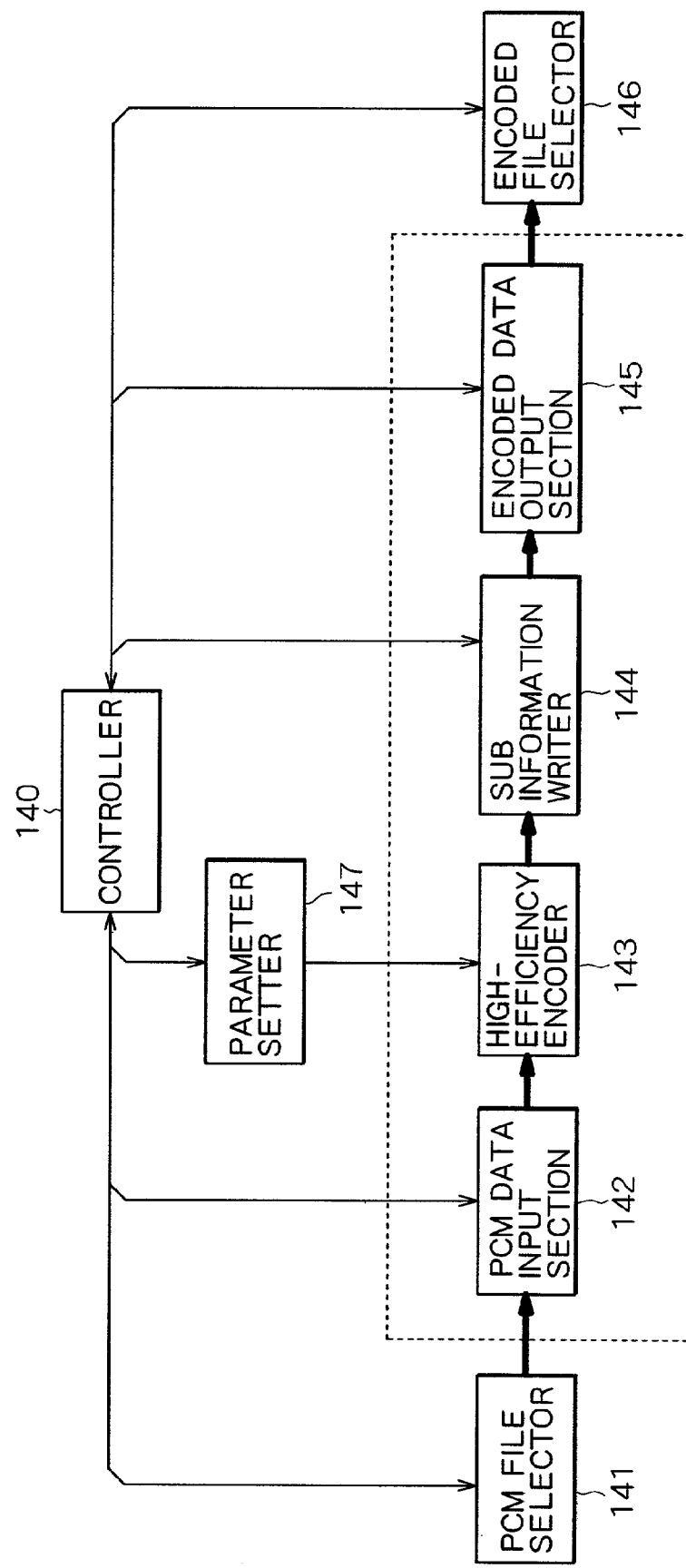
FIG. 20 is a block diagram illustrating the processes in an encoder of the main server shown in FIG. 13.

Now, the third embodiment will be specifically described with reference to FIG. 20. FIG. 20 is a block diagram illustrating the processes up to the outputting of a PCM file as a high-efficiency encoded file. Namely, FIG. 20 shows, in process blocks, the encoder 80 of the main server 10 shown in FIG. 13 comprising the high-efficiency encoding apparatus 120 and the sub information writer 130 shown in FIG. 10.

As shown in FIG. 20, when the encoder 80 shown in FIG. 13 is put in blocks for each process, the encoder has a PCM file selector 141, a PCM data input section 142, a high-efficiency encoder 143, a sub information writer 144, an encoded data output section 145, and an encoded file selector 146. A controller 140 in the encoder 80 controls the other components therein. The main controller 81 of the main server 10 may play the role of this controller 140 as required.

As shown in FIG. 20, all processing sections are connected to the controller 140 to be controlled thereby. The PCM file selector 141 selects a PCM file to be processed from among the PCM files recorded to a recording medium such as a hard disk for example.

The data of the PCM file selected by the PCM file selector 141 are read by the PCM data input section 142 on a frame processing basis. This frame processing unit is equivalent to 1024 samples of PCM data for example which are required for forming one frame (212 bytes) of encoded data as described before. The one frame of PCM data read by the PCM data input section 142 are supplied to the high-efficiency encoder 143.

The high-efficiency encoder 143, equivalent to the high-efficiency encoding apparatus 120 shown in FIG. 10, actually performs high-efficiency encoding on the supplied PCM data, the internal configuration of this encoder being as shown in FIG. 3. The high-efficiency encoder 143 outputs encoded data, which are supplied to the sub information writer 144.

The sub information writer 144, equivalent to the sub information writer 130 shown in FIG. 10, writes sub information to the encoded data outputted from the high-efficiency encoder 143 at the encoding unused bit portion of a frame in which encoding unused bits occur on the basis of the encoding unused bit REM from the high-efficiency encoder 143.

The encoded data outputted from the sub information writer 144 are outputted through the encoded data output section 145 on a frame basis and supplied to the encoded file selector 146 to be written to an encoded file. The encoded file selector 146 determines the name of a write file in which the encoded data are stored, finally generating that file.

It should be noted that the processing from the PCM data input section 142 up to the encoded data output section 145 which are enclosed by dashed lines as shown in FIG. 20 is executed on the basis of the processing described in the second embodiment with reference to the flowchart shown in FIG. 19. Namely, the inputting of a PCM file into the PCM data input section 142 is equivalent to the start in FIG. 19 and the outputting of the encoded file from the encoded data output section 145 is equivalent to the end in FIG. 19.

Although not shown in FIG. 20, the output of the status log associated with the writing of sub information is sent from the sub information writer 144 to the controller 140 as described above. On the basis of this log output, the controller 140 counts and controls the writing quantity (the number of times the writing has been made) of the written sub information between the inputting of the PCM file and the outputting of the encoded file.

If the final writing quantity is found by the controller 140 not sufficient as the sub information writing quantity, then the controller 140 directs the PCM file selector 141 to reselect a PCM file by encoding this file again without causing the encoded file selector 146 to function. At this moment, the controller 140 causes a parameter setter 147 to determine parameters for high-efficiency encoding, thereby controlling the components so that the PCM file is encoded again.

Thus, by redoing high-efficiency encoding by changing its parameters until a predetermined quantity (or predetermined number of times) of sub information has been attached to the encoded data formed by performing high-efficiency encoding on PCM data, a predetermined quantity of sub information can be attached to the encoded data formed by performing high-efficiency encoding on any PCM data.

Figure 21:
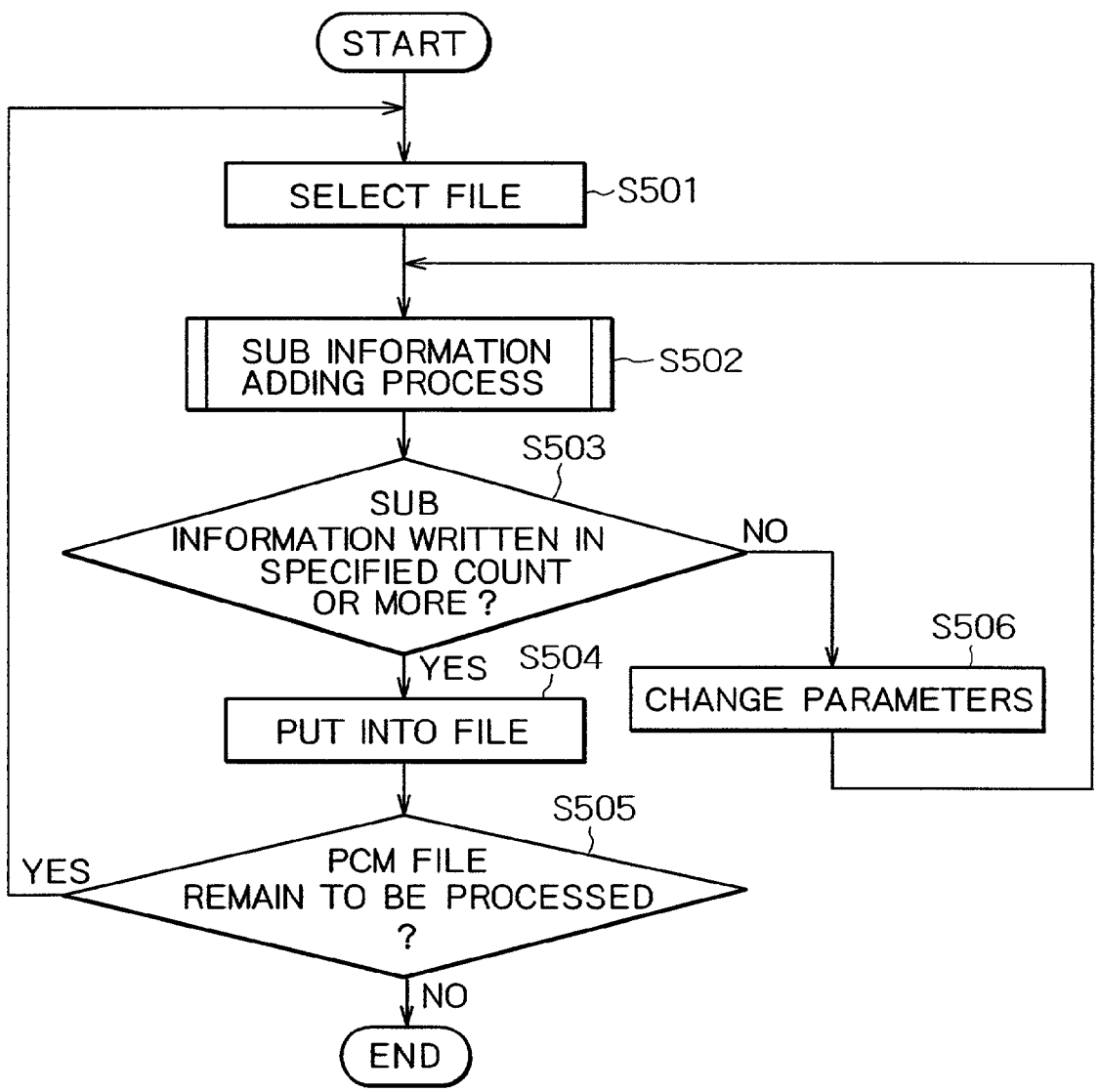
FIG. 21 is a flowchart describing the processing of adding sub information to the encoded data encoded in the encoder shown in FIG. 20.

FIG. 21 is a flowchart describing the processing to be executed in the encoder 80 shown in FIG. 20, the processing being executed under the control of the controller 140. First, under the control of the controller 140, the PCM file selector 141 selects a PCM file of the PCM data to be high-efficiency encoded (step S501).

The process of step S501 is executed in combination with the process of step S505 to be described later. To be more specific, if the processing is realized by software, the user of the main server 10 selects beforehand plural PCM files to be processed by first selecting them or by specifying the directory having these files, which will be automatically selected one by one in a desired order.

Next, the selected PCM files are processed as shown in the flowchart of FIG. 19 as with the above-mentioned second embodiment, thereby attaching sub information to the encoded data (step S502). The process of step S502 is executed in the portion between the PCM data input section 142 and the encoded data output section 145 as shown in FIG. 20.

Subsequently, the controller 140 determines whether the sub information has been written to the encoded data (step S503). In the process of step S503, a simple comparison with the predetermined specified count may be performed by outputting the writing status of the sub information from the sub information writer shown in FIG. 20 to cause the controller 140 to count the number of times the writing of additional data has ended.

If the sub information are found written to the encoded data by the specified number of times in step S503, then the resultant encoded data are put in a file (step S504). The process of step S504 is equivalent to the process to be executed by the encoded file selector 146, in which a desired file name is given for file closing, performing the final output as the encoded file.

After step S504, it is determined whether there still remain PCM files to be processed (step S505). If no PCM file to be processed is found, the processing shown in FIG. 21 comes to an end. If a PCM file to be processed is found in step S505, the processing starting with step S501 is performed on the remaining PCM file.

If the sub information is found not written to the encoded data the specified number of times or more in step S503, namely if the sub information could not be written the specified number of times or more by the first process for writing the sub information to the encoded data, the controller 140 controls the parameter setter 147 to change parameters in the high-efficiency encoding process used in the high-efficiency encoder 143 (step S506) and executes the process of step S502 again, thereby redoing high-efficiency encoding and sub information writing.

Thus, by changing parameters for use in high-efficiency encoding to positively generate encoding unused bit REM, sub information can be written (attached) to the encoded data the specified number of times or more.

Changing Parameters:

The following describes the specific contents of the parameter changing of step S506 shown in FIG. 21, which is executed by the parameter setter 147 shown in FIG. 20.

The reason why sub information cannot be written the specified number of times or more is that the number of encoding unused bits are running short as described before. This problem can be solved by intentionally creating encoding unused bits.

The intentional creation of encoding unused bits can be realized by causing the bit allocation calculator 118 of the high-efficiency encoding apparatus 120 shown in FIG. 3 to limit the number of usable bits. As described before, the bit allocation calculator 118 of the high-efficiency encoding apparatus 120 calculates the bit allocation quantity for each unit block by considering existing effects such as so-called masking effect, minimum audible curve and equal loudness curve associated with human auditory sense for example.

This calculation of bit allocation quantity is executed so that the bit allocation within one frame and the bit usage quantity involved therein are limited to within 1696 bits in accordance with the format shown in FIG. 9. In other words, the total actual number of bits Bsum for use in encoding described before is calculated so that Bsum becomes equal to or less than 1696.

To be more specific, normally, 1696 is set as the upper limit to the bit allocation calculator 118 of the high-efficiency encoding apparatus 120 shown in FIG. 3. By changing this value to 1693 for example, a minimum of 3 encoding unused bits can be intentionally created with reliability. Namely, the parameter setter 147 shown in FIG. 20 sets as a parameter the upper limit to the bit allocation calculator 118 shown in FIG. 3.

In the third embodiment, 1696 is normally set. If sub information cannot be written often enough and encoding is required again, this value may be changed to 1693 or 1694 for example to intentionally create encoding unused bits, thereby allocating a sub information writing area.

A value to be actually set can be obtained by analyzing the log output obtained when the data are encoded once with an upper limit of 1696, which will result in more accurate processing. This upper limit need not be always constant for a given file; namely, it may be changed for each frame.

Generally, as the number of encoding unused bits increases, tone quality is affected more seriously. In consideration of this fact, if sub information can be found, by the log output from the sub information writer 144, written often enough to the first half of a certain file during its processing by the parameter setter 147 shown in FIG. 20, then the controller 140 subsequently returns, on the basis of this result, the parameter to a normal value of 1696, thereby minimizing the effects to tone quality.

It should be noted that the parameter setting is performed only when, for a file to be processed, the sub information could not be written often enough after encoding of the file, by feeding back the result of the writing. However, if the speed of encoding is preferred without much considering the effects to tone quality, parameter setting may be performed so that the upper limit of the number of usable bits is lowered beforehand to securely write sub information by a single process.

In the third embodiment, the writing of sub information the specified number of times or more is made on the basis of the absolute quantity of the writing count in the process of step S503 of the processing shown in FIG. 21. This reference condition may be further divided such that sub information is written some times in a minute for example, thereby controlling the writing accuracy of sub information to enhance the matching accuracy at decoding of the sub information without being dependent on individual music data.

So far, the writing of sub information has been described herein on the presupposition that the number of encoding unused bits is 0 to 3. By performing the above-mentioned parameter setting for use in high-efficiency encoding, it is highly possible to occur 4 or more encoding unused bits.

In this case, for example, if the number of encoding unused bits which is 4 or more is an even number, it may be handled in the same manner as 2 encoding unused bits; if the number is an odd number, it may be handled in the same manner as 3 encoding unused bits. Predetermining the use of bits as this allows the control and writing of sub information for any number of encoding unused bits.

Generally, the number of encoding unused bits and its handling are arbitrary; therefore, they may be set by analyzing the nature and trend of encoded format to find a most efficient manner of sub information writing.

In the third embodiment, for the sub information written to encoded data, encoding unused bits are also used as described above, so that the PCM data generated by decoding by the decoder shown in FIG. 7 are not affected in any manner.

Thus, according to the third embodiment, even with recording media such as MD which have no area for recording beforehand the information indicative of sub information such as music creator and music number for example, securely allocating the unused bits of high-efficiency encoded data can construct a system for writing the sub information to more than a certain degree of quantity regardless of the nature of music data. Consequently, a level index associated with the attachment of the sub information of a level independent of the nature of music data can be secured for the reading of the sub information from a recording medium, thereby providing an effective means for providing various services to distributors.

Fourth Embodiment

In the above-mentioned first, second, and third embodiments, at least the comparison between business entity identifiers, the determination of comparison result, and the fee charging processing are executed by the main server. However, these processing operations may also be executed by each music server system. In the fourth embodiment, the comparison between business entity identifiers, the determination of comparison result, and the fee charging processing are executed in each music server system.

Figure 22:
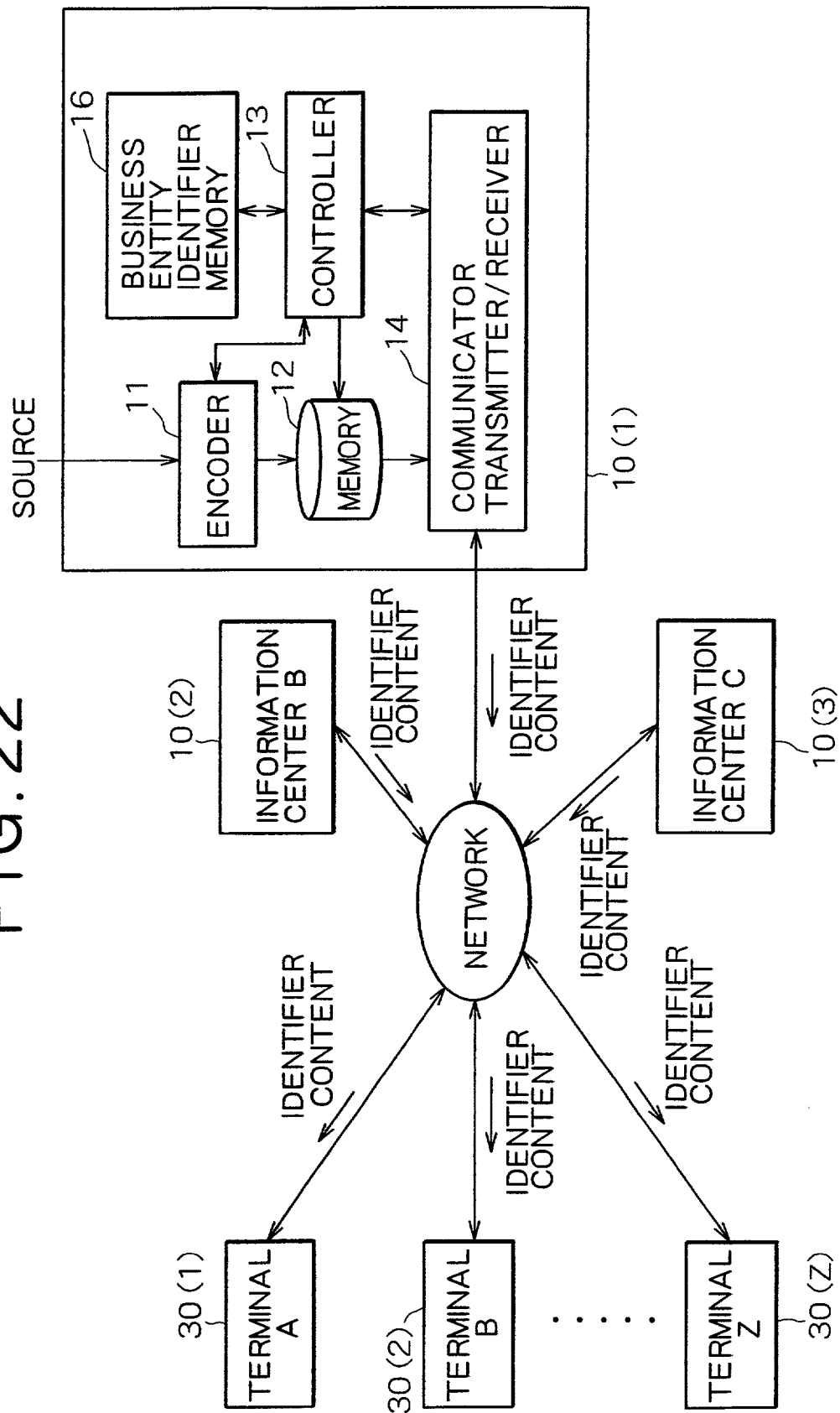
FIG. 22 is a block diagram illustrating the outline of other exemplary music distribution system and main server according to the invention.
Figure 23:
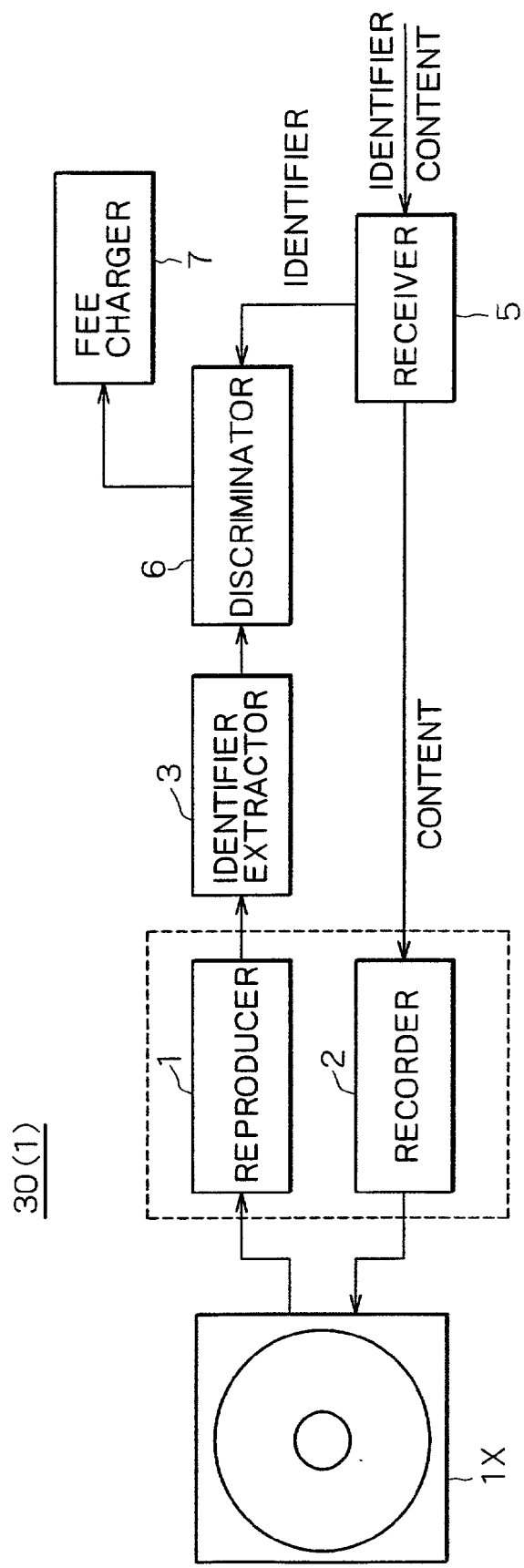
FIG. 23 is a block diagram illustrating the outline of another exemplary music server system according to the invention.

FIG. 22 is a block diagram illustrating the outline of a music distribution system and the outline of a main server system according to the fourth embodiment. FIG. 23 is a block diagram illustrating an exemplary configuration of the music server system according to the fourth embodiment.

As shown in FIG. 22, as with the first, second, and third embodiments, the music distribution system according to the fourth embodiment comprises a plurality of main servers (or information centers) 10(1), 10(2), 10(3) and so on interconnected through a communication network and a plurality of music server systems (or terminals) 30(1), 30(2) through 30(Z) (Z being a positive integer).

As with the main servers of the first, second, and third embodiments, each of the main servers 10(1), 10(2) and so on of the fourth embodiment is a server system of a so-called authorized seller (or business entity) who owns the rights such as music data distributorship for selling music data, thereby handling and managing many music server systems 30(1), 30(2) through 30(Z).

Each of the main servers 10(1), 10(2), 10(3) and so on of the fourth embodiment is managed by a different business entity for example and its basic configuration is generally the same as that of the main servers 10(1) of the first, second, and third embodiments shown in FIG. 1 except for the comparator 15 and the fee charger 17. Hence, the portions of the main servers 10(1), 10(2), 10(3) and so on of the fourth embodiment which are the same in configuration as those of the main servers 10(1), 10(2), 10(3) and so on of the first, second, and third embodiments are denoted by the same references as those of the main servers of the first, second, and third embodiments and their description will be omitted.

In each of the main servers 10(1), 10(2), 10(3) and so on of the fourth embodiment, an audio PCM signal is high-efficiency encoded in an encoder 11 and a business entity identifier from a business entity identifier memory 16 supplied through a controller 13 is attached to the encoding unused bits of a frame in which these bits occurred.

The music data thus high-efficiency encoded and attached with the business entity identifier as sub information are stored in a hard disk 12, which is a mass memory. The music data stored in the hard disk 12 are distributed to music server systems concerned through a communication network.

On the other hand, as with the above-mentioned music server systems 30(1), 30(2) through 30(Z) of the first, second, and third embodiments, each of the music server systems 30(1), 30(2) through 30(Z) of the fourth embodiment is installed at the store to record music data provided by the main server to which this music server system belongs into a user's external recording medium such as MD.

The music distribution system of the fourth embodiment is also configured to allow the movement of music data between recording media and the upgrading of music data as a new service. As described before, the upgrading of music data denotes the replacement of the music data processed by a related-art high-efficiency encoding with the music data processed by a high-efficiency encoding with its algorithm upgraded for enhanced compression ratio or tone quality.

The movement of music data between recording media or the upgrading of the music data can be performed after whether or not the music data recorded to a user's recording medium loaded in a music server system to be moved between recording media or to be upgraded are those provided by the main server providing the music data to that music server system are determined and these music data are found provided from that main server.

The following describes the processing to be executed at the time of moving music data between recording media or the upgrading of the music data by use of an example in which a user's recording medium is loaded in the music server system 30(1). In this case, it is assumed that the main server which manages the music server system 30(1) such as providing music data to the music server system 30(1) be the main server 10(1).

When a user's recording medium, an external recording medium 1X, recorded with music data to be moved between recording media or to be upgraded is loaded in the music server system 30(1) and the user starts the desired processing, a reproducer 1 of the music server system 30(1) reads the target music data from the external recording medium 1X and supplies these music data to an identifier extractor 3.

The identifier extractor 3 extracts a business entity identifier from the encoding unused bits of the supplied music data and sends the extracted identifier to a discriminator 6. Also supplied to the discriminator 6 is a business entity identifier supplied from the main server 10(1) through a receiver 5 of the music server system 30(1).

The discriminator 6 compares the business entity identifier extracted by the identifier extractor 3 from the music data read from the external recording medium 1X with the business entity identifier supplied from the main server 10(1) and received at the receiver 5 to determine whether or not they match each other.

If both the business entity identifiers are found matching by the discriminator 6, it indicates that the target music data recorded in the external recording medium 1X and subject to movement between recording media or upgrading are those supplied from the main server 10(1). In this case, the discriminator 6 controls the fee charger 7 for predetermined fee charging.

If the user responds to this fee charging, the music data supplied from the main server 10(1) and received at the receiver 5 are recorded to another external recording medium through a recorder, not shown in FIG. 23, for the movement of these music data between recording media or the music data supplied from the main server 10(1) and received at the receiver 5 are written over the external recording medium 1X through the recorder 2 for upgrading of these music data.

It should be noted that the business entity identifier and music data from the main server 10(1) may be provided to each music server system beforehand, thereby eliminating the necessity for the music server system to get the business entity identifier and music data from the main server 10(1) every time the user demands the movement of music data between recording media or the upgrading of the music data.

Obviously, each music server system may communicate with the main server 10(1) to get the business entity identifier and music data every time the user requests the movement of the music data between recording media or the upgrading of the music data.

Specific Example of the Main Server of the Fourth Embodiment:

Each of the main servers 10(1), 10(2), 10(3) and so on of the fourth embodiment may be configured in generally the same manner as that of the main servers 10(1), 10(2), 10(3) and so on shown in FIG. 13. Therefore, a specific example of the main server of the fourth embodiment will be described as having the same configuration as that shown in FIG. 13.

However, as described before, because fee charging is performed on the music server system side, the fee charger 85 may not be arranged on the main server 10. If the main server manages the information about the fee charging of each music server system for example, the fee charger 85 may be left as it is for use in the management of fee charging.

In the case of the main server 10 of the first, second, and third embodiments, the main controller 81 also functions as a comparator for comparing the business entity identifier from the music server system and the business entity identifier held in the main server and as a discriminator for determining whether these business entity identifiers match each other on the basis of the comparison result. However, in the fourth embodiment, these functions are provided by each music server system and therefore the main server 10 need not provide them.

The main functions of the main server 10 of the fourth embodiment are the high-efficiency encoding of audio PCM signals, the attachment of the business entity identifier to the high-efficiency encoded data as sub information, the storage of the resultant data into own hard disk 12, and the provision of the stored music data (or encoded data) to each music server system as required.

Specific Example of the Music Server System of the Fourth Embodiment:

Each of the music server systems 30(1), 30(2) through 30(Z) of the fourth embodiment may be configured in generally the same manner as that of the music server system 30 of the first, second, and third embodiments shown in FIG. 14. Therefore, a specific example of the music server system of the fourth embodiment will be described as having the same configuration as that shown in FIG. 14.

In the case of the music server system 30 of the fourth embodiment, in order to perform even fee charging by the music server system 30, the function as a fee charger in which an amount of fee corresponding to a provided service is calculated, the payment for this amount is requested, and it is determined whether the amount paid through the payment section corresponds to the requested amount of fee is given to the main controller 31 by means of software for example which is run thereon. Obviously, the fee charger may be arranged separately.

Also, in the case of the music server system 30 of the fourth embodiment, the control file table shown in FIG. 15 is provided and, by referencing the detection frame number of this control file table, the business entity identifier attached to music data can be detected quickly and correctly.

Figure 24:
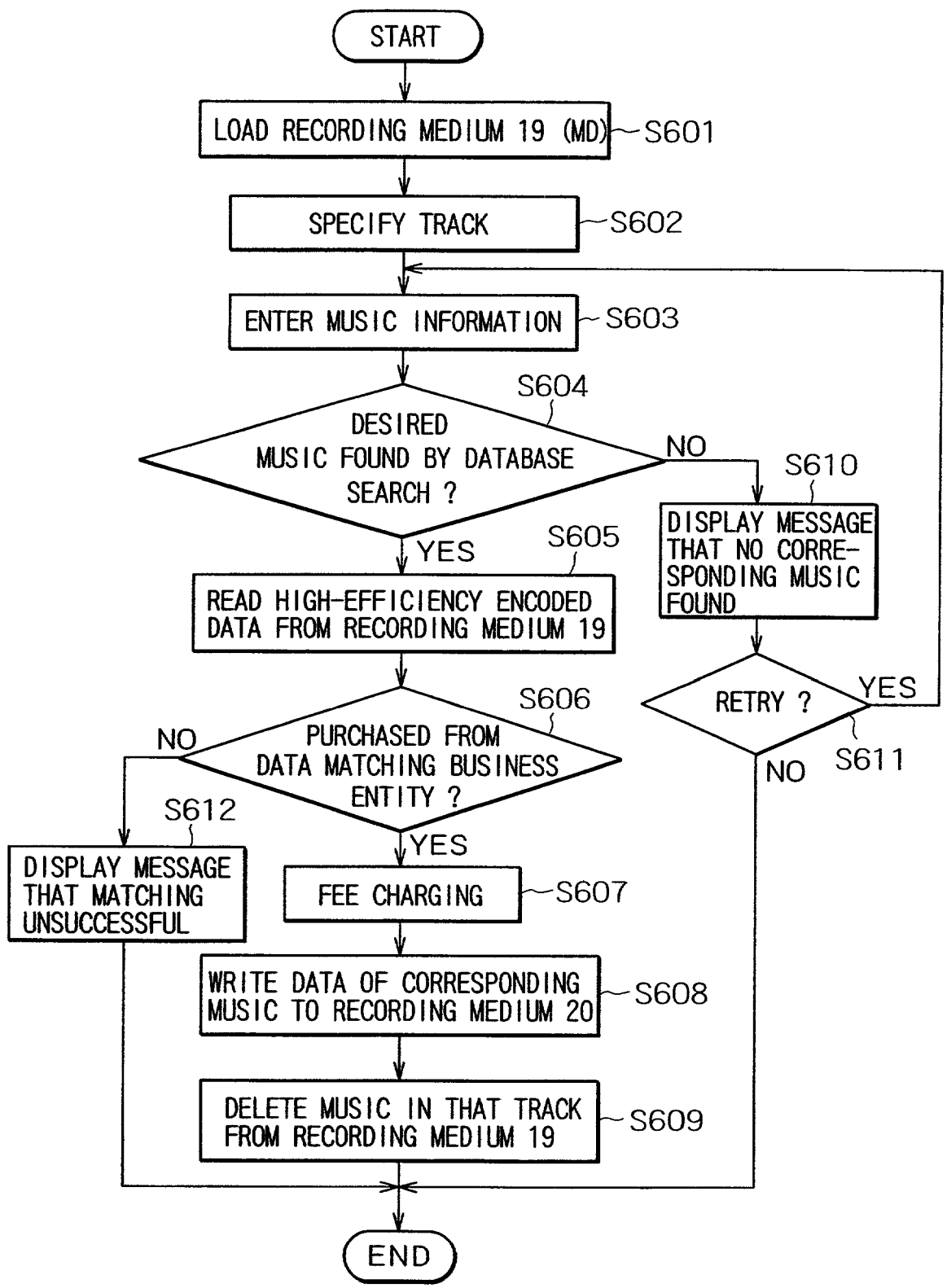
FIG. 24 is a flowchart describing the processing to be executed at the time of music data movement between recording media in the music distribution system shown in FIG. 22.

Operation to be performed when music data are moved between recording media of the fourth embodiment:

The following describes the operation of the music server system 30 to be performed when moving music data from an external recording medium 19 which is an MD to an external recording medium 20 which is an MS in the music server system 30 of the fourth embodiment with reference to the flowchart shown in FIG. 24.

The processing shown in FIG. 24 is executed mainly by the main controller 31 of the music server system 30. First, the music server system 30 of the fourth embodiment shown in FIG. 14 accepts the insertion (or loading) of the external recording medium 19 (MD) recorded with purchased music data into a reader/recorder 35 (step S601). Next, the main controller 31 of the music server system 30 accepts the specification of the track of music data to be moved, among the music data recorded to the recording medium 19, entered from the operator section 34 (step S602).

The main controller 31 of the music server system 30 accepts the information indicative of the music data to be moved, through the operator section 34 (step S603). On the basis of the information accepted in step S603, the music server system references a database owned by the distributor shown in FIG. 15 to find the music data to be moved (step S604).

The process of step S604 searches for owned music data to be matched in step S606. The information for use in searching for the music data subject to moving accepted in step S603 includes music title information and artist information for example. As the information inputted in step S603 increases, the search becomes faster and more reliable.

If the music data to be moved are not found in step S604, then the music server system 30 displays a message indicative thereof on the display section 33 (step S610) and determines whether a command for retry has been accepted (step S611). If the command for retry is found accepted, the music server system 30 repeats the processing starting from step S603. If no retry is made, the processing shown in FIG. 24 comes to an end.

In searching for the music data to be moved in step S604, if these music data are found, the high-efficiency encoded data (music data) are read from the recording medium 19 (MD) loaded in the reader/recorder 35 (step S605).

In step S605, all encoded information of the music data may be read; however, the matching speed may be enhanced by reading desired frames of encoded information starting from the start frame number of matching data in step S606 on the basis of detection frame number in the database shown in FIG. 15.

The music server system 30 determines whether the high-efficiency encoded data read from the user's recording medium 19 in step S605 are those provided by the distributor (business entity) operating the music server system 30 of the fourth embodiment (step S606).

The above-mentioned matching between the high-efficiency encoded data may be made by detecting the business entity identifier recorded by use of the unused bits (or encoding unused bits) of the encoded data and comparing the detected identifier with the business entity identifier supplied from the main server 10, thereby determining whether the music data are those purchased from the business entity operating the main server 10.

As described before, in the case of the music distribution system, on the presupposition that the music data for distribution are high-efficiency encoded by software, the music data owned by the music server system 30 which is the music data distributor or the main server 10 may be compared with the music data for moving recorded to the external recording medium 19 to further enhancing the matching accuracy.

If a mismatch is found in step S606, then a message indicative thereof is displayed on the display section 33 shown in FIG. 14 (step S612), upon which the processing shown in FIG. 24 comes to an end. In step S612, message "Requested music was not sold on this system; please check the music again" for example is displayed.

If a match is found in step S606, then predetermine fee charging is executed (step S607). As described before, the price of the matching music data may be lowered or made free of charge. In the free-of-charge case, message "You will not be charged for moving music between recording media" for example is displayed in step S607.

Next, the high-efficiency encoded data for the recording medium 20 (MS) for these music data are written to the user's external recording medium 20 (MS) loaded in the reader/recorder 36 (step S608). Then, the music server system 30 deletes through the reader/recorder 35 the track recorded with the information about these music data recorded to the recording medium 19 (MD) (step S609), upon which the processing shown in FIG. 24 comes to an end.

If, for example, in the fee charging in step S607, a certain degree of fee is charged and when the user accepts this fee charging, the deletion of music data performed in step S609 may not be performed, thereby providing a new service of copying data in a recording medium rather than the movement between recording media.

If an identification code for music itself, ISRC (International Standard Recording Code) for example, is recorded as sub information to the first sub information recording area, the process of step S603 may be skipped by reading this information about music itself.

Thus, by use of the business entity identifier attached to the encoding unused bits of encoded data, if there exist two or more music data distributing business entities, a particular business entity of the music data recorded to the user's external recording medium through the music distribution system can be known easily and surely, so that each business entity can provide new services such as the movement of music data between recording media and the upgrading of music data only to the users of the music data distributed by that business entity at low cost or free of charge.

As described, the comparing processing for the sub information such as business entity identifiers attached to encoded data which are music data and the fee charging processing may be performed either on the main server side as with the first, second, and third embodiments or on the side of each music server system managed by the main server as with the fourth embodiment.

Variations of New Services:

The following describes new services which can be realized by the attachment of the sub information such as business entity identifiers to the encoding unused bits of music data (encoded data) to easily and surely determine the business entity for distributing music data as detailed with the first, second, third, and fourth embodiments. It should be noted that recording medium A and recording medium B are different from each other; it is assumed in the following description that recording medium A is an MD and recording medium B is an MS for example.

Figure 25:
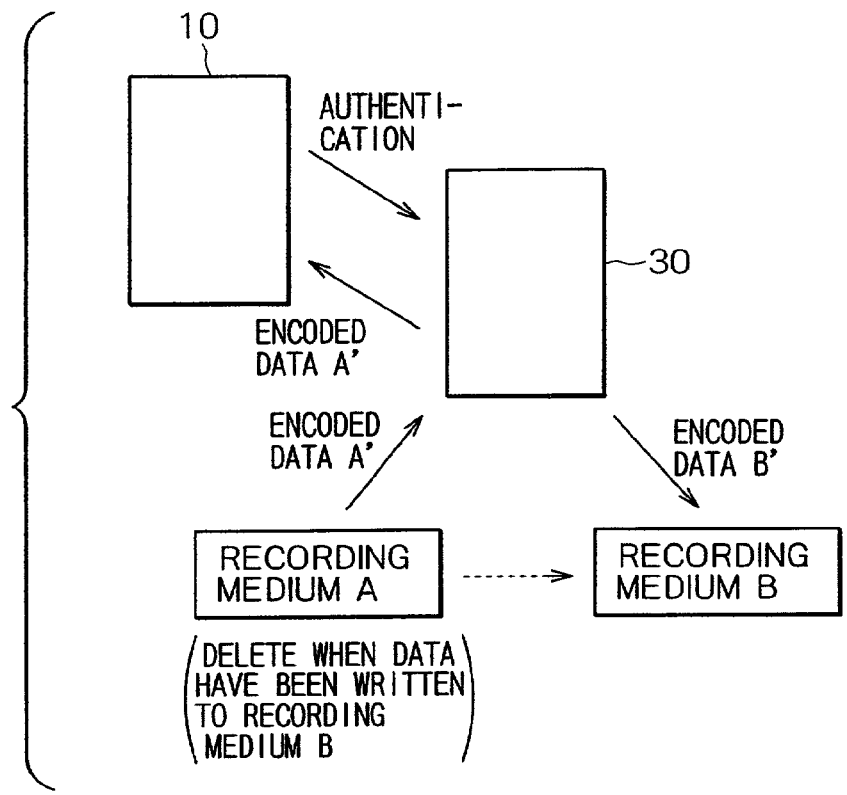
FIG. 25 illustrates data flows at the time of music data movement between recording media as a service which becomes newly providable.

FIG. 25 illustrates the movement of music data between recording media (a move service). To be more specific, FIG. 25 illustrates the flow of data at the time of moving music data between recording media described with reference to FIGS. 16, 17, and 24.

As shown in FIG. 25, the business entity identifier attached to encoded data A' which are the music data recorded to recording medium A is compared with the business entity identifier held in the main server 10. If a match is found, encoded data B' which are the same music data are transferred to the user's recording medium B to be recorded thereto.

Therefore, the movement of music data is performed along the processing flow indicated by solid arrow lines from the reading and matching of encoded data A' to the transfer of encoded data B'. From the viewpoint of the user, this processing appears as the movement of music data from recording medium A to recording medium B as indicated by a dashed arrow line. If the encoded data of recording medium A are not deleted, this dashed arrow line indicates the copying of music data from recording medium A to recording medium B.

Figure 26:
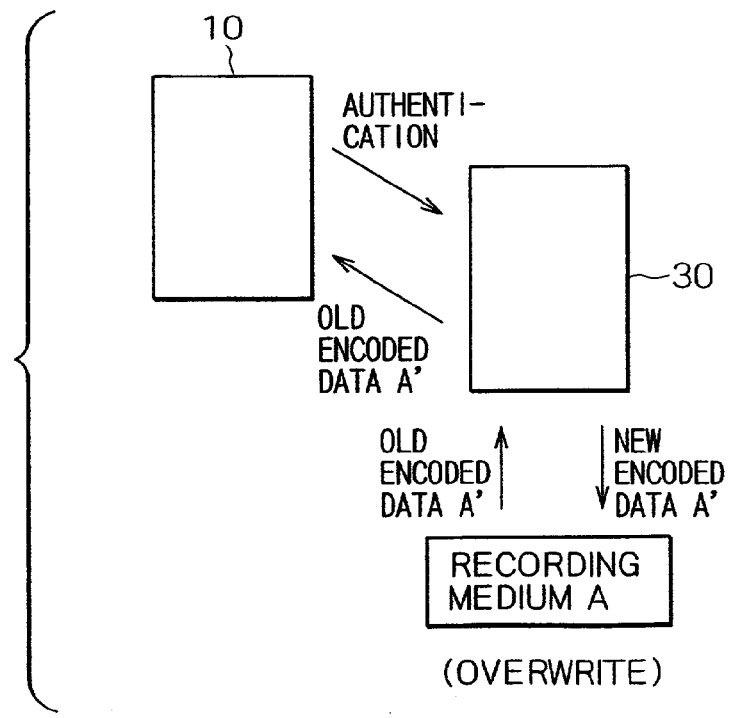
FIG. 26 illustrates data flows at the time of using a music data encoding computation upgrading processing service which becomes newly providable.

FIG. 26 illustrates the flow of data at the time of using one of services in which rewriting is made between recording media of the same type, MDs for example, for upgrading the high-efficiency encoding algorithm for the enhancement of tone quality resulting from the sophistication of high-efficiency encoding computation. Namely, FIG. 26 illustrates the flow of data which takes place for the upgrading of music data. In processing, step S608 shown in FIG. 24 becomes the overwriting of recording medium A and step S609 in FIG. 24 is omitted. Here, the fee charging in step S607 may be performed or the fee charging may be omitted for provide the service free of charge.

In this case, the business entity identifier attached to old encoded data A' of recording medium A requested for upgrading may be compared with the business entity identifier held in the main server 10 to write, if a match is found, new encoded data A' over old encoded data A' of recording medium A, thereby upgrading old encoded data A'.

Figure 27:
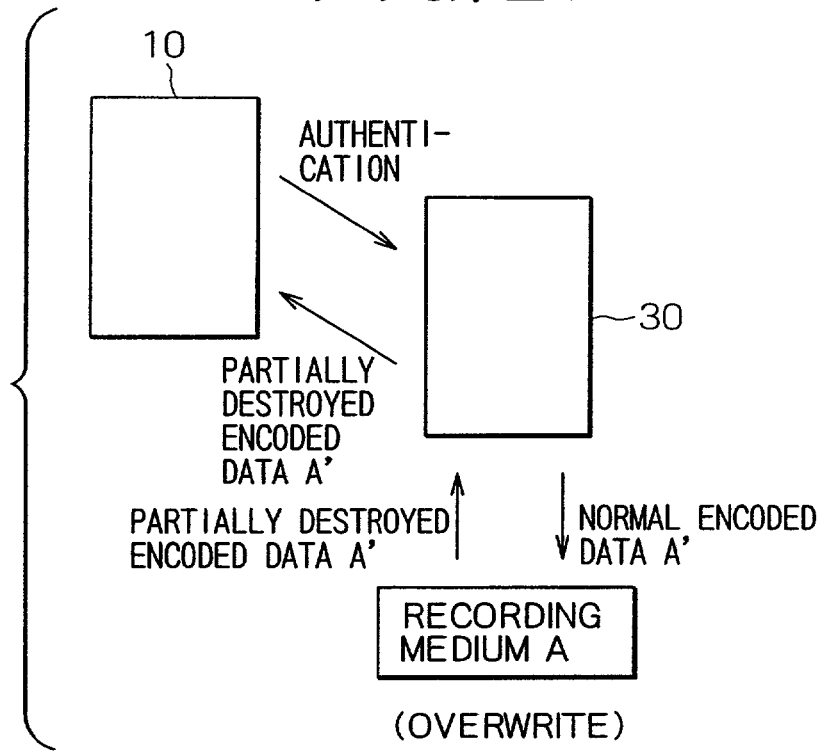
FIG. 27 illustrates data flows at the time of using a partially destroyed music data writing retry service which becomes newly providable.

FIG. 27 illustrates the flow of data at the time of using one of services in which rewriting is made on one recording medium for making corrections by overwriting if the data located outside the above-mentioned detection frame subject to comparison are destroyed or a write failure caused before is found. The processing is the same as that shown in FIG. 26.

Figure 28:
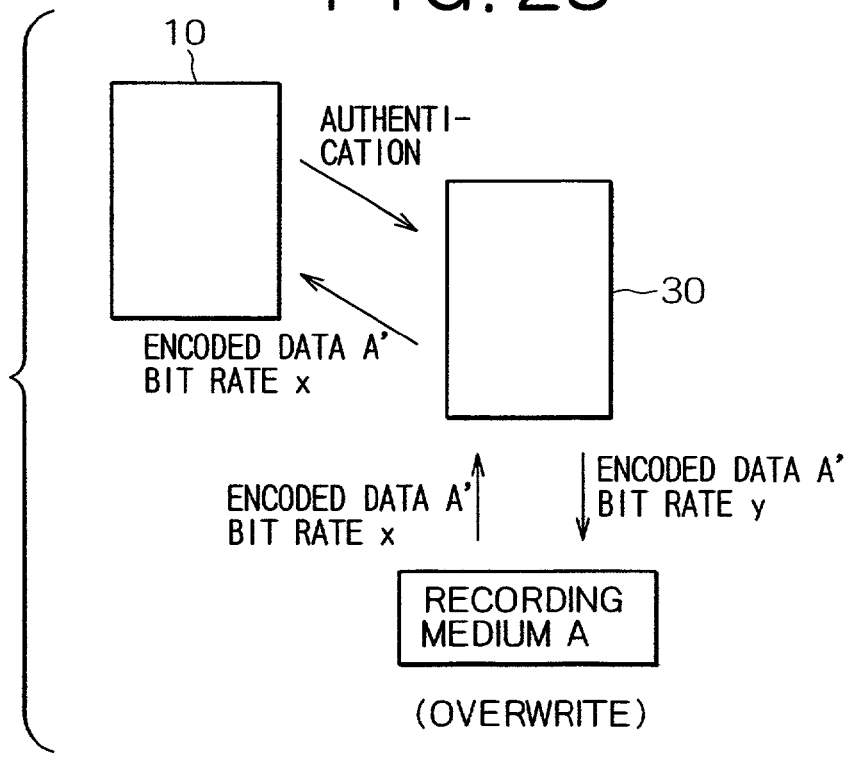
FIG. 28 illustrates data flows at the time of using a music data bit rate change service which becomes newly providable.

FIG. 28 illustrates the flow of data at the time of using one of services in which rewriting is made on one recording medium for making corrections by rewriting if the bit rate of encoded data writable to recording medium A for example is to be changed. The processing is the same as that shown in FIG. 26.

If a database for storing customer information for example is created, passwords for example may be issued to the registered customers for managing them, thereby providing the above-mentioned services for example for the music data purchased by customers before.

Figure 29:
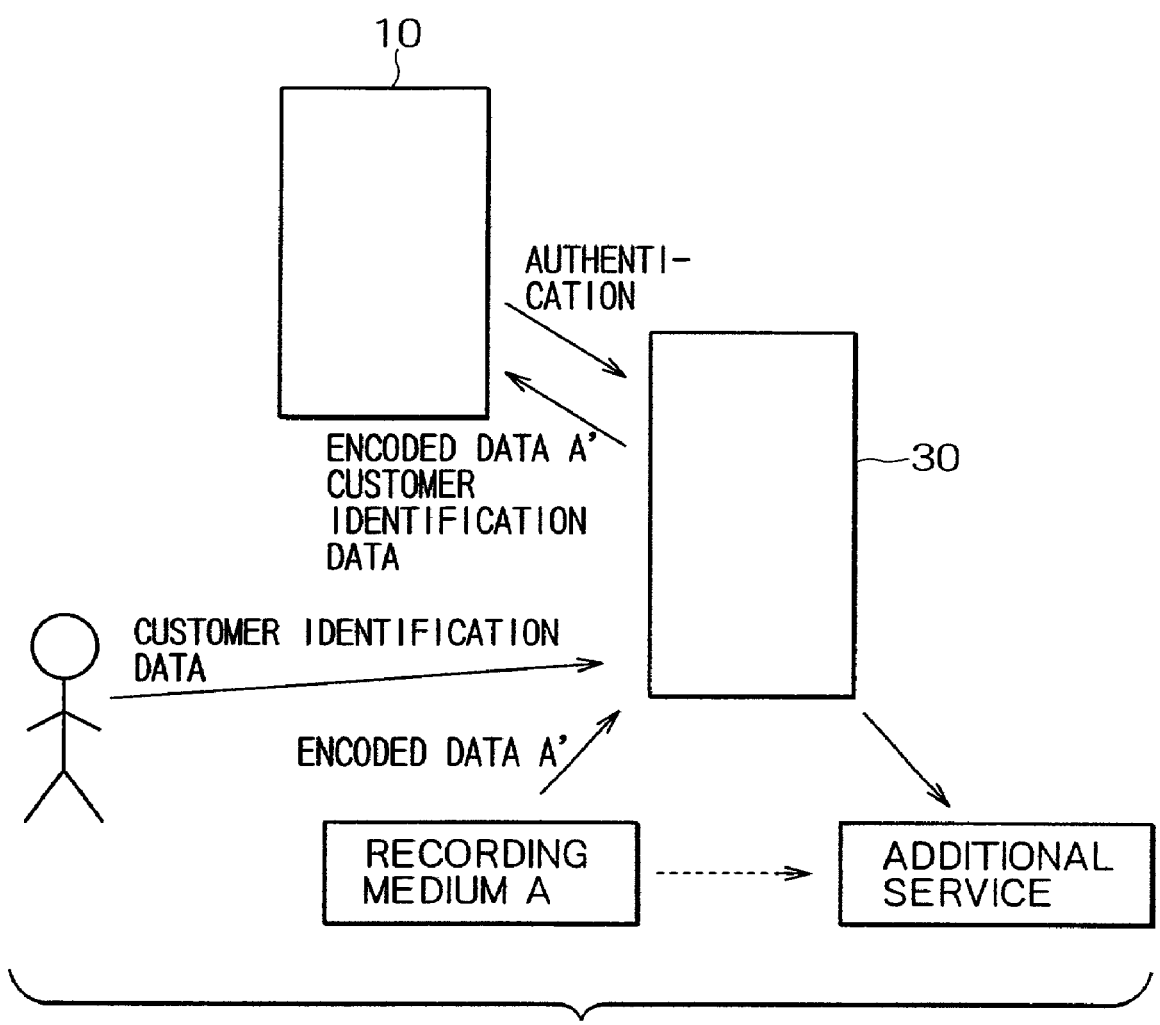
FIG. 29 illustrates data flows at the time of using a music data adding service which becomes newly providable.

FIG. 29 illustrates the flow of data at the time of using the above-mentioned services provided by the music server system, in which additional services are provided by performing authentication by matching both music data and customer information by entering a unique password for example as customer identification data in addition to the data of recording medium.

Use of the customer identification data is intended to prevent a same customer from being provided with the above-mentioned additional services many times. Specific additional services include giving a present only to those customers who bought 10 or more pieces of music of artist C for example. At this time, the circulation of recording media among customers intended for getting a present may be prevented by managing the customer database to make sure that the service concerned has already been provided to the customer concerned.

The additional services shown in FIG. 29 may include the provision of service tracks, the installation of a quality printer on the music server system 30 to provide pictures of user's favorite artists, the issuing of various discount tickets, the provision of discounts or presents in accordance with service points accumulated by each customer, and so on.

In any services shown in FIGS. 25 through 29, only comparing the business entity identifier attached to the encoding unused block of the music data recorded to a user's external recording medium loaded in the music server system 30 with the business entity identifier held in the main server 10 or the music server system 30 allows the easy and sure determination whether or not the music data recorded to the external recording medium loaded in the music server system 30 are those provided from the main server 10 through the music server system 30, as described above.

It should be noted that these business entity identifier comparison and determination are performed on the side of the main server 10 in the examples shown in FIGS. 25 through 29 as with the first, second, and third embodiments for authentication if a match is found between the identifiers. However, these comparison and determination may also be performed on the side of the music server system 30 as with the fourth embodiment.

Music data to be newly provided may be provided from the main server 10 to the music server system 30 every time the music data are requested or the new music data provided from the main server 10 and stored in the hard disk 32 of the music server system 30 beforehand may be provided.

In the above-mentioned embodiments, user's external recording media are loaded in the predetermined music server system 30 to get the above-mentioned services. However, user's recording media need not always be loaded in the music server system from which music data were recorded to these recording media.

Any external recording media recorded with music data from the music server systems 30(1), 30(2) through 30(Z)

connected to the main server 10 shown in FIG. 14 may receive the same services at any of the music server systems 30(1), 30(2) through 30(Z).

To be more specific, the reason why the identity of main server is determined by use of the business entity identifier, rather than the music server system, is that any of the music server systems managed by the main server 10 become to be capable of providing the same services. Thus, if the source of the provision of music data is found the same, new services can be provided through any of the music server systems, thereby significantly enhancing user convenience.

Not only in the case of the above-mentioned services, but also in the case of handling claims associated with the recording of purchased music data to user's recording media (such as analysis of defective recording media), the redistribution of music data can be realized by determining whether or not the music data were officially purchased from the distributor (or business entity).

As described, a music server system having generally the same configuration as shown in FIG. 14 may be installed in the home and the matching of business entity identifiers is performed from the main server through a communication line such as the Internet, thereby providing the above-mentioned services.

It is also practicable to apply the present invention as a means for realizing the capabilities of so-called check-in and checkout with a mass recording medium such as a hard disk. Namely, arrangements are made so that the music data stored in a predetermined hard disk may be copied up to 3 times for example.

Every time the music data are recorded from the predetermined hard disk to a user's MD, the copy count is decremented by one. Such an output from hard disk to MD for example is called a checkout operation. When the music data copied to the MD are returned to the hard disk and then deleted from the MD, the copy count of these music data is returned by one. Such a return from MD to hard disk is called a check-in operation.

In order to prevent music data not outputted from the hard disk from being returned thereto at the time of check-in, the serial number for example unique to the hard disk may be attached as a hard disk identifier to the encoding unused bit block. This determines whether these music data were checked out from the hard disk, thereby allowing the check-in of only the music data checked out from the hard disk.

Therefore, use of the present invention allows to perform check-in and checkout operations also with MDs having no medium identifier.

It should be noted that, as described with the above-mentioned embodiments, the main server has a function of transmitter for transmitting music data. In the above-mentioned embodiments, the encoded data (music data) formed by high-efficiency encoding are once stored in the memory of the main server 10 and the stored encoded data are read as required for the provision to the music server system 30. However, the present invention is not limited to these embodiments.

For example, the audio PCM signal of music data may be high-efficiency encoded and, at the time of this high-efficiency encoding, the high-efficiency encoded data may be provided to the music server system 30. Thus, the timing of distributing the encoded data which are music data to the music server system may be set in any desired manner depending on the configuration of the music distributing system to be constructed.

In the above-mentioned embodiments, the high-efficiency encoding is performed on the side of the main server 10. The present invention is not limited to these embodiments. For example, another embodiment may be practiced in which high-efficiency encoded music data are provided, the unused bits are detected from each frame of the provided music data, and sub information such as business entity identifier is attached to the detected unused bits. Therefore, the present invention may also provide an apparatus and method in which sub information is attached to the received high-efficiency encoded digital data.

In the above-mentioned embodiments, sub information is attached to the unused bits of high-efficiency encoded data. In this case, modulation based on so-called biphase encoding such as Manchester encoding may be performed on the sub information to attach a synchronous code (sync code) to the modulated sub information, thereby sequentially attaching the sync code and modulated sub information to the unused bits of encoded data.

The modulation based on biphase encoding changes levels from high to low at the middle of bit interval when sending binary "0" and from low to high when sending binary "1" for example, thereby modulating the data to be sent.

Thus, if a sync code and modulated sub information are attached to the unused bits of encoded data, the presence of the sync code allows the sequential attachment of the modulated sub information to the unused bit portion of plural frames of comparatively long encoded data independently of the unused bits (fractional portion) of each frame of the encoded data. At detection of the sub information, the sync code allows the quick detection of the head of the sub information.

The sub information modulated by biphase encoding has little direct-current component and its clock component allows easy and correct demodulation, so that the restrictions on the number of digits at attaching sub information to the unused bits of encoded data can be mitigated, thereby allowing the flexible attachment of the sub information to encoded data. It should be noted that various other modulating algorithms may be used for modulating encoded data, in addition to the modulation based on biphase encoding.

The sub information to be attached to encoded data includes not only business entity identifier (or business entity identification data), music identifier (or music identification data), and source identifier indicative of the generation source of music data, but also restrictive information about services for providing service usage period and service usage fee, various control information, and other various pieces of information.

For example, copyright information identifier, URL information identifier, fee charging information identifier, device information identifier, reproduction count identifier, and other various information identifiers may be attached to encoded data as sub information.

In this case, copyright information identifier identifies the copyright of content such as music data, which can identify content itself. Copyright information identifier is often created and used by content provider associations and content industry associations.

URL information identifier specifies the information for accessing so-called Web pages associated with music data or the information about this access operation. Attachment of this URL information identifier to music data which are encoded data allows the retrieval of information through a Web page for every piece of music data at their reproduction.

To be more specific, a service may be provided, in which, when reproducing music data from a recording medium on a personal computer or a player connected thereto, the URL identification information is extracted from the music data, a desired Web page is automatically accessed from the personal computer on the basis of the extracted URL identification information, and the information associated with the music data is automatically obtained through the Internet.

In this case, the information obtained through a Web page for each piece of music includes the information about words, scores, and artists of music, images, concert schedules of the artist of this music, schedules of sale of newly released recording media, and other various pieces of information.

Fee charging information identifier can provide the information about fee charging of the music data to which this identifier is attached. Device information identifier can identify the device by which music data were actually recorded to a recording medium. Reproduction count identifier can identify the number of times music data can be reproduced. Use of these reproduction count identifier and fee charging information identifier together can realize the limitation of the reproduction count in accordance with fee charging.

The sub information to be attached to encoded data is not limited to one type only; two or more types of sub information may be attached. In this case, different types of sub information may be delimited with a predetermined code for example.

In the above-mentioned embodiments, sub information is attached to the unused bits (a fractional portion) of each frame of encoded data. Alternatively, sub information may be attached to a TOC which is a control area of a recording medium to which encoded data are recorded, or the header of each frame. For the backup of the sub information to be attached to the unused bit block, the sub information attached to the unused bit block may be attached to both or one of TOC and frame header.

In the above-mentioned third embodiment, if a predetermined quantity of sub information could not be attached, the parameter (the upper limit of bit allocation) for use in high-efficiency encoding is changed to perform high-efficiency encoding again, thereby providing unused bits enough for accommodating a predetermined quantity of sub information to be attached to high-efficiency encoded data. However, the present invention is not limited to this embodiment.

For example, the parameter for use in high-efficiency encoding may be changed from the beginning to provide more unused bits than usual. In this case, high-efficiency encoding need not be performed again, so that the encoded data attached with sub information may be formed quickly.

However, taking unused bits more than usual leads to a smaller amount of the spectrum data constituting music, thereby possibly deteriorating the tone quality of the music data to be reproduced by the spectrum data. Therefore, it is more preferable to attach sub information by performing high-efficiency encoding and, if a predetermined quantity of sub information could not be attached, the parameter change is made to perform high-efficiency encoding again, thereby minimizing the deterioration of the tone quality.

For the encoded data such as music data for sampling for which tone quality is not of main concern, two methods may be selectively used: in one method, many unused bits are provided in a quantity enough for attaching sub information more than a predetermined quantity in a single operation; in the other method, for music data for which tone quality is of main concern, the music data are high-efficiency encoded again only when the sub information could not be attached in a predetermined amount, thereby allocating minimum necessary unused bits.

To be more specific, in a device for performing high-efficiency encoding such as the main server 10, either more unused bits than usual may be generated for the encoded data formed by high-efficiency encoding or, if the sub information could not be attached in a predetermined quantity, parameter change may made to perform high-efficiency encoding again.

If the former, namely the generation of more unused bits, is selected, a parameter other than usual is used in the device for performing high-efficiency encoding or a parameter specified by the user is accepted to perform high-efficiency encoding, thereby attaching a predetermined quantity of sub information to encoded data in a single high-efficiency encoding operation.

Conversely, if the latter, namely parameter change is made to perform high-efficiency encoding again if a predetermined quantity of sub information could not be attached to encoded data, is selected, the high-efficiency encoding device may add sub information to encoded data as with the above-mentioned third embodiment. Consequently, the two sub information attaching methods can be selectively used.

In the above-mentioned embodiments, digital audio data for example are high-efficiency encoded. The present invention is not limited to these embodiments. In addition to audio data, the present invention is applicable to still picture data and moving picture data which are high-efficiency encoded to be recorded to recording medium for the provision to users.

In the above-mentioned embodiments, ATRAC is used for high-efficiency encoding for example. The present invention is not limited to these embodiments. For example, various other high-efficiency encoding algorithms may be used such a MPEG (Moving Picture Experts Group), MP3 (MPEG Audio Layer 3), AAC (Advanced Audio Coding), WMA (Windows (trademark) Media Audio), ATRAC3 (advancement of ATRAC), and Twin-VQ (Transform-Domain Weighted Interleave Vector Quantization).

If the provision of many services as described above becomes available, services requested by users through the operator section of the music server system are accepted to provide the requested services to the requesting users.

In the above-mentioned embodiments, the music server 30 is supplied with music data which are encoded data from the main server via a predetermined communication line. The present invention is not limited to these embodiments. For example, music data encoded by high-efficiency encoding and attached with sub information to the encoding unused bit portion (or remainder portion) of each frame of the encoded data are recorded to a recording medium such as an optical disc for example, which is delivered for example to the store at which the music server system is installed.

The delivered optical disc is loaded in the music server system in the store. Directly from this optical disc, music data may be provided to users or music data may be once stored from this optical disc into the hard disk of the music server system to be provided to users.

In this case, the music distribution system may not have the main server and be constituted by only music server systems, which perform all of the detection of additional data from music data which are encoded data, the matching of detected sub information, the determination of service provision on the basis of a matching result, and the provision of services.

The high-efficiency encoding apparatus and the sub information writer may be arranged on the side of the music server system 30, thereby attaching, in the music server system 30, information such as own system's identification code to the music data to be provided to users.

As described and according to the invention, sub information is written to the fractional portion of encoded data, namely the remaining bit portion of encoded data having a predetermined format, without especially arranging an area for sub information to be attached to encoded data, thereby attaching sub information to encoded data. Consequently, the attachment of sub information to encoded data does not increase the absolute quantity of the encoded data and the attached sub information does not affect the encoding.

The sub information attached to encoded data allows the identification of the providing source of the sub information and the sure determination of the validity of provision route. Consequently, the present invention facilitates the provision of such new services to be provided to each provider of encoded data as the movement of encoded data between recording media and the verification of defective recording media.

While the preferred embodiments of the present invention have been described using specific terms, such description is for illustrative purposes only, and it is to be understood that changes and variations may be made without departing from the spirit or scope of the appended claims.

What is claimed is:

1. A data distribution system including:
a distribution center apparatus for dividing digital content data into parts in many frequency bands, converting said divided part of digital content data included in each of said many frequency bands into a piece of encoded data composed of many compressed blocks each having a predetermined length unit and being constituted by at least bit distribution information, normalized data and quantized data, and transmitting said encoded data in such a manner as to superimpose, if an empty portion exists in each of said many blocks, a part or all of an identifier for identifying a provider of said digital content data onto said empty portion,
wherein the predetermined length unit is set as a function of time characteristics and a frequency distribution of a supplied signal; and
a terminal apparatus connected to said distribution center apparatus through a predetermined communication line, said terminal apparatus including recording means for recording said digital content data provided as said encoded data from said distribution center apparatus to a recording medium loaded in said terminal apparatus,
said data distribution system comprising:
reading means for sequentially reading the blocked encoded data from said recording medium loaded in said terminal apparatus;
first discriminating means for discriminating whether each block of said encoded data read by said reading means has said empty portion;
extracting means for extracting data of said empty portion from said each block found as having said empty portion by said first discriminating means;
demodulating means for demodulating said identifier for identifying said provider on the basis of said data extracted by said extracting means;
second discriminating means for discriminating whether said digital content data, which are the encoded data read from said recording medium loaded in said terminal apparatus, are those provided by said distribution center apparatus, which is legitimate, on the basis of said identifier for identifying said provider demodulated by said demodulating means; and
control means for performing predetermined control processing if said digital content data, which are said encoded data read from said recording medium loaded in said terminal apparatus, are found provided from said legitimate distribution center apparatus.

2. The data distribution system according to claim 1, further comprising:
fee charging means for performing fee charging when said digital content data supplied from said data distribution apparatus are provided through said terminal apparatus;
wherein, if said digital content data, which are said encoded data read from said recording medium loaded in said terminal apparatus, are found provided from said legitimate distribution center apparatus by said second discriminating means, said control means controls said fee charging means so that said digital content data is provided at a discount or free of charge.

3. The data distribution system according to claim 1, wherein said predetermined control processing to be performed by said control means is updating of said digital content data recorded to said recording medium to be read.

4. The data distribution system according to claim 3, wherein said updating of said digital content data recorded to said recording medium is to write digital content data encoded by a new encoding algorithm over said digital content data recorded to said recording medium.

5. The data distribution system according to claim 3, wherein said updating of said digital content data recorded to said recording medium, if said digital content data recorded to said recording medium is destroyed, is to write digital content data over the destroyed digital content data, the overwriting digital content data being the same as the destroyed digital content data before destruction.

6. The data distribution system according to claim 3, wherein said updating of said digital content data recorded to said recording medium is to write digital content data corresponding to said digital content data recorded to said recording medium and enhanced in bit rate over said digital content data recorded to said recording medium.

7. The data distribution system according to claim 1, wherein said predetermined control processing to be performed by said control means is moving of said digital content data recorded to said recording medium to be read to another recording medium.

8. The data distribution system according claim 1, wherein said predetermined control processing to be performed by said control means is to issue to a purchaser of said digital content data a right of getting a predetermined benefit.

9. The data distribution system according to claim 1, wherein said empty portion of each block of said encoded data is further superimposed with detection control information indicative of a superimposition start point and/or a superimposition end point of said identifier for identifying said provider of said digital content data.

10. A terminal apparatus for receiving encoded data, said terminal apparatus including recording means for recording said encoded data in a recording medium loaded in said terminal apparatus,
wherein said encoded data have been created by a manner of dividing digital content data into parts in many frequency bands, converting, said divided part of said digital content data included in each of said many frequency bands into a piece of encoded data composed of many compressed blocks each having a predetermined length unit and being constituted by at least bit distribution information, normalized data and quantized data, and superimposing, if an empty portion exists in each of said many blocks, a part or all of an identifier for identifying a provider of said digital content data onto said empty portion, wherein the predetermined length unit is set as a function of time characteristics and a frequency distribution of a supplied signal, said terminal apparatus comprising:

reading means for sequentially reading the blocked encoded data from said recording medium loaded in said terminal apparatus;

discriminating means for discriminating whether each block of said encoded data read by said reading means has said empty portion;

extracting means for extracting data of said empty portion from said each block found as having said empty portion by said discriminating means;

demodulating means for demodulating said identifier for identifying said provider on the basis of said data extracted by said extracting means;

connecting means for connecting a communication line with a distributor for distributing said digital content data through a predetermined communication network; and control means for controlling reception of new digital content data supplied from said provider through said predetermined communication network on the basis of said identifier for identifying said provider of the digital content data demodulated by said demodulating means.

11. The terminal apparatus according to claim 10, further comprising:

matching means for comparing said identifier for identifying said provider of said digital content data demodulated by said demodulating means with an identifier for identifying said distributor of said digital content data;

wherein, if said identifier for identifying said provider of said digital content data demodulated by said demodulating means is found matching by said matching means with said identifier for identifying said distributor of said digital content data, said control means permits reception of new digital content data supplied from said provider through said predetermined communication network.

12. The terminal apparatus according to claim 10, further comprising:

matching means for comparing said identifier for identifying said provider of said digital content data demodulated by said demodulating means with an, identifier for identifying said distributor of said digital content data; and fee charging means for charging a fee for new digital content data supplied from said provider upon reception thereof;

wherein, if said identifier for identifying said provider of said digital content data demodulated by said demodulating means is found matching by said matching means with said identifier for identifying said distributor of said digital content data, said new digital content data are provided at a discount or free of charge by said fee charging means.

13. The terminal apparatus according to claim 10, further comprising:

matching means for comparing said identifier for identifying said provider of said digital content data demodulated by said demodulating means with an identifier for identifying said distributor of said digital content data;

wherein, if said identifier for identifying said provider of said digital content data demodulated by said demodulating means is found matching by said matching means with said identifier for identifying said distributor of said digital content data, new digital content data supplied from said provider through said predetermined communication network are recorded to another recording medium.

14. The terminal apparatus according to claim 10, further comprising:

matching means for comparing said identifier for identifying said provider of said digital content data demodulated by said demodulating means with an identifier for identifying said distributor of said digital content data;

wherein, if said identifier for identifying said provider of said digital content data demodulated by said demodulating means is found matching by said matching means with said identifier for identifying said distributor of said digital content data, repair data obtained by repairing, if said digital content data already supplied from said distributor have been destroyed, said destroyed digital content data, are received as new digital content data.

15. The terminal apparatus according to claim 10, wherein said empty portion of each block of said encoded data is further superimposed with detection control information indicative of a superimposition start point and/or a superimposition end point of said identifier for identifying said provider of said digital content data.

16. A terminal apparatus including:

receiving means for receiving digital content data supplied from a predetermined distributor through a predetermined communication network, wherein said digital content data are composed of encoded data having many compressed blocks each having a predetermined length unit and being constituted by at least bit distribution information, normalized data and quantized data, and if each of said many blocks has an empty portion, said empty portion is superimposed with a part or all of identifier for identifying a provider of said digital content data, wherein the predetermined length unit is set as a function of time characteristics and a frequency distribution of a supplied signal; and first recording means for recording said received digital content data in a recording medium loaded in said recording means, said terminal apparatus comprising:

reading means for sequentially reading the blocked encoded data from said recording medium loaded in said recording means;

discriminating means for discriminating whether each block of said encoded data read by said reading means has said empty portion;

extracting means for extracting data of said empty portion from said each block found as having said empty portion by said discriminating means;

demodulating means for demodulating said identifier for identifying said provider on the basis of said data extracted by said extracting means;

transmitting means for transmitting said identifier for identifying said provider demodulated by said demodulating means to said provider through said predetermined communication network; and control means for controlling for, after transmitting said identifier through said transmitting means, controlling each component to perform processing in accordance with control information received by said receiving means from said provider.

17. The terminal apparatus according to claim 16, further comprising:
second recording means for recording digital content data to a different recording medium which differs from said recording medium;
wherein, if said control signal from said provider indicates to permit moving of said digital content data between the recording media, said control means controls said second recording means to record, to said different recording medium, encoded data supplied from said distributor for said different recording medium corresponding to said encoded data read by said reading means or encoded data held in said terminal apparatus and said control means controls said first recording means to delete said encoded data read by said reading means and recorded to said recording medium.

18. The terminal apparatus according to claim 16, wherein, if said control signal from said provider indicates to permit updating of digital content data, said control means controls said first recording meals to write encoded data corresponding to said encoded data read by said reading means and supplied from said provider or encoded data held in said terminal apparatus over said recording medium.

19. The terminal apparatus according to claim 18, wherein said encoded data supplied from said distributor or said encoded data held in said terminal apparatus are new encoded data encoded by a new encoding algorithm having substantially the same content as said encoded data read by said reading means.

20. The terminal apparatus according to claim 18, wherein said encoded data supplied from said distributor or said encoded data held in said terminal apparatus are new encoded data encoded by a new encoding algorithm having substantially the same content as said encoded data read by said reading means, said new encoded data being provided if said encoded data read by said reading means is at least partially destroyed.

21. The terminal apparatus according to claim 18, wherein said encoded data supplied from said distributor or said encoded data held in said terminal apparatus are new encoded data enhanced in bit rate having substantially the same content as said encoded data read by said reading means.

22. The terminal apparatus according to claim 16, further comprising:
benefit granting means for granting a predetermined benefit to a purchaser of said digital content data;
wherein, if said control signal from said provider indicates to permit granting of said predetermined benefit, said control means controls said benefit granting means to grant said predetermined benefit to said purchaser of said digital content data.

23. A terminal apparatus including:
receiving means for receiving digital content data supplied from a predetermined distributor through a predetermined communication network, wherein said digital content data are composed of encoded data having many compressed blocks each having a predetermined length unit and being constituted by at least bit distribution information, normalized data and quantized data, and if each of said many blocks has an empty portion, said empty portion is superimposed with a part or all of identifier for identifying a provider of said digital content data,
wherein the predetermined length unit is set as a function of time characteristics and a frequency distribution of a supplied signal; and
first recording means for recordings aid received digital content data in a recording medium loaded in said recording means,
said terminal apparatus comprising:
reading means for sequentially reading the blocked encoded data from said recording medium loaded in said recording means;
discriminating means for discriminating whether each block of said encoded data read by said reading means has said empty portion;
extracting means for extracting data of said empty portion from said each block found as having said empty portion by said discriminating means;
demodulating means for demodulating said identifier for identifying said provider on the basis of said data extracted by said extracting means;
comparing means for comparing said identifier for identifying said provider demodulated by said demodulating means with an identifier for identifying said provider held in said terminal apparatus; and
control means for, if a match is found between these identifiers, controlling each component to perform predetermined processing.

24. The terminal apparatus according to claim 23, further comprising:
second recording means for recording digital content data to a different recording medium which differs from said recording medium;
wherein said control means control said second recording means to record, to said different recording medium, encoded data supplied from said distributor for said different recording medium corresponding to said encoded data read by said reading means or encoded data held in said terminal apparatus and said control means controls said first recording means to delete said encoded data read by said reading means and recorded to said recording medium.

25. The terminal apparatus according to claim 23, wherein said control means controls said first recording means to write encoded data corresponding to said encoded data read by said reading means and supplied from said provider or encoded data held in said terminal apparatus over said recording medium.

26. The terminal apparatus according to claim 25, wherein said encoded data supplied from said distributor or said encoded data held in said terminal apparatus are new encoded data encoded by a new encoding algorithm having substantially the same content as said encoded data read by said reading means.

27. The terminal apparatus according to claim 25, wherein said encoded data supplied from said distributor or said encoded data held in said terminal apparatus are new encoded data encoded by a new encoding algorithm having substantially the same content as said encoded data read by said reading means, said new encoded data being provided if said encoded data read by said reading means is at least partially destroyed.

28. The terminal apparatus according to claim 22, wherein said encoded data supplied from said distributor or said encoded data held in said terminal apparatus are new encoded data enhanced in bit rate having substantially the same content as said encoded data read by said reading means.

29. The terminal apparatus according to claim 23, further comprising:
benefit granting means for granting a predetermined benefit to a purchaser of said digital content data;
wherein said control means controls said benefit granting means to grant said predetermined benefit to said purchaser of said digital content data.

30. A distribution center apparatus comprising:
first memory means for storing encoded data, said encoded data having been created by a manner of dividing digital content data into parts in many frequency bands, converting said divided part of said digital content data included in each of said many frequency bands into a piece of encoded data composed of many compressed blocks each having a predetermined length unit and being constituted by at least bit distribution information, normalized data and quantized data, and superimposing, if an empty portion exists in each of said many blocks, a part or all of an identifier far identifying a provider of said digital content data onto said empty portion,
wherein the predetermined length unit is set as a function of time characteristics and a frequency distribution of a supplied signal;
transmitting means for transmitting, to a predetermined terminal apparatus, desired digital content selected from a plurality of digital content data stored in said first memory means as encoded data;
second memory means for storing an identifier for identifying said provider of said distribution center apparatus;
receiving means for receiving an identifier for identifying a distributor supplied from said predetermined terminal apparatus;
comparing means for comparing said identifier for identifying said distributor supplied from said receiving means with said identifier for identifying said provider of said distribution center apparatus stored in said second memory; and
permitting means for, if a match is found by said comparing means, permitting transmission of said desired predetermined digital content from said transmitting means.

31. The distribution center apparatus according to claim 30, further comprising:
fee charging means for charging a fee for new digital content data supplied from said provider upon provision thereof;
wherein, if a match is found by said comparing means, said new digital content data are provided at a discount or free of charge by said fee charging means.

32. The distribution center apparatus according to claim 30, wherein said desired digital content data to be transmitted from said transmitting means if a match is found by said comparing means are the substantially the same as the previously transmitted digital content data.

33. The distribution center apparatus according to claim 30, wherein said desired digital content data to be transmitted from said transmitting means if a match is found by said comparing means are the substantially the same, as the previously transmitted digital content data and re-encoded by a new encoding algorithm.

34. The distribution center apparatus according to claim 30, wherein said desired digital content data to be transmitted from said transmitting means if a match is found by said comparing means are the substantially the same as the previously transmitted digital content data and enhanced in bit rate.

35. A high-efficiency encoding method for dividing an input digital signal into parts in a plurality of frequency bands, and performing predetermined conversion on said divided part of said input digital signal included in each of said plurality of frequency bands, to form a piece of encoded data composed of many compressed blocks each having a predetermined length unit and being constituted by at least bit distribution information, normalized data and quantized data,
wherein the predetermined length unit is set as a function of time characteristics and a frequency distribution of a supplied signal, comprising the steps of:
checking each of said many blocks for an empty portion equivalent to a difference between said predetermined length and a total value of said bit distribution information, said normalize data and said quantized data;
generating sub information; and
sequentially superimposing a part or all of the generated sub information onto said empty portion of each block found as having said empty portion.

36. The high-efficiency encoding method according to claim 35, wherein said sub information is at least one of an identifier for identifying a generator of said input digital signal, a business entity identifier for identifying a business entity distributing said input digital signal, an identifier for identifying said input digital signal, a copyright information identifier for said input digital signal, a URL information identifier, a fee charging information identifier, a device information identifier, and a reproduction count identifier.

37. The high-efficiency encoding method according to claim 35, wherein said predetermined empty portion is superimposed with detection control information indicative of superimposition start point and/or superimposition end point of said sub information.

38. A high-efficiency encoding apparatus for dividing an input digital signal into parts in a plurality of frequency bands, and performing predetermined conversion on said divided part of said input digital signal included in each of said plurality of frequency bands, to form a piece of encoded data composed of many compressed blocks each having a predetermined length unit and being constituted by at least bit distribution information, normalized data and quantized data,
wherein the predetermined length unit is set as a function of time characteristics and a frequency distribution of a supplied signal, comprising:
discriminating means for discriminating each of said many blocks for an empty portion equivalent to a difference between said predetermined length and a total value of said bit distribution information, said normalize data and said quantized data;
sub information generating means for generating sub information; and
superimposing means for superimposing a part or all of the generated sub information onto said empty portion of each block found by said discriminating means having said empty portion.

39. The high-efficiency encoding apparatus according to claim 38, wherein said sub information is at least one of an identifier for identifying a generator of said input digital signal, a business entity identifier for identifying a business entity distributing said input digital signal, an identifier for identifying said input digital signal, a copyright information identifier for said input digital signal, a URL information identifier, a fee charging information identifier, a device information identifier, and a reproduction count identifier.

40. The high-efficiency encoding apparatus according to claim 38, wherein said superimposing means superimposes, onto said predetermined empty portion, detection control information indicative of superimposition start point and/or superimposition end point of said sub information.

41. An encoded data decoding method for decoding encoded data, said encoded data having been created by a manner of dividing an input digital signal into parts in a plurality of frequency bands, and performing predetermined conversion on said divided part of said input digital signal included in each of said plurality of frequency bands, to form a piece of encoded data composed of many compressed blocks each having a predetermined length unit and being constituted by at least bit distribution information, normalized data and quantized data, wherein for each of said blocks in which there occurs an empty portion equivalent to a difference between said predetermined length and a total value of said bit distribution formation, said normalized data and said quantized data, sub information is superimposed on said empty portion, wherein the predetermined length unit is set as a function of time characteristics and a frequency distribution of a supplied signal, said decoding method comprising the steps of:

checking each of said many blocks for an empty portion equivalent to a difference between said predetermined length and a total value of said bit distribution information, said normalize data and said quantized data; and extracting said sub information from said block found as having said empty portion, said sub information being superimposed on said empty portion.

42. The encoded data decoding method according to claim 41, wherein at least one of an identifier for identifying a generator of said input digital signal, a business entity identifier for identifying a business entity distributing said input digital signal, an identifier for identifying said input digital signal, a copyright information identifier for said input digital signal, a URL information identifier, a fee charging information identifier, a device information identifier, and a reproduction count identifier is superimposed on said empty portion.

43. The encoded data decoding method according to claim 41, wherein detection control information indicative of superimposition start point and/or superimposition end point of said sub information is superimposed on said predetermined empty portion.

44. An encoded data decoding apparatus for decoding encoded data, said encoded data having been created by a manner of dividing an input digital signal into starts in a plurality of frequency bands, and performing predetermined conversion on said divided part of said input digital signal included in each of said plurality of frequency bands, to form a piece of encoded data composed of many compressed blocks each having a predetermined length unit and being constituted by at least bit distribution information, normalized data and quantized data, wherein for each of said blocks in which there occurs an empty portion equivalent to a difference between said predetermined length and a total value of said bit distribution information, said normalized data and said quantized data, sub information is superimposed on said empty portion, wherein the predetermined length unit is set as a function of time characteristics and a frequency distribution of a supplied signal, said decoding apparatus comprising:

discriminating means for discriminating each of said many blocks for an empty portion equivalent to a difference between said predetermined length and a total value of said bit distribution information, said normalize data and said quantized data; and extracting means for extracting said sub information from said block found as having said empty portion, said sub information being superimposed on said empty portion.

45. The encoded data decoding apparatus according to claim 44, wherein at least one of an identifier for identifying a generator of said input digital signal, a business entity identifier for identifying a business entity distributing said input digital signal, an identifier for identifying said input digital signal, a copyright information identifier for said input digital signal, a URL information identifier, a fee charging information identifier, a device information identifier, and a reproduction count identifier is superimposed on said empty portion.

46. The encoded data decoding apparatus according to claim 44, wherein detection control information indicative of superimposition start point and/or superimposition end point of said sub information is superimposed on said predetermined empty portion.

47. An encoded data transmission method for dividing an input digital signal into parts in a plurality of frequency bands, performing predetermined conversion on said divided part of said input digital signal included in each of said plurality of frequency bands to form a piece of encoded data composed of many compressed blocks each having a predetermined length unit and being constituted by at least bit distribution information, normalized data and quantized data, and transmitting said formed encoded data, wherein the predetermined length unit is set as a function of time characteristics and a frequency distribution of a supplied signal, said transmission method comprising the steps of:

checking each of said manly blocks for an empty portion equivalent to a difference between said predetermined length and a total value of said bit distribution information, said normalize data and said quantized data;

generating sub information;

superimposing a part or all of the generated sub information onto said empty portion of each block found by said discriminating means having said empty portion; and sequentially transmitting said encoded data superimposed with said sub information.

48. An encoded data transmission apparatus for dividing an input digital signal into parts in a plurality of frequency bands, performing predetermined conversion on said divided part of said input digital signal included in each of said plurality of frequency bands to form a piece of encoded data composed of many compressed blocks each having a predetermined length unit and being constituted by at least bit distribution information, normalized data and quantized data, and transmitting the formed encoded data, wherein the predetermined length unit is set as a function of time characteristics and a frequency distribution of a supplied signal, said transmission apparatus comprising:

discriminating means for discriminating each of said many blocks for an empty portion equivalent to a difference between said predetermined length and a total value of said bit distribution information, said normalize data and said quantized data;

sub information generating means for generating sub information;

superimposing means for superimposing a part or all of the generated sub information onto said empty portion of each block found by said discriminating means having said empty portion; and transmitting means for sequentially transmitting said encoded data superimposed of said sub information.

49. A sub information attaching method for receiving encoded data, said encoded data having been created by a manner of by dividing an input digital signal into parts in a plurality of frequency bands, and performing predetermined conversion on said input digital signal included in each of said plurality of frequency bands, to form a piece of encoded data composed of many compressed blocks each having a predetermined length unit and being constituted by at least bit distribution information, normalized data and quantized data, and attaching additional data to said received encoded data, wherein the predetermined length unit is set as a function of time characteristics and a frequency distribution of a supplied signal, said attaching method comprising the steps of:

checking each of said many blocks for an empty portion equivalent to a difference between said predetermined length and a total value of said bit distribution information, said normalize data and said quantized data;

generating sub information; and superimposing a part or all of the generated sub information onto said empty portion of each block found by said discriminating means having said empty portion.

50. The sub information attaching method according to claim 49, wherein said sub information is at least one of an identifier for identifying a generator of said input digital signal, a business entity identifier for identifying a business entity distributing said input digital signal, an identifier for identifying said input digital signal, a copyright information identifier for said input digital signal, a URL information identifier, a fee charging information identifier, a device information identifier, and a reproduction count identifier.

51. The sub information attaching method according to claim 49, wherein detection control information indicative of superimposition start point and/or superimposition end point of said sub information is superimposed on said predetermined empty portion.

52. A sub information attaching apparatus for receiving encoded data, said encoded data having been created by a manner of dividing an input digital signal into parts in a plurality of frequency bands, and performing predetermined conversion on said divided part of said input digital signal included in each of said plurality of frequency bands, to firm a piece of encoded data composed of many compressed blocks each having a predetermined length unit and being constituted by at least bit distribution information, normalized data and quantized data, and attaching additional data to said received encoded data, wherein the predetermined length unit is set as a function of time characteristics and a frequency distribution of a supplied signal, said attaching apparatus comprising:

discriminating means for discriminating each of said many blocks for an empty portion equivalent to a difference between said predetermined length and a total value of said bit distribution information, said normalize data and said quantized data;

sub information generating means for generating sub information; and superimposing means for superimposing a part or all of the generated sub information onto said empty portion of each block found as having said empty portion by said discriminating means.

53. A sub information attaching apparatus according to claim 52, wherein said sub information is at least one of an identifier for identifying a generator of said input digital signal, a business entity identifying for identifying a business entity distributing said input digital signal, an identifier for identifying said input digital signal, a copyright information identifier for said input digital signal, a URL information identifier, a fee charging, information identifier, a device information identifier, and a reproduction count identifier.

54. A sub information attaching apparatus according to claim 52, wherein said superimposing means superimposes detection control information indicative of superimposition start point and/or superimposition end point of said sub information on said predetermined empty portion.

55. A computer readable medium for storing a program for recording encoded data, said encoded data having been created by a manner of dividing an input digital signal into parts in a plurality of frequency band, and performing predetermined conversion on said divided part of said input digital signal included in each of said plurality of frequency bands, to form a piece of encoded data composed of many compressed blocks each having a predetermined length unit and being constituted by at least bit distribution information, normalized data and quantized data, wherein for each of said blocks in which there occurs an empty portion equivalent to a difference between said predetermined length and a total value of said bit distribution information, said normalize data and said quantized data, a part or all of the generated sub information is superimposed onto said empty portion, and wherein the predetermined length unit is set as a function of time characteristics and a frequency distributor of a supplied signal, said program comprising the steps of:

checking each of said many blocks fix an empty portion equivalent to a difference between said predetermined length and a total value of said bit distributor information, said normalize data and said quantized data; and extracting said sub information said block found as having said empty portion, said sub information being superimposed on said empty portion.

56. A recording medium according to claim 55, wherein at least one of an identifier for identifying a generator of said input digital signal, a business entity identifier for identifying a business entity distributing staid input digital signal, an identifier for identifying said input digital signal, a copyright information identifier for said input digital signal, a URL information identifier, a fee charging information identifier, a device information identifier, and a reproduction count identifier is superimposed on said empty portion.

57. A recording medium according to claim 55, wherein detection control information indicative of superimposition start point and/or superimposition end point of said sub information is superimposed on said predetermined empty portion.

* * * * *